(12) United States Patent
Shelby et al.

(10) Patent No.: US 10,929,782 B2
(45) Date of Patent: Feb. 23, 2021

(54) INTEGRATING RESTAURANT RESERVATION SERVICES INTO A NAVIGATION APPLICATION

(71) Applicant: Apple Inc., Cupertino, CA (US)

(72) Inventors: Ryan Shelby, Mountain View, CA (US); Eric Albert, San Francisco, CA (US); David Hodge, San Francisco, CA (US); Curtis Galloway, Santa Cruz, CA (US); Tara Teich, San Francisco, CA (US); Sam Iglesias, Palo Alto, CA (US); Maria D. Ioveva, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 15/274,568

(22) Filed: Sep. 23, 2016

(65) Prior Publication Data

US 2017/0357916 A1     Dec. 14, 2017

Related U.S. Application Data

(60) Provisional application No. 62/348,904, filed on Jun. 11, 2016.

(51) Int. Cl.
*G06Q 10/02* (2012.01)
*G01C 21/34* (2006.01)
(Continued)

(52) U.S. Cl.
CPC ......... *G06Q 10/02* (2013.01); *G01C 21/3407* (2013.01); *G01C 21/3667* (2013.01);
(Continued)

(58) Field of Classification Search
CPC ............ G01C 21/3407; G01C 21/3667; G01C 21/3697; G06Q 10/02
(Continued)

(56) References Cited

U.S. PATENT DOCUMENTS 7,069,228 B1 *   6/2006   Rose ................. G06F 17/30864
                                                           705/5
8,868,337 B2 *  10/2014   Pierfelice ............... G01C 21/20
                                                           701/454

(Continued)

OTHER PUBLICATIONS

Eater.com; "Google Maps Partners with Open Table to Offer Restaurant Reservations"; Nov. 5, 2014; available at: https://www.eater.com/2014/11/5/7162849/make-restaurant-reservations-inside-google-maps (last accessed Jan. 15, 2020) (Year: 2014).*
(Continued)

*Primary Examiner* — Kevin H Flynn
*Assistant Examiner* — Emmett K. Walsh
(74) *Attorney, Agent, or Firm* — Invoke

(57) ABSTRACT

In some implementations, a navigation application can integrate third party services into the navigation application in an easy to use and convenient manner. For example, the navigation application can receive user input indicating that the user is interested reserving a table from a table reservation service. In response to receiving the indication, the navigation application can invoke an application extension for a third party table reservation application. The navigation application and table reservation application can then communicate to provide the table reservation service through the navigation application.

20 Claims, 42 Drawing Sheets

(51) Int. Cl.
*G01C 21/36* (2006.01)
*G06Q 30/02* (2012.01)
*G06Q 50/12* (2012.01)

(52) U.S. Cl.
CPC ..... *G01C 21/3697* (2013.01); *G06Q 30/0284* (2013.01); *G06Q 50/12* (2013.01)

(58) Field of Classification Search
USPC .......................................................... 705/5
See application file for complete search history.

(56) References Cited

U.S. PATENT DOCUMENTS

| | | | | |
|---|---|---|---|---|
| 8,949,142 | B1* | 2/2015 | Angrish | G06Q 20/202 |
| | | | | 705/15 |
| 9,699,128 | B1* | 7/2017 | Zhang | G06F 3/0482 |
| 10,009,666 | B1* | 6/2018 | van Scheltinga | H04Q 3/0033 |
| 10,032,144 | B1* | 7/2018 | Jacob | G06Q 20/102 |
| 2003/0135458 | A1* | 7/2003 | Tadano | G06Q 30/04 |
| | | | | 705/40 |
| 2010/0070297 | A1* | 3/2010 | Kharraz Tavakol | |
| | | | | G06Q 10/06311 |
| | | | | 705/2 |
| 2012/0323642 | A1* | 12/2012 | Camp | G06Q 10/02 |
| | | | | 705/13 |
| 2013/0226627 | A1* | 8/2013 | Kubovcik | G06Q 10/02 |
| | | | | 705/5 |
| 2013/0275164 | A1* | 10/2013 | Gruber | G10L 17/22 |
| | | | | 705/5 |
| 2014/0129303 | A1* | 5/2014 | Aiglstorfer | G06Q 30/0241 |
| | | | | 705/14.4 |
| 2014/0172727 | A1 | 6/2014 | Abhyanker et al. | |
| 2014/0173625 | A1* | 6/2014 | Kumar | G06F 9/4843 |
| | | | | 718/106 |
| 2014/0282234 | A1* | 9/2014 | Ku | G06F 3/04842 |
| | | | | 715/800 |
| 2014/0320674 | A1* | 10/2014 | Kuang | H04N 5/23222 |
| | | | | 348/207.1 |
| 2014/0350978 | A1* | 11/2014 | Li | G06F 3/04842 |
| | | | | 705/5 |
| 2015/0156061 | A1* | 6/2015 | Saxena | H04W 4/50 |
| | | | | 715/733 |
| 2015/0169093 | A1* | 6/2015 | Nakao | G06F 3/041 |
| | | | | 345/173 |
| 2015/0286965 | A1* | 10/2015 | Amano | G01C 21/3469 |
| | | | | 705/5 |
| 2016/0132605 | A1* | 5/2016 | Jiang | G06F 17/3048 |
| | | | | 707/728 |
| 2016/0179956 | A1* | 6/2016 | Sogani | G06Q 30/0251 |
| | | | | 707/722 |
| 2016/0290820 | A1* | 10/2016 | Nakagawa | G01C 21/367 |
| 2016/0371656 | A1* | 12/2016 | Hur | G06Q 10/02 |
| 2017/0039291 | A1* | 2/2017 | Singh | H04L 67/10 |
| 2017/0068406 | A1 | 3/2017 | Mark | |
| 2017/0206471 | A1* | 7/2017 | Dermosessian | G01C 21/3679 |

OTHER PUBLICATIONS

Timeout.com ("7 new restaurant-reservation apps, and how they work") available at: https://www.timeout.com/chicago/blog/7-new-restaurant-reservation-apps-and-how-they-work (last accessed Sep. 6, 2020) (Year: 2015).*

Eater.com; "Google Maps Partners with Open Table to Offer Restaurant Reservations"; Nov. 5, 2014; available at: https://www.eater.com/2014/11/5/7162849/make-restaurant-reservations-inside-google-maps (last accessed Oct. 15, 2020) (Year: 2014).*

Flier, Holger; You car has arrived on iOS and Android: More ways to get around with Google Maps, Mar. 15, 2016 (Year 2016).

Doerrfeld, Bill, Google Maps API Adds New Transit Directions and Fares, Jan. 24, 2015 (Year: 2015).

Google Maps, www.google.com/maps.

* cited by examiner

INTEGRATING RESTAURANT RESERVATION SERVICES INTO A NAVIGATION APPLICATION

RELATED APPLICATION

This application claims the benefit of U.S. Provisional Application No. 62/348,904 filed Jun. 11, 2016, and which is incorporated herein by reference.

TECHNICAL FIELD

The disclosure generally relates to providing navigation related features in a navigation application.

BACKGROUND

One of the most popular features of modern mobile devices is the navigation application. People often use navigation applications on the mobile devices determine the best route to a destination even if they know how to get to their destination. The typical navigation application can provide route information, traffic information, and even information about businesses, such as restaurants, grocery stores, department stores and the like. Some navigation applications even provide information about public transit options, like buses, trains, etc.

Some other popular features of modern mobile devices come from other applications installed on a mobile device. For example, one popular type of application is that of a ride hailing service that allows users to arrange transportation for a fee on their mobile device. Another popular type of application is that of a table reservation service that allows users to reserve a table at a restaurant. Another popular type of application is that of a restaurant queuing reservation service that allows users to reserve a place in line at a restaurant.

When using these applications, the user often is required to switch back and forth between the navigation application and the ride hailing application and/or the table reservation application. For example, the user may use the navigation application to find a destination and then switch to the ride hailing application to find transportation to the destination and/or table reservation application to reserve a table at a restaurant located at the destination. However, switching back and forth between the navigation application and the ride hailing application and/or the table reservation application can be time consuming, confusing, and burdensome.

SUMMARY

In some implementations, a navigation application can integrate third party services into the navigation application in an easy to use and convenient manner. For example, the navigation application can receive user input indicating that the user is interested obtaining transportation from a ride hailing service. In response to receiving the indication, the navigation application can invoke an application extension for a third party ride hailing application. The navigation application and ride hailing application can then communicate to provide the ride hailing service through the navigation application. Similarly, the navigation application can receive user input indicating that the user is interested reserving a table from a table reservation service. In response to receiving the indication, the navigation application can invoke an application extension for a third party table reservation application. The navigation application and table reservation application can then communicate to provide the table reservation service through the navigation application.

Particular implementations provide at least the following advantages. The user of the navigation application does not have to leave the navigation application to hail a ride. The user of the navigation application does not have to leave the navigation application to reserve a table. The user can compare rates of different ride hailing services in a single graphical user interface.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Overview

Figure 1:
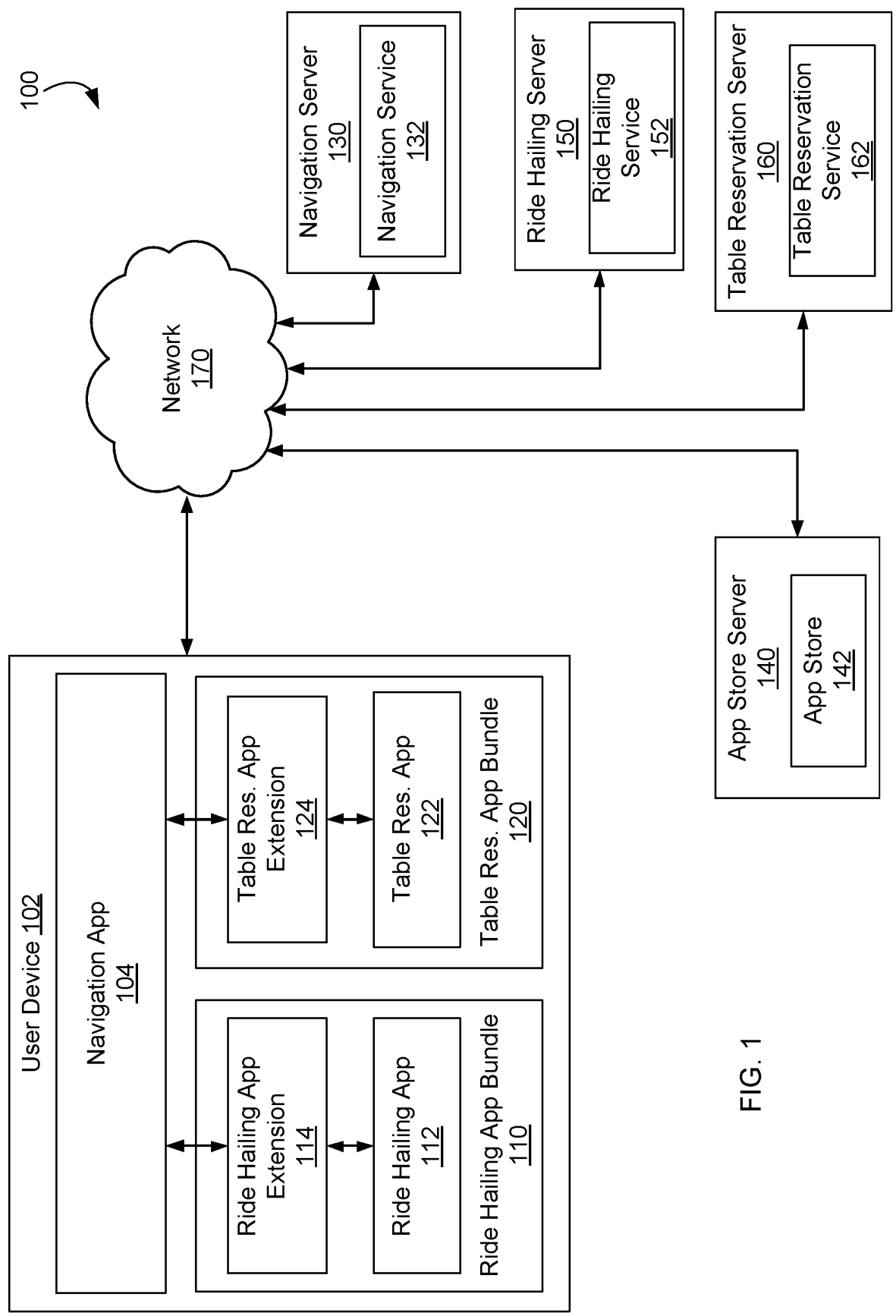
FIG. 1 illustrates an example system for integrating third party applications into a navigation application.

FIG. 1 illustrates an example system 100 for integrating third party applications into a navigation application. For example, system 100 can be configured to integrate ride hailing application functionality into a navigation application so that a user can schedule a ride (e.g., transportation) from a start location to a destination location within the navigation application. System 100 can be configured to integrate table reservation application functionality into a navigation application so that a user can reserve a table at a restaurant from within the navigation application.

In some implementations, system 100 can include user device 102. For example, user device 102 can be a computing device, such as a laptop computer, smart phone, tablet computer, and the like. User device 102 can be a wearable device, such as a smart watch, smart glasses, etc. User device 102 can be a media device, such as a streaming media device, media player, automobile entertainment system, etc.

In some implementations, user device 102 can include navigation application 104. For example, navigation application 104 can provide features that allow the user to search for and/or specify a destination. Navigation application 104 can be a mapping application that provides features that allow the user to view representations of maps corresponding to the user's current location, maps corresponding to a location associated with search results or other points of interest, and/or maps corresponding to a destination location or geographical area selected by the user. Once the destination is specified, navigation application 104 can present information about the destination (e.g., restaurant name, restaurant ratings, menu, etc.). Navigation application 104 can receive user input requesting a route to the destination and navigation application 104 can present a route from a start location (e.g., the current location of user device 102, a user-specified location, etc.) to the specified destination.

While navigation applications provides many navigation related services, such as presenting maps, showing the current location of the user and/or user device, searching for destination locations (e.g., home addresses, businesses, parks, etc.), there are many complementary services that the typically navigation application does not provide. For example, a user can search for a restaurant using a navigation application, but the user typically must invoke a separate application to make a table reservation at the restaurant. The user may request that the navigation determine a route from a start location to a destination location, but the user typically must invoke a separate application to request transportation (e.g., from a taxi, ride hailing service, etc.) from the start location to the destination location. However, implementations described herein provide a mechanism to integrate these complementary services into navigation application 102 so that the user is not required to invoke a separate application to schedule transportation or reserve a table at a restaurant.

In some implementations, user device 102 can include ride hailing application bundle 110. For example, a third party vendor (e.g., a ride hailing service or business) can generate a ride hailing application for use on user device 102. The third party vendor can be different or separate from the vendor or manufacturer of user device 102 and/or navigation application 104. The third party vendor can create ride hailing application bundle 110 and the user of user device 102 can install application bundle 110 on user device 102. For example, user device 102 can download and install application bundle 110 from application store 142 on application store server 140 through network 170 (e.g., LAN, WAN, WLAN, Internet, etc.).

In some implementations, ride hailing application bundle 110 can include ride hailing application 112. For example, after installing application bundle 110 on user device 102, the user can invoke ride hailing application 112 to utilize features and/or services provided by the ride hailing service. For example, ride hailing application 112 can be a client application of ride hailing service 152. The user can interact with ride hailing application 112 to obtain information (e.g., pricing, types of vehicles, passengers per car, etc.) about transportation options available from ride hailing service 152 on ride hailing server 150. The user can interact with ride hailing application 112 to select a vehicle and schedule a ride, as described further below. For example, ride hailing application 112 can provide the graphical user interfaces needed to present ride hailing information received from ride hailing service 152 and schedule transportation through ride hailing service 152. Because ride hailing application 112 is a separate application from navigation application 104, the user who is using navigation application 104 to find a destination typically must switch applications and invoke ride hailing application 112 before the user can schedule a ride.

As disclosed herein, this problem of switching applications can be solved using application extensions that can be invoked by navigation application 104 and provide application specific information to navigation application 104 so that navigation application 104 can present the application specific information and/or provide application specific services using graphical user interfaces of navigation application 104. For example, an application extension can be executable software built by an application provider (e.g., ride hailing service provider, table reservation service provider, etc.) that provides similar features as the corresponding application but is executed in the background and provides application specific information to a host application (e.g., navigation application 104). For example, the application extension can be a part of the corresponding application. The application extension can be a separate executable that includes some of the software instructions of the corresponding application. The extension can provide application programming interfaces (API) that are accessible to navigation application 104 (e.g., through an inter-process communication channel) to invoke application specific features, such as the ride hailing features and/or table reservation features described herein.

In some implementations, ride hailing application bundle 110 can include ride hailing application extension 114. For example, ride hailing application extension 114 can be a software object executable by user device 102 that provides features for scheduling or arranging transportation through ride hailing service 152. Ride hailing application extension 114 can be invoked by navigation application 104 when a user provides input to navigation application 104 indicating that the user wishes to use a ride hailing service (e.g., ride hailing service 152). For example, extension 114 can include some of the same features as ride hailing application 112 for obtaining transportation options information (e.g., available vehicles, vehicle types, rates, etc.) from ride hailing service 52 and scheduling or arranging transportation with ride hailing service 152.

However, instead of presenting the graphical user interfaces for arranging transportation like ride hailing application 112, ride hailing extension 114 can provide the transportation options information to navigation application 104 and navigation application 104 can present graphical user interfaces for providing the transportation options information to the user. Similarly, when the user provides input to a graphical user interface of navigation application 104 selecting a transportation option, navigation application 104 can send the selected transportation option to ride hailing extension 114 so that ride hailing extension 114 can schedule (e.g., arrange, reserve, etc.) the selected transportation option with ride hailing service 152. After the transportation option is scheduled, ride hailing service 152 can send transportation confirmation information to ride hailing extension 114 and ride hailing extension 114 can send the confirmation information to navigation application 104 for presentation to the user, as described in detail below.

In some implementations, user device 102 can include table reservation application bundle 120. For example, a third party vendor (e.g., a table reservation service or business) can generate a table reservation application for use on user device 102. The third party vendor can be different or separate from the vendor or manufacturer of user device 102 and/or navigation application 104. The third party vendor can create table reservation application bundle 120 and the user of user device 102 can install application bundle 120 on user device 102. For example, user device 102 can download and install application bundle 120 from application store 142 on application store server 140 through network 170.

In some implementations, table reservation application bundle 120 can include table reservation application 122. For example, after installing application bundle 120 on user device 102, the user can invoke table reservation application 122 to utilize features and/or services provided by a table reservation service. For example, table reservation application 122 can be a client application of table reservation service 162. The user can interact with table reservation application 122 to obtain information (e.g., pricing, menu, number of available tables, dates/times when tables are available, etc.) about table reservation options for a restaurant available from table reservation service 162 on table reservation server 160. The user can interact with table reservation application 122 to view available table reservations and reserve a table at a restaurant, as described further below. For example, table reservation application 122 can provide the graphical user interfaces needed to present available table information received from table reservation service 162 and reserve a table through table reservation service 162. Because table reservation hailing application 122 is a separate application from navigation application 104, the user who is using navigation application 104 to find a restaurant typically must switch applications and invoke table reservation application 122 before the user can reserve a table.

In some implementations, table reservation application bundle 120 can include table reservation application extension 124. For example, table reservation application extension 124 can be a software object executable by user device 102 that provides features for reserving a table at a restaurant through table reservation service 162. Table reservation application extension 124 can be invoked by navigation application 104 when a user provides input to navigation application 104 indicating that the user wishes to use a table reservation service (e.g., table reservation service 162). For example, extension 124 can include some of the same features as table reservation application 122 for obtaining table reservation options information (e.g., pricing, menu, number of available tables, dates/times when tables are available, etc.) for a restaurant from table reservation service 162 and reserving a table at the restaurant through table reservation service 152.

However, instead of presenting the graphical user interfaces for reserving a table like table reservation application 122, table reservation extension 124 can provide the table reservation options information to navigation application 104 and navigation application 104 can present graphical user interfaces for providing the table reservation options information to the user. Similarly, when the user provides input to a graphical user interface of navigation application 104 selecting a table reservation option, navigation application 104 can send the selected table reservation option (e.g., restaurant identifier, time, party size, etc.) to table reservation extension 124 so that table reservation extension 124 can reserve the selected table reservation option with table reservation service 162. After the table reservation option is reserved, table reservation service 152 can send table reservation confirmation information to table reservation extension 124 and table reservation extension 124 can send the table reservation confirmation information to navigation application 104 for presentation to the user, as described in detail below.

In some implementations, navigation application 104 can match restaurant identifiers received from navigation service 132 to restaurant identifiers received from restaurant table reservation service 162. For example, when making a reservation, navigation application 104 must identify to reservation service 162 the restaurant at which the user wishes to reserve a table. However, because navigation service 132 and restaurant reservation service 162 are separate services (e.g., operated by separate entities) the way that these services identify restaurants may be different. Moreover, providing the navigation service identifier for the restaurant may provide too much information about the user to restaurant table reservation service 162. Thus, navigation application 104 can request restaurant metadata from the restaurant table reservation service (e.g., through table reservation application extension 122) for restaurants in the area of the user selected restaurant and determine the restaurant table reservation service identifier for the restaurant based on the received metadata.

For example, navigation application 104 can send table reservation application extension 124 a geohash of the location of the restaurant. For example, the geohash can be a concise description of a bounding box around the location that does not describe the location precisely. In response to receiving the geohash, table reservation application extension 124 can send back restaurant metadata for each restaurant within the geographical area surrounded by the bounding box defined by the geohash. For example, the restaurant metadata can include an identifier for the reservation service, the reservation service identifier for the restaurant, a name of the restaurant, a location (e.g., latitude/longitude coordinates) of the restaurant, an address for the restaurant, and/or other information (e.g., a phone number for the restaurant). Navigation application 104 can compare the restaurant metadata received from table reservation service 162 to restaurant metadata received from navigation service 132 to determine which restaurant corresponds to the restaurant at which the user wishes to make a reservation. Navigation application 104 can then use the reservation service identifier for the restaurant to make table reservations with table reservation service 162.

Figure 2:
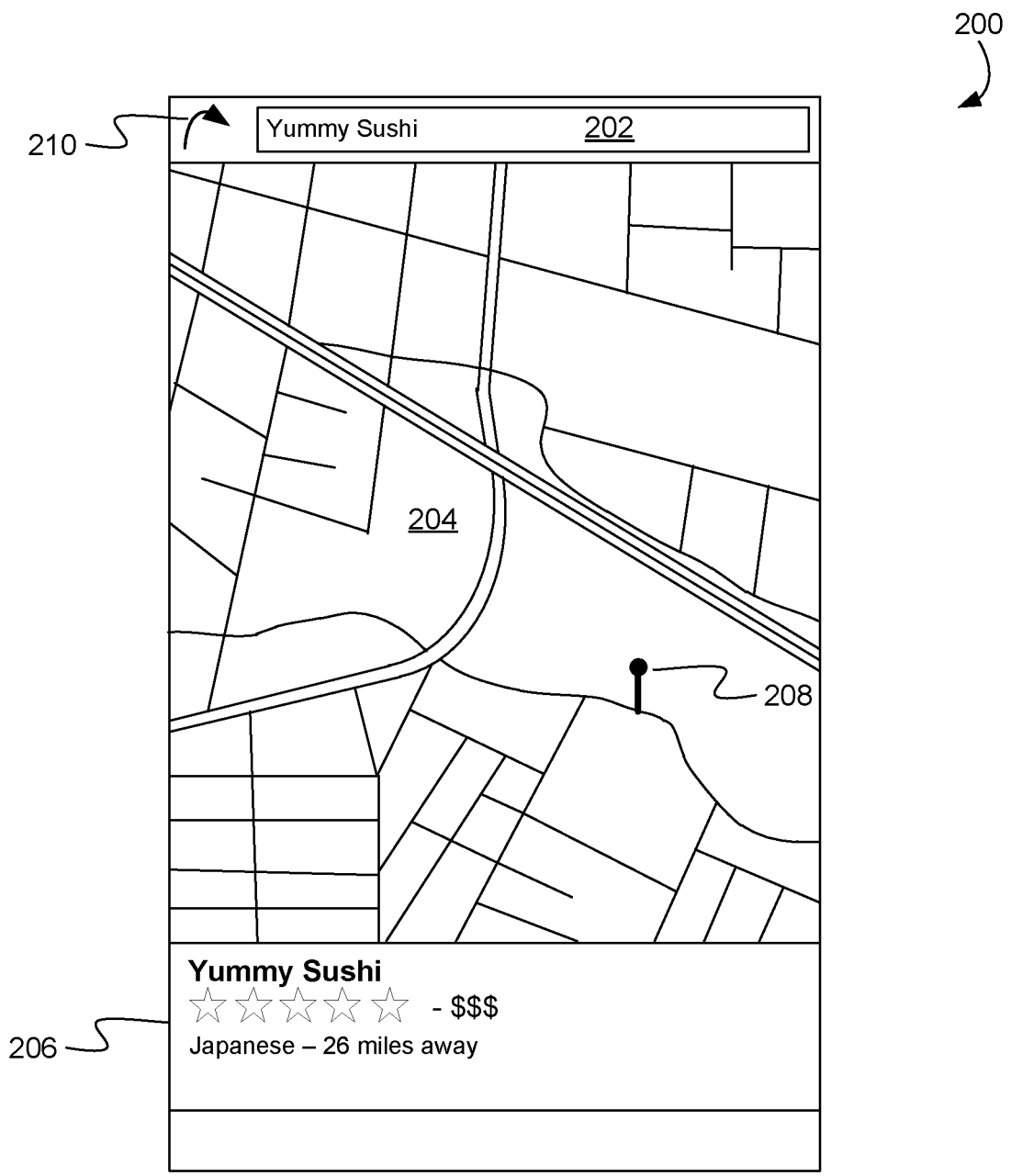
FIG. 2 illustrates an example graphical user interface of navigation application for specifying a destination.

FIG. 2 illustrates an example graphical user interface 200 of navigation application 104 for specifying a destination. For example, each of the graphical user interfaces (GUIs) described herein can be presented on a display of user device 102 by navigation application 104. In some implementations, graphical user interface (GUI) 200 can present map 204. For example, map 204 can initially represent the user's current location. Navigation application 104 can, for example, send the current location of user device 102 to navigation service 132 on navigation server 130. Navigation service 132 can return data for presenting map 204.

In some implementations, graphical user interface 200 can include graphical element 202 for searching for a destination. For example, graphical element 202 can be a text input control. When the user selects graphical element 202, user device 102 can present a virtual keyboard that the user can use to enter textual search parameters. After receiving the search parameters, navigation application 104 can send the search parameters to navigation service 132 on navigation server 130. Navigation service 132 can return locations matching the search parameters as search results. Navigation application 104 can present the search results on GUI 200. For example, if the user searches for the restaurant "Yummy Sushi", navigation application 104 can present graphical element 206 representing a restaurant matching the search query at the bottom of GUI 200. Navigation application 104 can present graphical element 208 identifying a location corresponding to the search results on map 204. When presenting search results, map 204 can be updated to represent an area around the location of the search results.

In some implementations, navigation application 104 can receive user input indicating that the user wishes to view more information about a search result item. For example, the user can select graphical element 205 representing the restaurant "Yummy Sushi" to cause navigation application 104 to present more information about the restaurant. As described below, the navigation application 104 can present features that allow the user to reserve a table at the selected restaurant in response to the user selecting graphical element 202.

In some implementations, navigation application can receive user input indicating that the user wishes to travel from a start location (e.g., the user's current location, a specified location, etc.) to the location (e.g., destination location) of a search results item. For example, the user can select graphical element 210 to cause navigation application 104 to present a route from the start location to the location of the search results item indicated by graphical element 208 on map 204. As described below, the navigation application 104 can present features that allow the user to hail a ride or arrange transportation from the start location to the destination location in response to the user selecting graphical element 210.

Hailing a Ride in a Navigation Application

Figure 3:
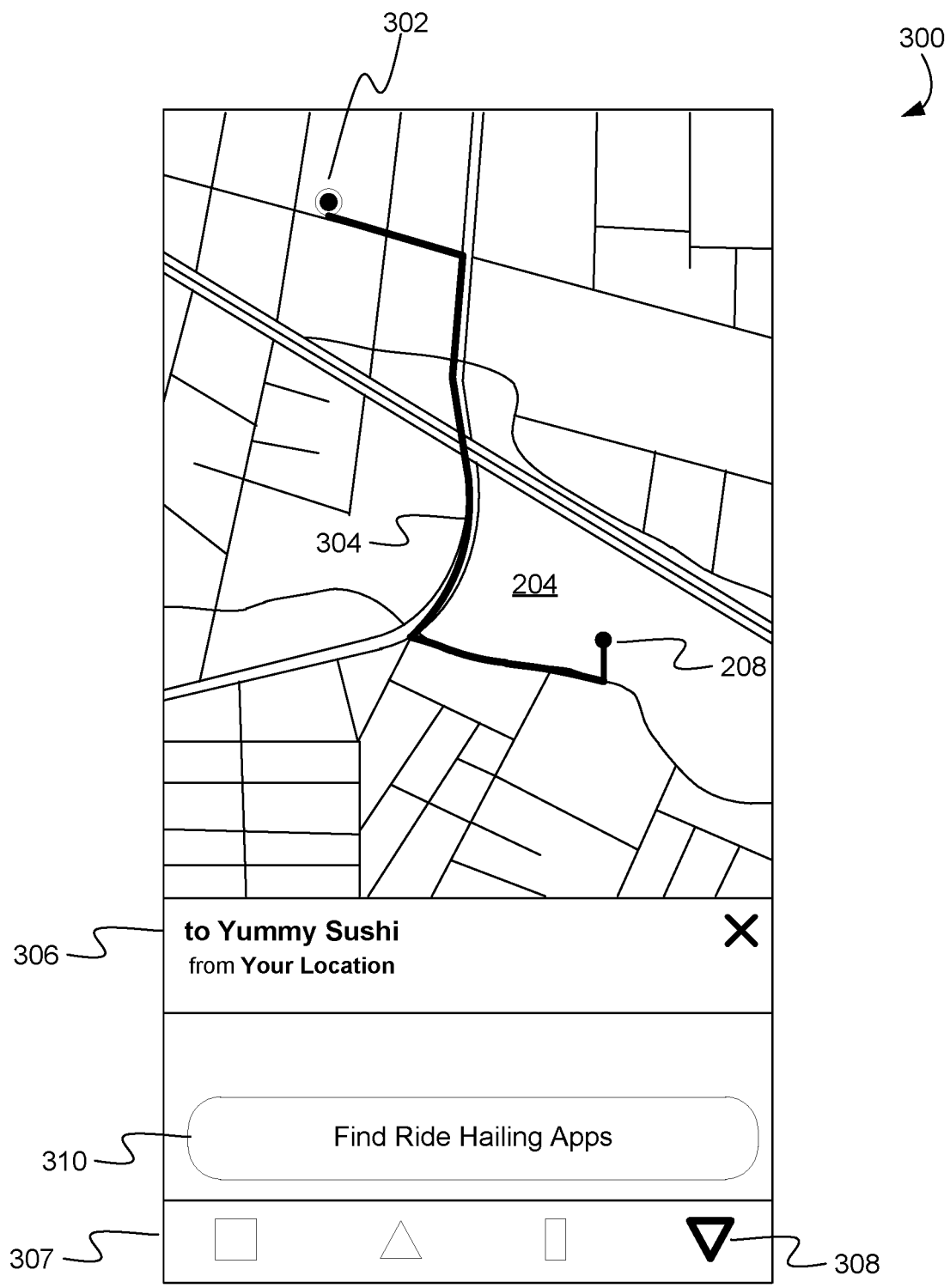
FIG. 3 illustrates an example graphical user interface for installing a ride hailing application on user device.

FIG. 3 illustrates an example graphical user interface 300 for installing a ride hailing application on user device 102. For example, navigation application 104 can present GUI 300 on a display of user device 102 in response to the user selecting graphical element 210 of FIG. 2. In some implementations, GUI 300 can include map 204 representing a geographical area that includes graphical element 208 representing the destination location selected or identified using GUI 200 and start location 302 (e.g., the user's current location, a user specified location). GUI 200 can present graphical element 304 representing a recommended route for traveling between start location 302 and destination 208.

In some implementations, GUI 300 can include graphical element 306 describing the start location and destination location presented on GUI 300. For example, graphical element 306 can indicate that route 304 represents a route from the user's current location to the destination location (e.g., "Yummy Sushi"). Graphical element 306 is presented in the ride hailing graphical user interfaces that follow to represent the user's current travel plans. The user can interact with graphical element 306 to view additional information about the travel plans, ride hailing options, ride reservations, and other travel information as detailed below. For example, the user can slide (e.g., using touch input, swipe gesture, etc.) graphical element 306 up and down the display (e.g., touch sensitive display, pressure sensitive display) of user device 102 to view more and less information, respectively, about the current travel plans, route, ride hailing options, ride reservations, and/or other travel information.

In some implementations, GUI 300 can include graphical element 307 for presenting and selecting a mode of travel for travelling from start location 302 to the destination location 208. For example, graphical element 307 can present selectable graphical elements for selecting a driving mode, a walking mode, and/or a public transit mode. In some implementations, graphical element 307 can include graphical element 308 corresponding to a ride hailing mode of transportation. For example, the user can select graphical element 308 to cause navigation application 104 to present ride hailing options and schedule a ride, as described further below.

In some implementations, GUI 300 can include graphical element 310 for finding ride hailing applications in application store 142. For example, when the user selects graphical element 308 to view ride hailing options, the user may not have any ride hailing applications (e.g., ride hailing application 112) installed on user device 102. Navigation application 104 can determine that user device 102 does not have any ride hailing applications installed and present graphical element 310 prompting the user to find and install a ride hailing application. For example, in response to receiving user input selecting graphical element 310, navigation application 104 can invoke GUI 400 of FIG. 4.

Figure 4:
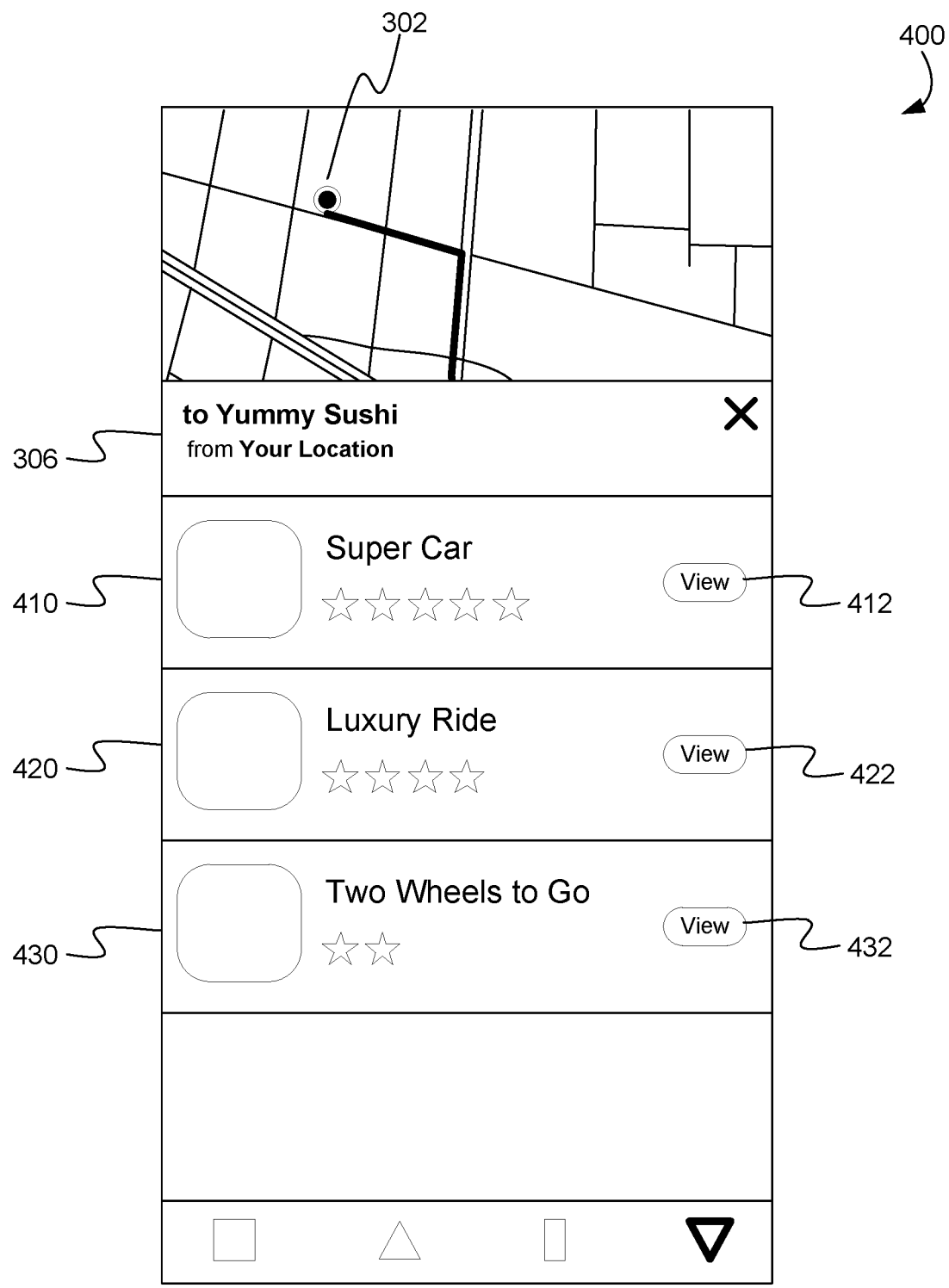
FIG. 4 illustrates an example graphical user interface for presenting ride hailing applications available for installing on user device.

FIG. 4 illustrates an example graphical user interface 400 for presenting ride hailing applications available for installing on user device 102. For example, navigation application 104 can present GUI 400 in response to receiving user input selecting graphical element 310 of FIG. 3. In some implementations, GUI 400 can include graphical element 306, as described above. Graphical element 306 can be moved upward on GUI 400 from its position on GUI 300 to make room for the presentation a listing of ride hailing applications available from application store 142.

In some implementations, in response to receiving the user selection of graphical element 310, navigation application 104 can send a message to application store 142 requesting information (e.g., metadata) describing ride hailing applications available from application store 142. For example, navigation application 104 can include the current location of user device 102 in the message. Application store 142 can use the current location of user device 102 to find the most popular ride hailing applications in an area (e.g., city, metropolitan area, state, etc.) surrounding the user's location. Application store 142 can send metadata describing the ride hailing applications to navigation application 104.

In some implementations, GUI 400 can present graphical elements 410, 420 and/or 430 representing ride hailing applications available from application store 142. For example, in response to receiving the metadata describing the ride hailing applications from application store 142, navigation application 104 can present graphical elements 410, 420, and/or 430. In some implementations, graphical elements 410, 420, and/or 430 can represent the most popular ride sharing applications in the user's geographical area.

In some implementations, graphical element 410 can include information describing the corresponding ride hailing application. For example, graphical element 410 can include the name of the ride hailing application (e.g., ride hailing application 112), an image representing the corresponding ride hailing service (e.g., ride hailing service 152), and a rating for the ride hailing application and/or service. For example, the rating can correspond to a rating generated by application store 142. The rating can correspond to an average user rating generated based on ratings of the ride hailing service provided by individual users. The rating can correspond to actual usage data generated based on how often the corresponding ride hailing application is invoked or used by individual users.

In some implementations, graphical element 410 can include graphical element 412 for viewing the corresponding ride hailing application in the application store application on user device 102. For example, selection of graphical element 412 can cause navigation application 104 to invoke an application store application on user device 102 so that the user can select, download, and install the corresponding ride hailing application from application store 142 on user device 102.

Graphical elements 420 and 430 can have similar features as graphical element 410 and represent different ride hailing applications available from application store 142. The user can select graphical elements 422 and/or 432 to invoke the application store application on user device 102 and download the corresponding ride hailing applications, as described above with reference to graphical element 412. After the user installs a ride hailing application (e.g., ride hailing application bundle 110) on user device 102, navigation application 104 can enable the ride hailing features described below.

Figure 5:
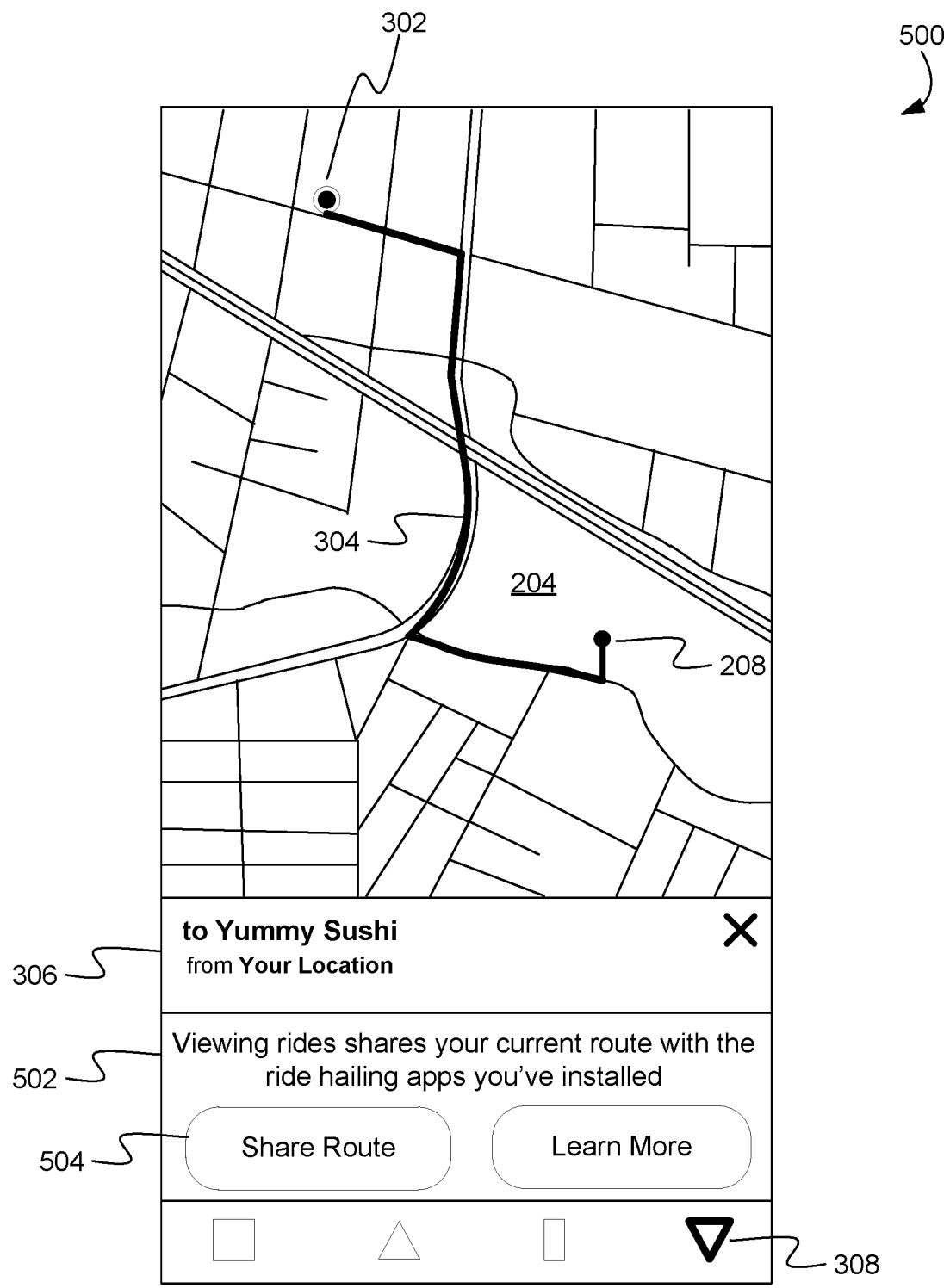
FIG. 5 illustrates an example graphical user interface for presenting a message about sharing route information with a third party application.

FIG. 5 illustrates an example graphical user interface 500 for presenting a message about sharing route information with a third party application. For example, GUI 500 can be presented by notification application 104 when a riding hailing application is available (e.g. installed) user device 102. GUI 500 can be presented in response to the user selecting the ride hailing option (e.g., graphical element 308) for travelling from start location 302 to destination 208.

In some implementations, GUI 500 can include message 502 informing the user that using the ride hailing features of navigation application 104 will cause navigation application 104 to share the user's route information with a third party service. If the user accepts sharing the route information, the user can select graphical element 504 to allow navigation application 104 to share route information with an installed ride hailing application (e.g., ride hailing application 112) on user device 102.

In some implementations, GUI 500 can be presented each time the user selects graphical element 308 until the user selects graphical element 504. For example, route sharing message 502 can be presented each time the user selects the ride hailing option 308 until the user indicates that the user authorizes sharing route information with a ride hailing application by selecting graphical element 504.

Figure 6:
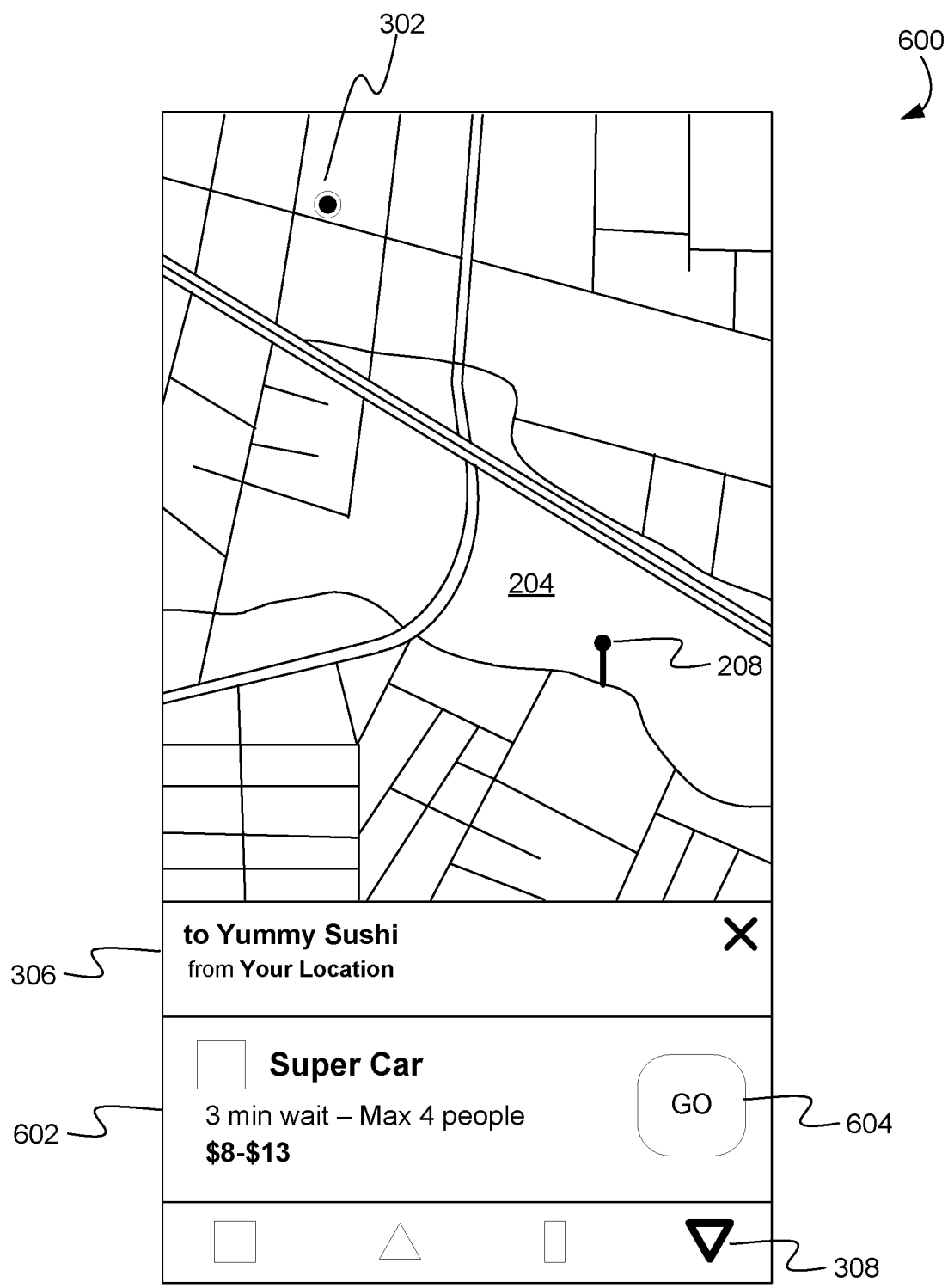
FIG. 6 illustrates an example graphical user interface for selecting a ride hailing service.

FIG. 6 illustrates an example graphical user interface 600 for selecting a ride hailing service. For example, GUI 600 can be presented by navigation application 104 on a display of user device 102 in response to the user selecting ride hailing option 308. GUI 600 can be presented when user device 102 has a ride hailing application installed and after the user has authorized navigation application 104 to share route information with the installed ride hailing application, for example.

In some implementations, GUI 600 can include graphical element 306 representing the user's current travel plans. As described above, graphical element can identify the start location 302 (e.g., an address, business name, current location, contact's name, etc.) and the destination location 208 (e.g., an address, business name, contact's name, etc.).

In some implementations, GUI 600 can include map 204. Map 204 can include graphical element 208 representing the destination location. Map 204 can include graphical element 302 representing the starting location. Map 204 can be sized so that both start location 302 and destination location 208 are viewable on map 204.

In some implementations, GUI 600 can include graphical element 602 representing a ride hailing application installed on user device 102. For example, graphical element 602 can represent ride hailing application 112. When multiple ride hailing applications are installed on user device 102, navigation application 104 can determine or select which ride hailing application to represent on graphical element 602 based on which ride hailing application or service provides the shortest wait time, the least cost, or is most frequently used on user device 102. Navigation application 104 can determine or select which ride hailing application to represent on graphical element 602 based on which ride hailing application was previously used (e.g., the last or latest one used). Navigation application 104 can determine or select which ride hailing application to represent on graphical element 602 based on which ride hailing application has the highest ranking or best reviews.

In some implementations, graphical element 602 can include metadata for the ride hailing application. For example, graphical element 602 can include an image representing ride hailing application 112 and/or ride hailing service 152. Graphical element 602 can include information describing the amount of time the user will have to wait before being picked up by a vehicle associated with the ride hailing service. Graphical element 602 can include information describing the number of passengers that the vehicle can carry. Graphical element 602 can include information describing an estimate of the fare charged by ride hailing service 152 for transporting the user from start location 302 to destination location 208.

In some implementations, navigation application 104 can invoke ride hailing extension 112 when GUI 600 is invoked. For example, to enable graphical element 602 to present information describing the services provided by ride hailing application 112, navigation application 104 can invoke ride hailing extension 112 to obtain the information presented on graphical element 602. For example, navigation application 104 can invoke ride hailing extension 112 and user device 102 can run ride hailing extension as a background process on user device 102. Navigation application 104 can send start location 302 and destination location 208 to ride hailing extension 112 so that ride hailing extension 112 can communicate with ride hailing service 152 over network 170 to obtain wait times, passenger capacity, and/or fare amounts from ride hailing service 152 for transporting the user of user device 102 from start location 302 to destination location 208. After receiving the ride information (e.g., wait times, passenger capacity, and/or fare amounts), ride hailing extension 112 can send the ride information to navigation application 104 for presentation on graphical element 602.

In some implementations, graphical element 602 can include graphical element 604 for selecting ride hailing service 152 and/or ride hailing application 112. For example, GUI 600 can present multiple instances of graphical element 602 representing different ride hailing applications installed on user device 102. The user can select a ride hailing application or service to use for travelling from start location 302 to destination location 208 by selecting graphical element 604 corresponding to the service the user wishes to use. In some implementations, the user can view additional ride hailing services by pulling up (e.g., dragging, swiping, etc.) graphical element 306 to invoke GUI 700 of FIG. 7.

Figure 7:
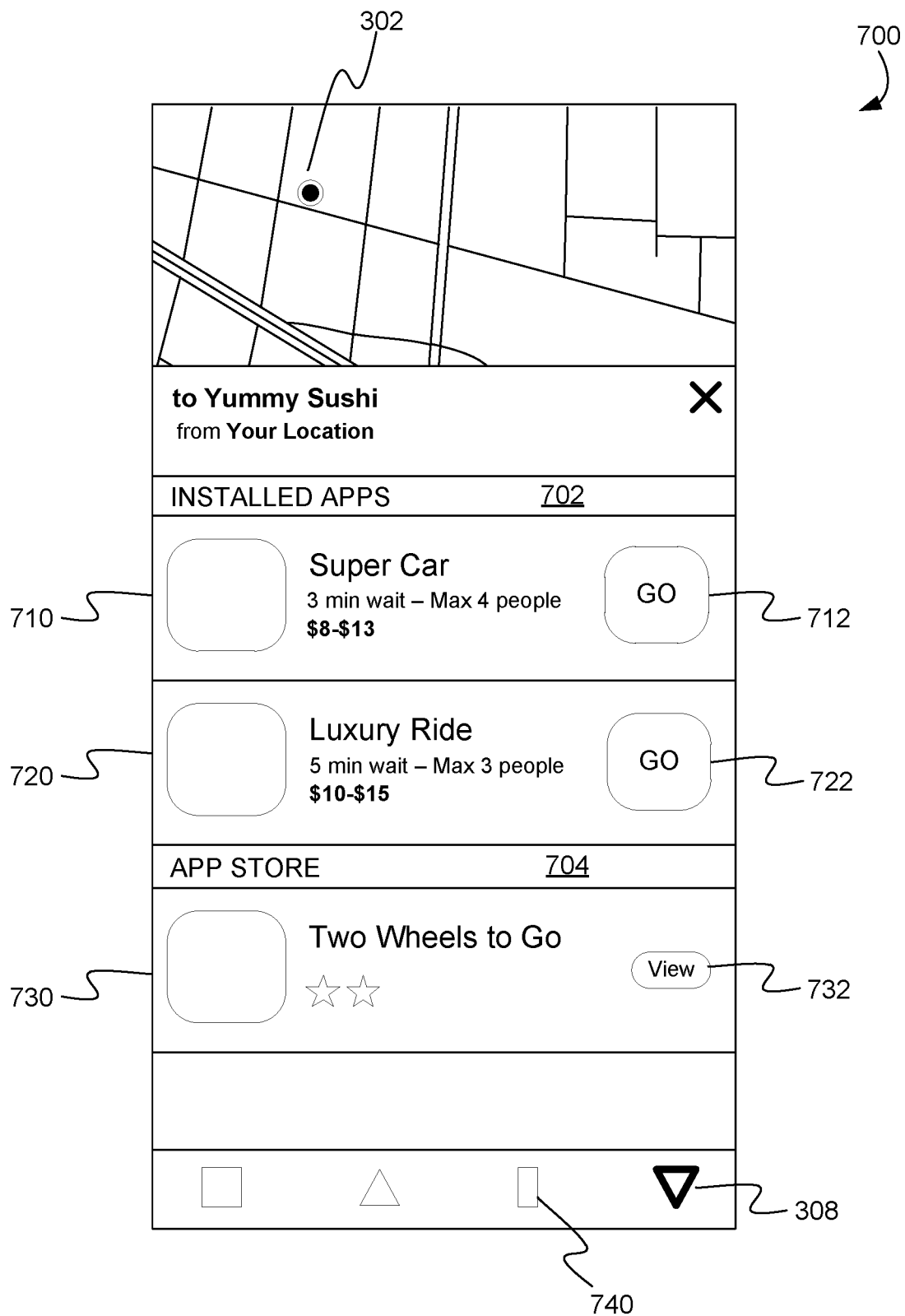
FIG. 7 illustrates an example graphical user interface for presenting different ride hailing services.

FIG. 7 illustrates an example graphical user interface 700 for presenting different ride hailing services. For example, navigation application 104 can present GUI 700 in response to a user manipulating (e.g., pulling, dragging, swiping in an upward direction) graphical element 306 on FIG. 7.

In some implementation, GUI 700 can present ride hailing applications that have been installed on user device 102. For example, navigation application 104 can determine which ride hailing applications have been installed on user device 102 can present graphical elements 710 and/or 720 representing the installed ride hailing applications. For example, graphical element 710 can correspond to graphical element 602 of GUI 600. Graphical elements 710 and 720 can be ordered, from top to bottom, based on which ride hailing application or service provides the shortest wait time, the least cost, or is most frequently used on user device 102. Graphical elements 710 and 720 can be ordered, from top to bottom, based on which ride hailing application was previously used (e.g., the last or latest one used). Graphical elements 710 and 720 can be ordered, from top to bottom, based on which ride hailing application has the highest ranking or best reviews.

As described above, graphical elements 710 and 720 can include metadata for their corresponding ride hailing application. For example, each graphical element 710 and 720 can include an image representing a corresponding ride hailing application and/or ride hailing service. Each graphical element 710 and 720 can include information describing the amount of time the user will have to wait before being picked up by a vehicle associated with the respective ride hailing service. Each graphical element 710 and 720 can include information describing the number of passengers that the respective vehicles can carry. Each graphical element 710 and 720 can include information describing an estimate of the fare charged by the respective ride hailing services for transporting the user from start location 302 to destination location 208.

In some implementations, navigation application 104 can invoke ride hailing application extensions (e.g., ride hailing application extension 114) for each ride hailing application represented by GUI 700. For example, to enable graphical elements 710 and 720 to present information describing the services provided by their respective ride hailing applications, navigation application 104 can invoke ride hailing application extensions for each ride hailing application installed on user device 102 to obtain the information presented on graphical elements 710 and 720. For example, navigation application 104 can invoke ride hailing extension 112 and user device 102 can execute ride hailing extension as a background process on user device 102. Navigation application 104 can send start location 302 and destination location 208 to ride hailing extension 112 so that ride hailing extension 112 can communicate with ride hailing service 152 over network 170 to obtain wait times, passenger capacity, and/or fare amounts from ride hailing service 152 for transporting the user of user device 102 from start location 302 to destination location 208. After receiving the ride information (e.g., wait times, passenger capacity, and/or fare amounts), ride hailing extension 112 can send the ride information to navigation application 104 for presentation on graphical element 710. A similar process can be used to obtain the ride information presented on graphical element 720.

In some implementations, graphical elements 710 and 720 can include graphical elements 712 and 722, respectively, for selecting a ride hailing service (e.g., ride hailing service 152) and/or ride hailing application (e.g., ride hailing application 112). The user can select a ride hailing application or service to use for travelling from start location 302 to destination location 208 by selecting graphical element 712 or 722 corresponding to the service the user wishes to use. In response to selecting graphical element 712 or 722, navigation application 104 can present GUI 800 of FIG. 8 to initiate a ride reservation with the corresponding ride hailing service.

In some implementations, GUI 700 can provide a way for the user to compare ride hailing services. For example, since GUI 700 presents prices, wait times, capacities, etc., for each ride hailing application installed on user device 102, the user can easily compare prices, wait times, capacities by viewing GUI 700 and select the ride hailing application that best suits the user. GUI 700 can also provide a mechanism for the user to compare ride hailing applications with public transit options. For example, the user can select graphical element 740 to invoke a GUI (not shown) that presents public transit options (e.g., buses, trains, etc.), corresponding fares, and travel times for traveling between the user's start location and destination location.

Figure 8:
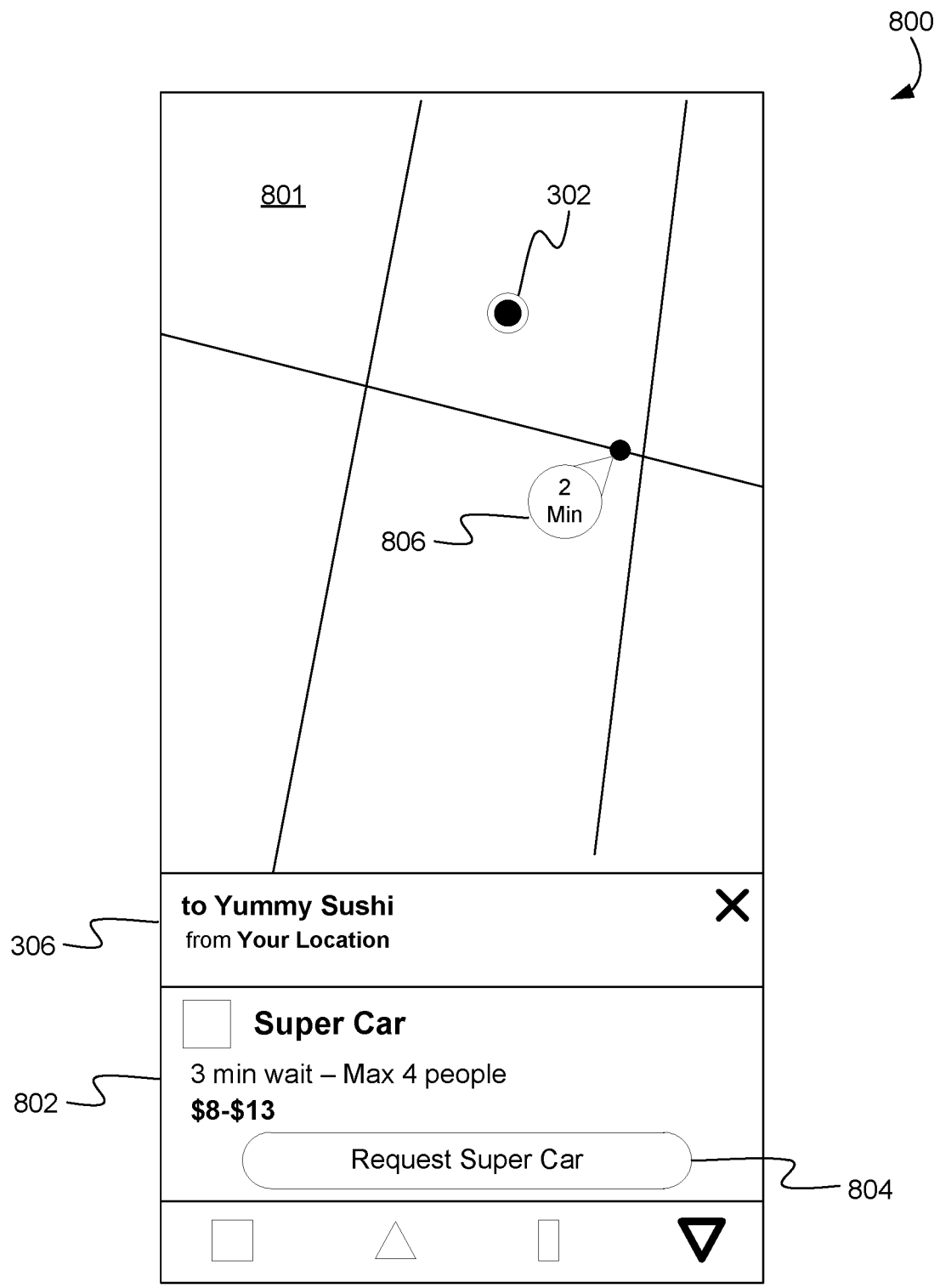
FIG. 8 illustrates an example graphical user interface for initiating a ride reservation with a selected ride hailing service.

FIG. 8 illustrates an example graphical user interface 800 for initiating a ride reservation with a selected ride hailing service. For example, navigation application 104 can present GUI 800 in response to the user selecting graphical element 712 of FIG. 7. GUI 800 can include graphical element 306 to identify the user's route, as described above.

In some implementations, GUI 800 can include map 801. For example, map 801 can provide a detailed (e.g., zoomed in) map view of the user's immediate surroundings. Map 801 can include graphical element 806 representing a pick up point for the selected ride hailing service. For example, the pickup point can be determined by navigation application 104 or received from ride hailing service 152 through ride hailing application extension 112. Alternatively, pickup point 806 can be specified by the user by selecting (e.g., tapping, touching, etc.) a location on map 801. Map 801 can be scaled and/or positioned such that both starting point 302 (e.g., current location) and pickup point 806 are easily viewed on map 801. Thus, the user can easily determine how to reach pickup point 806 to meet a vehicle provided by the selected ride hailing service (e.g., ride hailing service 152).

In some implementations, GUI 800 can include graphical element 802 representing the selected ride hailing service and/or application. For example, graphical element 802 can include the name of the selected ride hailing service (e.g., ride hailing service 152) and/or ride hailing application (e.g., ride hailing application 112). Graphical element 802 can describe the amount of time the user will have to wait before being picked up by a vehicle associated with ride hailing service 125. Graphical element 802 can describe the number of passengers the vehicle associated with ride hailing service 125 can transport. Graphical element 802 can describe how much it will cost for the user to travel from the user's start location 302 to the user's destination location using ride hailing service 125.

In some implementations, graphical element 802 can include graphical element 804 for reserving or requesting transportation from the ride hailing service. For example, in response to receiving the selection of graphical element 804, navigation application 104 can initiate a ride transaction or ride reservation with ride hailing service 125 through ride hailing application extension 114.

In some implementations, navigation application 104 can determine whether the user has an account with the selected ride hailing service. For example, when GUI 800 is invoked, navigation application 104 can send a message to ride hailing extension 114 to confirm that the user of user device 102 has created a user account with ride hailing service 125. Ride hailing extension 114 can determine that the user has created an account (e.g., using data stored on user device 102) and send a message confirming that the user has an account with ride hailing service 125. If the user does not have an account with ride hailing service 125, then navigation application 104 can present a prompt suggesting that the user create an account with ride hailing service 125 in response to the user invoking GUI 800.

If the user has an account with ride hailing service 125, then navigation application 104 can initiate a ride transaction with ride hailing service 125 in response to the user selecting graphical element 804. For example, navigation application 104 can send a message to ride hailing extension 114 indicating that the user wishes to reserve a ride. The message can, for example, include ride transaction data, such as an identifier for the user, the fare amount, the number of passengers the vehicle should transport, and start location, the pickup location, and/or the destination location. Ride hailing extension 114 can then send the ride transaction data to ride hailing service 152 and ride hailing service 152 can reserve a ride for the user.

Figure 9:
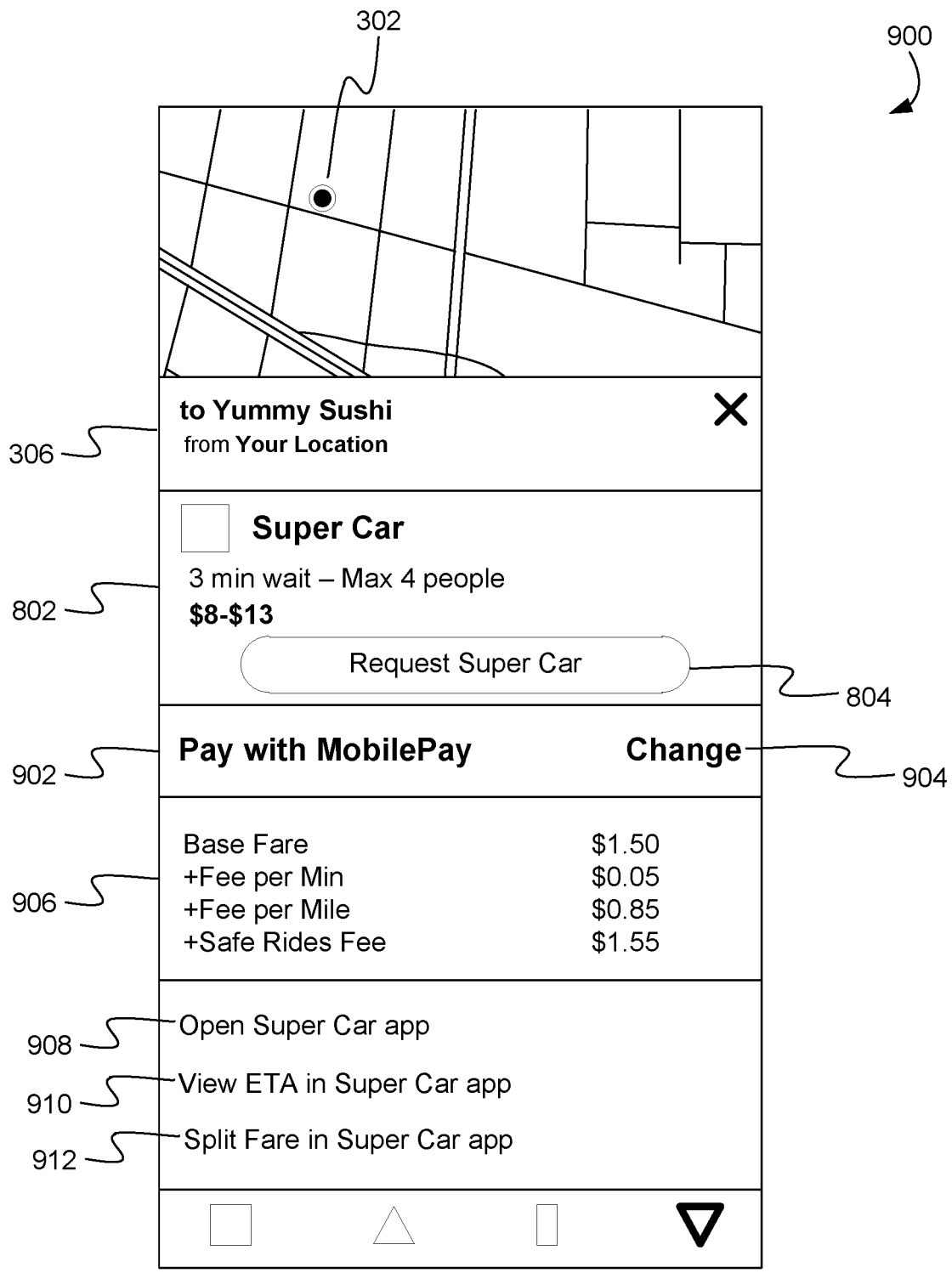
FIG. 9 illustrates an example graphical user interface for viewing details about a ride transaction.

FIG. 9 illustrates an example graphical user interface 900 for viewing details about a ride transaction. For example, before initiating a ride transaction or reserving a ride, the user can invoke GUI 900 to view details about the ride transaction. To invoke the ride transaction details, the user can pull up (e.g., swipe up, drag up, etc.) on graphical element 306 displayed on GUI 800 to cause navigation application 104 to present GUI 900. When graphical element 306 slides upward, graphical element 802 on GUI 800 can slide upward to reveal transaction details below.

In some implementations, GUI 900 can include graphical element 902 representing a payment method configured for the user's ride hailing service account. For example, the user can configure an account with ride hailing service 152 and specify a payment method for paying a ride fare (e.g., transportation cost). If the user wishes to change the payment method, the user can select graphical element 904 to invoke ride hailing application 112. The user can then change the payment method and finish the ride transaction in ride hailing application 112. For example, when invoking ride hailing application 112, navigation application 104 can send ride transaction state information indicating where in the ride transaction the user selected to invoke ride hailing application 112. Thus, when invoked by navigation application 104, ride hailing application 112 can continue the transaction started in navigation application 104.

In some implementations, GUI 900 can include graphical element 906 detailing the costs of the ride fare for the current transaction. For example, navigation application 104 can receive the ride fare details from ride hailing application extension 114 when invoking GUI 600, as described above.

In some implementations, GUI 900 can include graphical elements (not shown) for providing options to pay before, during, or after the ride. For example, instead of paying the ride fare when the ride is ordered (e.g., in response to selecting graphical element 804), the user can select a graphical element to defer payment until after the ride has started (e.g., during the ride), or after the ride has completed. In these cases, the details of the cost of the ride fare, payment mechanisms, and selectable payment authorization graphical element (e.g., button) can be presented to the user when the ride sharing service notifies navigation application 104 that the ride has started or that the ride has completed. The use can then select the payment authorization graphical element to authorize payment of the cost of the ride fare.

In some implementations, GUI 900 can include graphical element 908 for invoking the ride hailing application corresponding to the selected ride hailing service. For example, the user may wish to finish the current ride transaction using ride hailing application 112. To finish the ride transaction, the user can select graphical element 908 to invoke ride hailing application 112. As described above, when invoking ride hailing application 112, navigation application 104 can send ride transaction state information indicating where in the ride transaction the user selected to invoke ride hailing application 112. Thus, when invoked by navigation application 104, ride hailing application 112 can continue the transaction started in navigation application 104.

In some implementations, GUI 900 can include graphical element 910 for invoking the ride hailing application to view the estimated time of arrival (ETA) of the selected ride. For example, the user may wish to view the ETA for the selected ride using ride hailing application 112. To view the ETA for the selected ride using ride hailing application 112, the user can select graphical element 910 to invoke ride hailing application 112. When invoking ride hailing application 112 in response to receiving a user selection of graphical element 910, navigation application 104 can send ride transaction state information indicating where in the ride transaction the user selected graphical element 910 and indicating that the user wishes to view the ETA for the ride selected for the current transaction. Ride hailing application 112 can then present the ETA information for the ride selected for the current transaction.

In some implementations, GUI 900 can include graphical element 912 for invoking the ride hailing application to split the ride fare for the selected ride. For example, the user may wish to split the ride fare for the selected ride using ride hailing application 112. To split the ride fare for the selected ride using ride hailing application 112, the user can select graphical element 910 to invoke ride hailing application 112. When invoking ride hailing application 112 in response to receiving a user selection of graphical element 912, navigation application 104 can send ride transaction state information indicating where in the ride transaction the user selected graphical element 910 and indicating that the user wishes to split the ride fare for the ride selected for the current transaction. Ride hailing application 112 can then present the ETA information for the ride selected for the current transaction.

In the examples provided above, ride hailing application 112 provides features for viewing the ETA of a ride (e.g., graphical element 910) and/or splitting a fare for a ride (e.g., graphical element 912). However, ride hailing application 112 can provide a greater or fewer number of features. GUI 900 can be dynamically adjusted to provide access to these features by presenting additional or fewer graphical elements (e.g., graphical elements 910, 912) for invoking these specific features of ride hailing application 112.

If the user wishes to proceed with the current ride transaction, the user can select graphical element 804 to reserve transportation from the user's starting location to the user's destination location. For example, navigation application 104 can send ride transaction data to ride hailing application extension 114, as described above.

Figure 10:
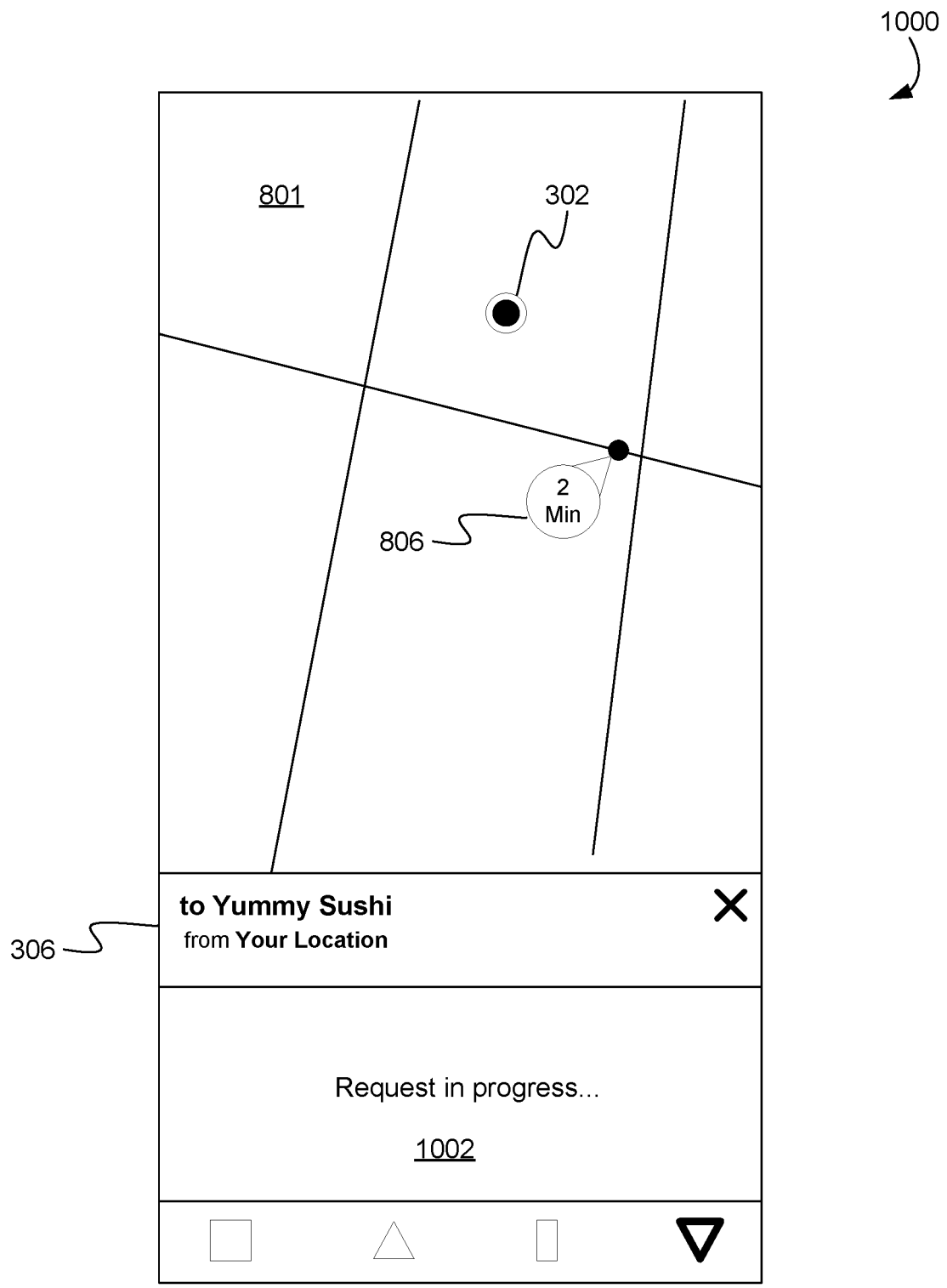
FIG. 10 illustrates an example graphical user interface indicating that a ride transaction is in progress.

FIG. 10 illustrates an example graphical user interface 1000 indicating that a ride transaction is in progress. For example, in response to receiving the user selection of graphical element 804, navigation application 104 can present GUI 1000. For example, when transitioning from GUI 900 to GUI 1000, graphical element 306 can slide downward on the display of user device 102 to reveal map 801, start location 302 and pickup location 806, as described above.

In some implementations, GUI 1000 can include graphical element 1002 presenting ride hailing service specific data. For example, graphical element 1002 can be an image provided to navigation application 104 by ride hailing application extension 114 in response to receiving ride transaction data from navigation application 104. Graphical element 1002 can be a ride hailing service provided image (e.g., branding, trademark, etc.) that indicates that the requested ride transaction (e.g., ride request) is in progress.

Figure 11:
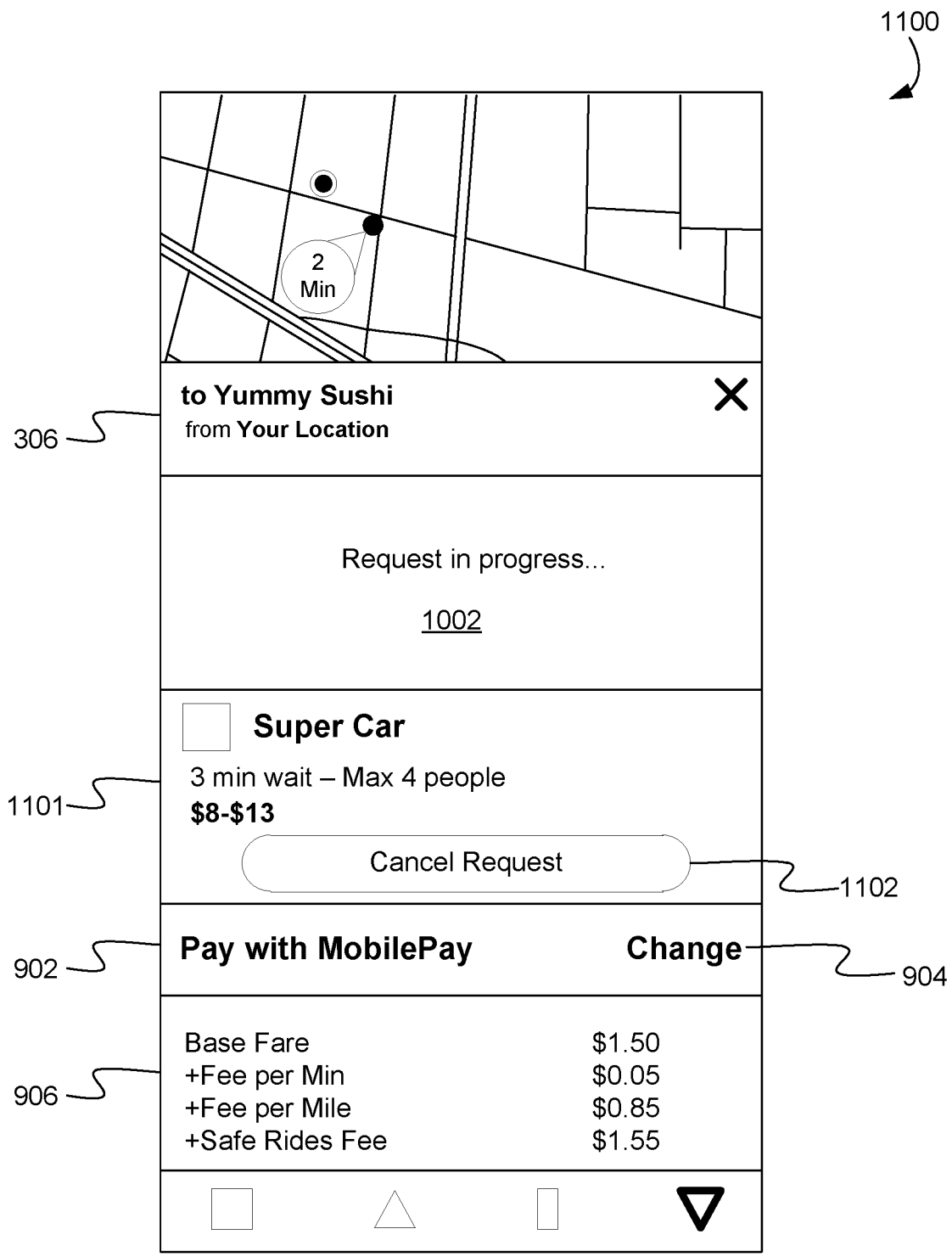
FIG. 11 illustrates an example graphical user interface for presenting transaction details for a pending ride transaction.

FIG. 11 illustrates an example graphical user interface 1100 for presenting transaction details for a pending ride transaction. Similar to GUI 900, GUI 1100 can be invoked by the user by pulling up (e.g., sliding up, swiping up, etc.) graphical element 306 to reveal the transaction details presented by graphical elements 1101, 902, 904, and 906. For example, graphical element 1101 can present similar information as graphical element 802.

However, instead of presenting graphical element 804 to request a ride, graphical element 1101 can present graphical element 1102 for canceling a ride transaction. For example, in response to receiving a user selection of graphical element 1102, navigation application 104 can invoke ride hailing application 112 so that the user can cancel the ride transaction using ride hailing application 112. As described above, navigation application 104 can invoke ride hailing application 112 and indicate to ride hailing application 112 that the user wishes to cancel the pending ride transaction so that ride hailing application can present the appropriate interface for canceling the ride transaction. GUI 900 can also include graphical element 1002 presenting ride hailing service specific information, as described above.

Figure 12:
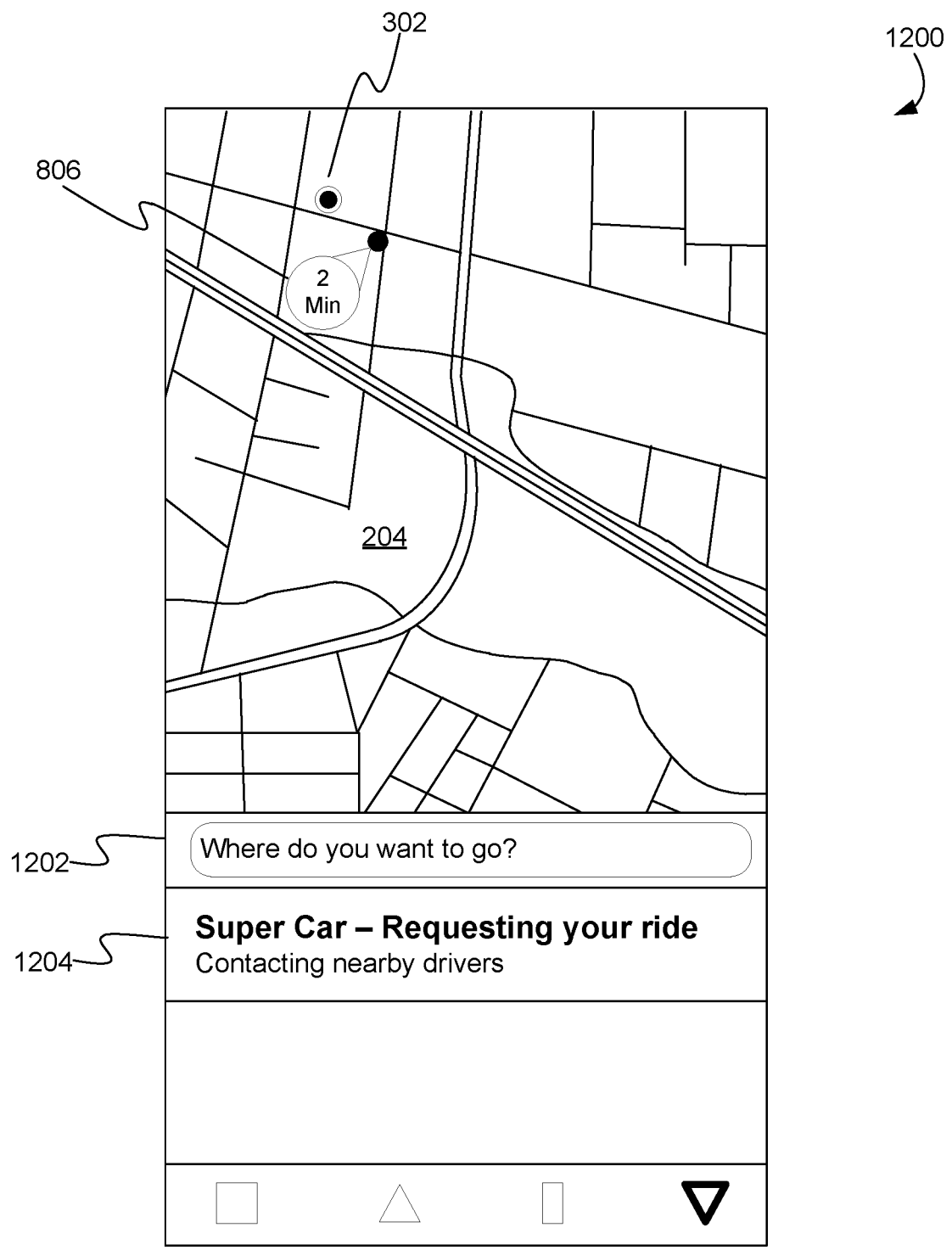
FIG. 12 illustrates an example graphical user interface for presenting ride transaction status information.

FIG. 12 illustrates an example graphical user interface 1200 for presenting ride transaction status information. For example, GUI 1200 can be presented by navigation application 104 when the user interacts with graphical element 1202 to input search parameters into navigation application 104. For example, GUI 1200 can include graphical element 1204 presenting the status of a pending ride transaction (e.g., ride request). Graphical element 1204 can be presented when the user is interacting with navigation application 104 in a manner unrelated to reserving a ride, for example.

In some implementations, GUI 1200 can include map 204. For example, when the geographical are presented by map 204 includes start location 302, pickup location 806, and/or destination location 208, map 204 can annotate these locations on map 204 with graphical objects and/or text indicating that a ride transaction associated with these locations is pending or that a ride reservation associated with these locations has been made.

Figure 13:
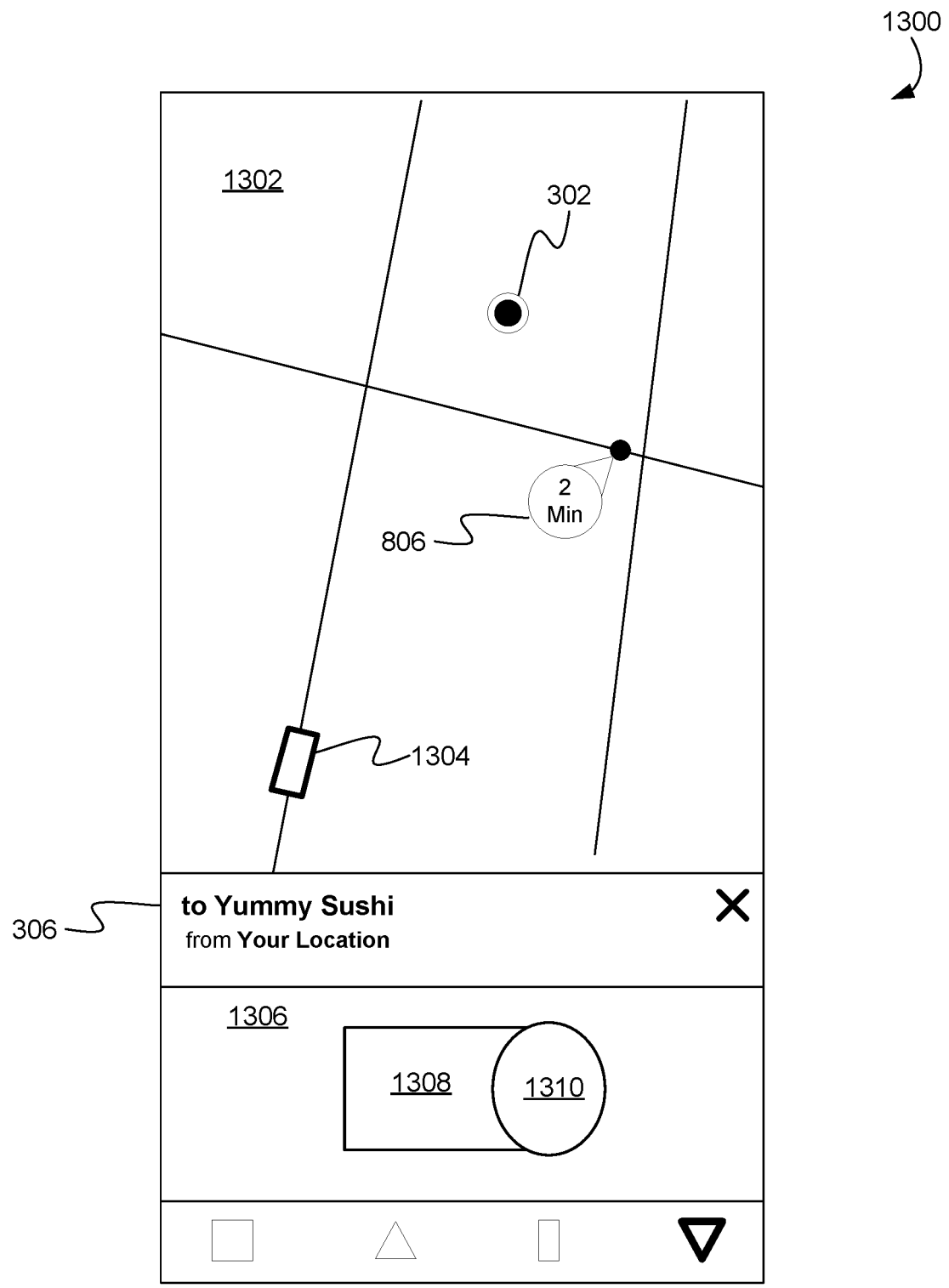
FIG. 13 illustrates an example graphical user interface confirming a ride reservation.

FIG. 13 illustrates an example graphical user interface 1300 confirming a ride reservation. For example, graphical user interface 1300 can be presented by navigation application 104 in response to receiving a ride confirmation message from riding hailing application extension 114 indicating that the requested ride was successfully reserved through ride hailing service 152. For example, the ride confirmation message can include a transaction identifier for the ride reservation. The ride confirmation message can include information identifying the vehicle (e.g., make, model, license plate number, image of the vehicle, etc.) reserved to give the user a ride to the user's destination. The ride confirmation can include information identifying the driver (e.g., name, face picture, telephone number, etc.) of the vehicle. The ride confirmation message can include fare information (e.g., payment method, fare details, etc.). In some implementations, the ride confirmation message can include the current location of the vehicle.

In some implementations, GUI 1300 can include map 1302. For example, map 1302 can represent a geographic area that includes the current location of the user 302, the pickup location 806, and the current location of the vehicle 1308. Map 1302 can be scaled, and rescaled, to fit location 302, location 806, and location 1308 within map 1302.

In some implementations, map 1302 can be updated periodically to show the progress of the vehicle reserved to transport the user to the user's destination. For example, receiving the ride confirmation message, navigation application 104 can periodically receive updates from ride hailing application extension 114 indicating the updated current location of the vehicle and navigation application 104 can update map 1302 to show the updated current location of the vehicle.

In some implementations, GUI 1300 can include graphical element 1306 for presenting ride hailing service specific information. For example, the ride confirmation message received from ride hailing extension 114 can include ride hailing service specific information (e.g., images, branding, trademarks, etc.) that ride hailing service wishes to present on GUI 1300. For example, graphical element 1306 can include a ride hailing service branded image that indicates that the ride was successfully reserved. Graphical element 1306 can include graphical element 1308 (e.g., image, photograph, etc.) representing the vehicle that will transport the user so that the user can identify the vehicle. Graphical element 1310 can include graphical element 1310 (e.g., a photograph, image, etc.) representing the driver of the vehicle so that the user can identify the driver. For example, graphical element 1308 and graphical element 1310 can be obtained by navigation application 104 from the ride confirmation message described above.

Figure 14:
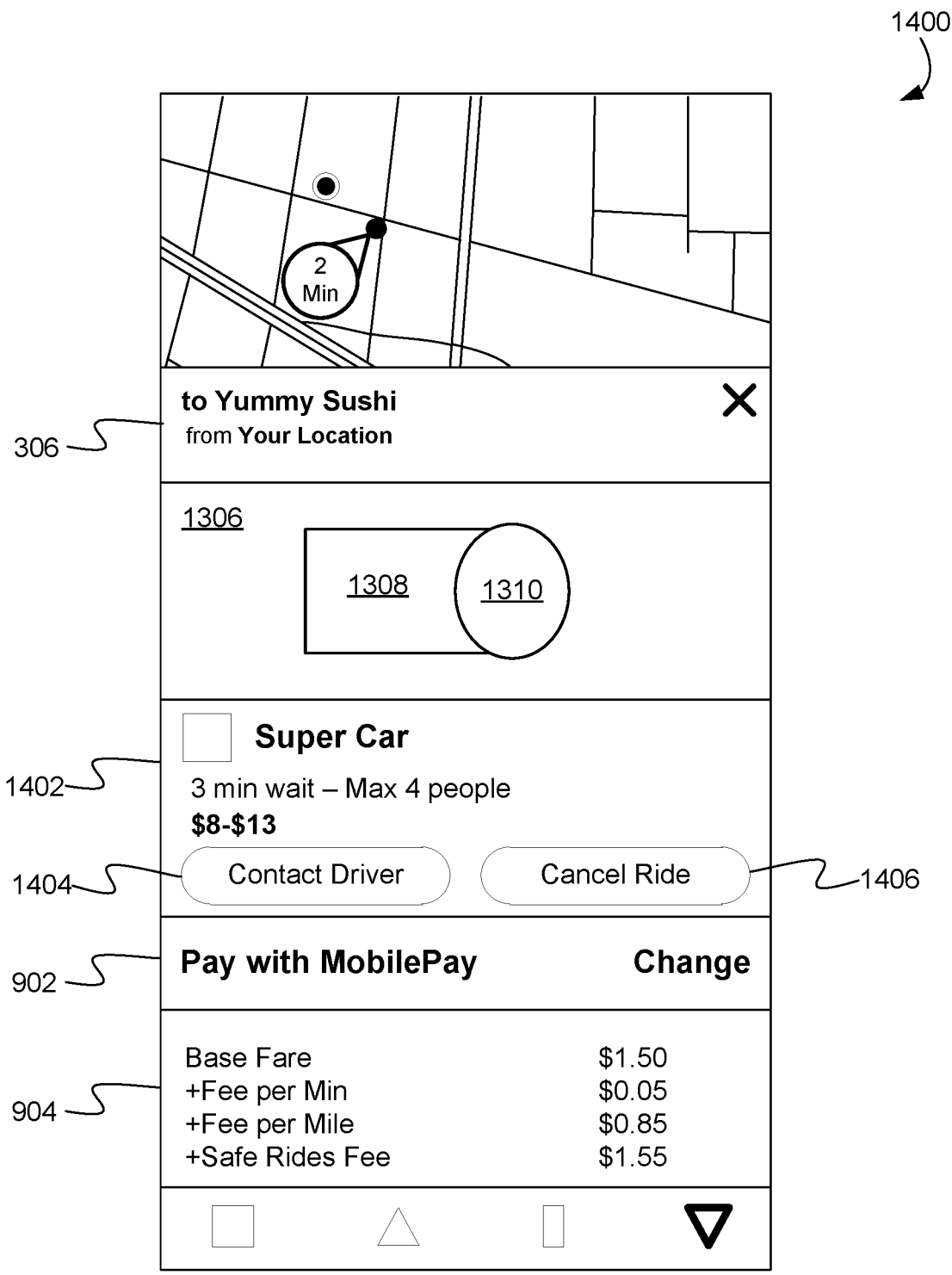
FIG. 14 illustrates an example graphical user interface for presenting details about a reserved ride.

FIG. 14 illustrates an example graphical user interface 1400 for presenting details about a reserved ride. For example, the user can invoke GUI 1400 by pulling up (e.g., swiping up, dragging up, etc.) graphical element 306 presented on GUI 1300. For example, GUI 1300 can include graphical element 306 describing the user's route, graphical element 1306 presenting ride hailing service specific information, graphical element 902 presenting information describing the user's payment method, and graphical element 904 detailing the fare.

In some implementations, GUI 1400 can include graphical element 1402. For example, graphical element 1402 can present similar information as graphical element 802. However, graphical element 1402 can include graphical element 1404 for contacting the driver who will be transporting the user to the user's destination. For example, in response to receiving a selection of graphical element 1404, navigation application 104 can invoke a telephony application and provide the telephony application the driver's phone number obtained from the ride confirmation message. The telephony application on user device 102 can then initiate a telephone call to the driver.

In some implementations, graphical element 1402 can include graphical element 1406 for canceling a reserved ride. For example, upon receiving a user selection of graphical element 1406, navigation application 104 can invoke ride hailing application 112. When invoking ride hailing application 112, navigation application 104 can send ride hailing application 112 a message indicating that the user wishes to cancel a reserved ride. For example, the message can include an identifier for the user and/or a ride transaction identifier so that the ride hailing application 112 can identify the reserved ride that the user wishes to cancel. Ride hailing application 112 can then present a GUI for initiating a cancellation of the reserved ride.

Figure 15:
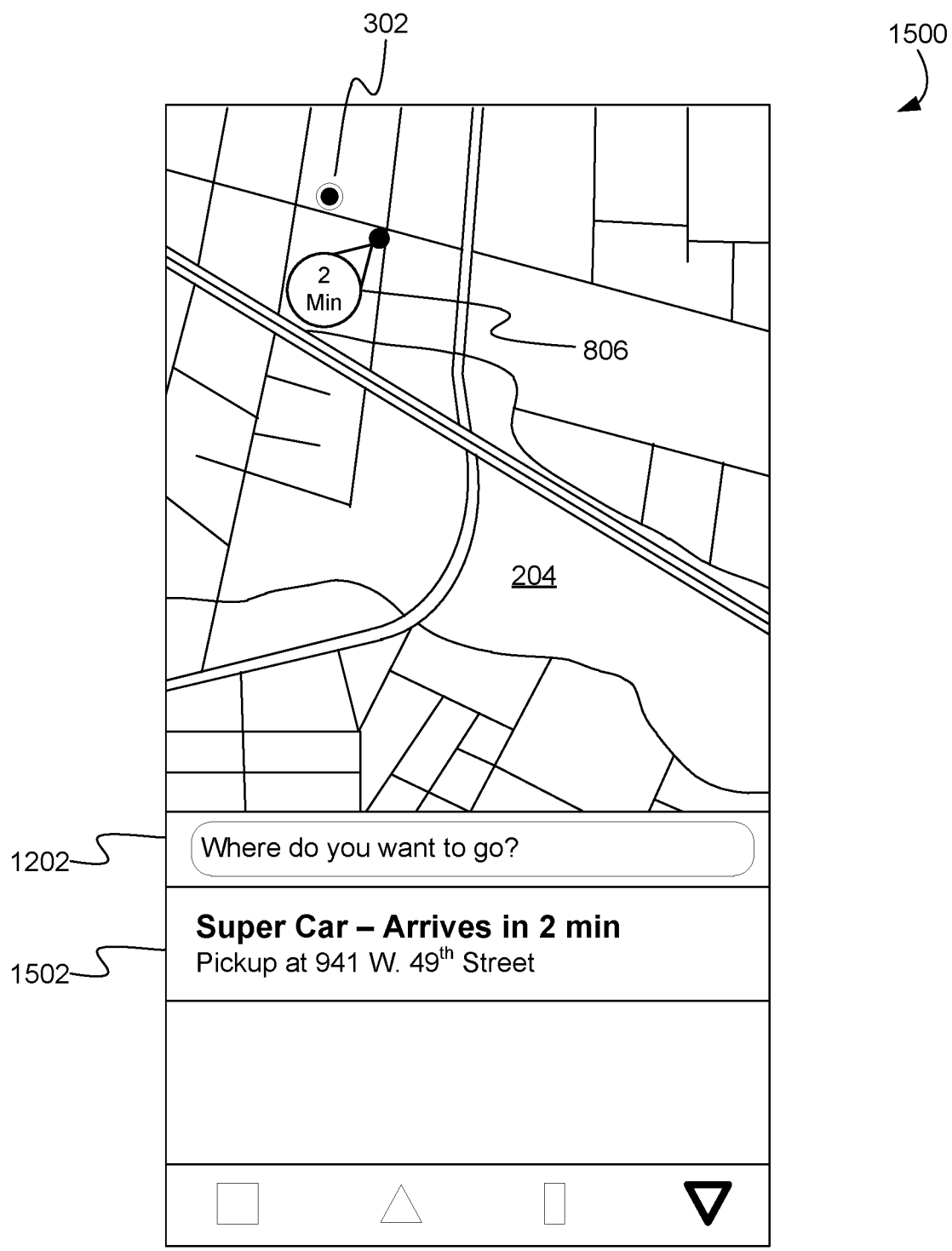
FIG. 15 illustrates an example graphical user interface for presenting the status of a reserved ride.

FIG. 15 illustrates an example graphical user interface 1500 for presenting the status of a reserved ride. For example, GUI 1500 can be similar to GUI 1200 of FIG. 12. However, instead of presenting graphical element 1204 indicating the ride request is in progress (e.g., being processed), GUI 1500 can include graphical element 1502 identifying the selected ride hailing service 152 and describing the arrival time and pickup location for the reserved ride.

In some implementations, the ride status information, map annotations, and other ride hailing data can be presented on GUIs of navigation application 104 even when the ride hailing reservation process was not performed through navigation application 104. For example, navigation application 104 can invoke ride hailing extension 114 when navigation application 104 is invoked by the user. When initializing, navigation application 104 can invoke the ride hailing application extensions of each ride hailing application installed on user device 102. After invoking each ride hailing application extension, navigation application 104 can request ride status information from each ride hailing application extension. Each extension can respond by sending navigation application 104 the status of ride reservations, if any, made using the corresponding ride hailing service. Navigation application 104 can then present ride status information as described with reference to FIG. 15 and or annotate maps presented by navigation application 104 to show the user's current location (e.g., start location), pickup location, and/or destination location, as indicated by the ride status information received from the respective ride hailing application extensions.

Reserving Tables in a Navigation Application

Figure 16:
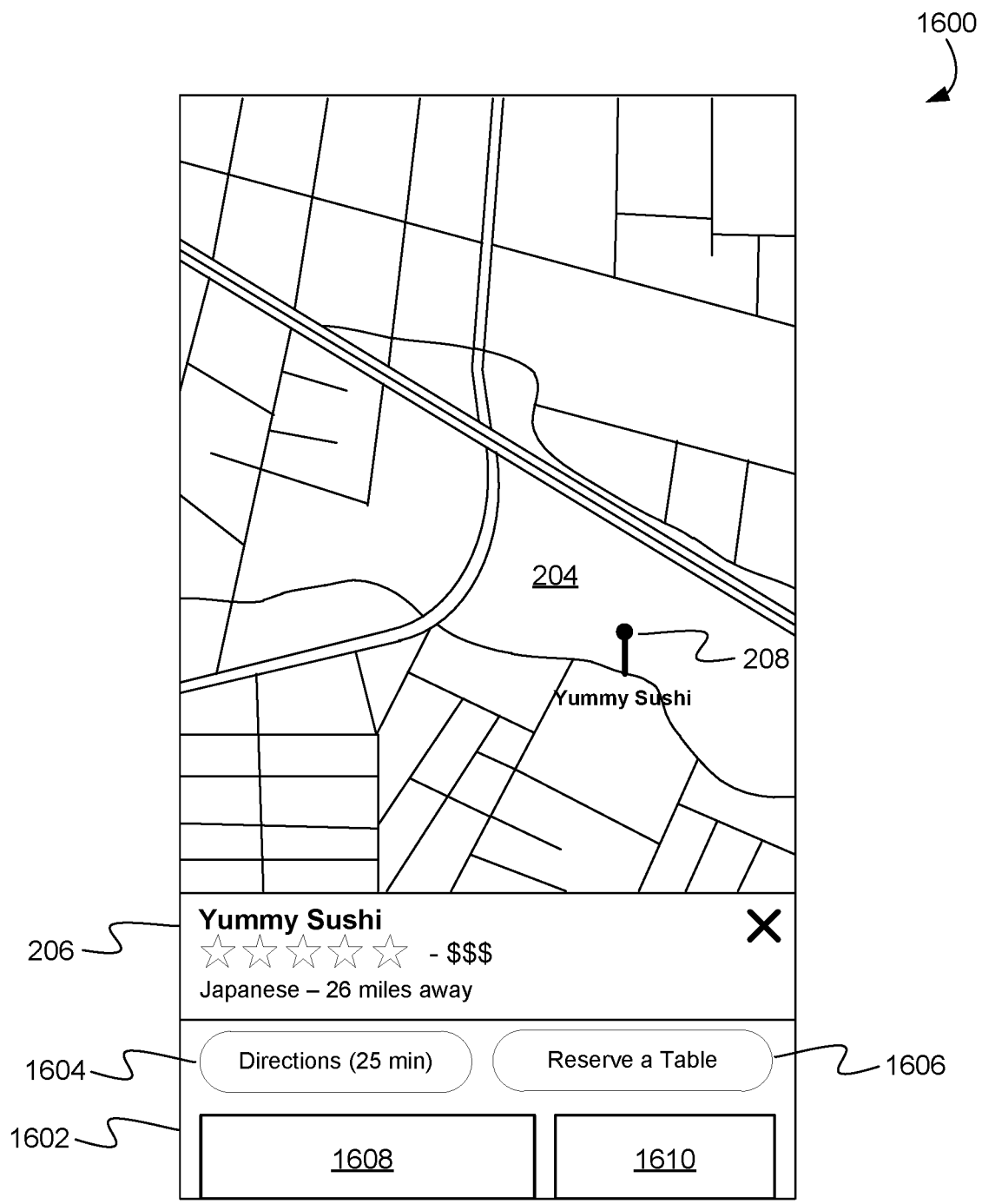
FIG. 16 illustrates an example graphical user interface for initiating a table reservation transaction from a navigation application.

FIG. 16 illustrates an example graphical user interface 1600 for initiating a table reservation transaction from a navigation application. For example, GUI 1600 can be presented by navigation application 104 on a display of user device 102 in response to the user selecting graphical element 206 of FIG. 2. For example, GUI 1600 can include map 204 and graphical element 208 representing the location of the restaurant represented by graphical element 206. Map 204 can be annotated near graphical element 208 to identify the name of the selected restaurant. In some implementations, GUI 1600 can include graphical element 206, as described above.

In some implementations, GUI 1600 can include graphical element 1602 for presenting restaurant specific information. For example, graphical element 1602 can include graphical element 1604 for presenting directions (e.g., a route) to location 208. When the user selects graphical element 1604, for example, navigation application 104 can present route and transportation options as described above with reference to FIG. 3 Graphical element 1602 can present graphical elements 1608 and 1610 (e.g., images, graphics, etc.) representing the restaurant décor, food served at the restaurant, etc.

In some implementations, graphical element 1602 can include graphical element 1606 for reserving a table at the selected restaurant. For example, the user can select graphical element 1606 to initiate a table reservation through navigation application 104.

Figure 17:
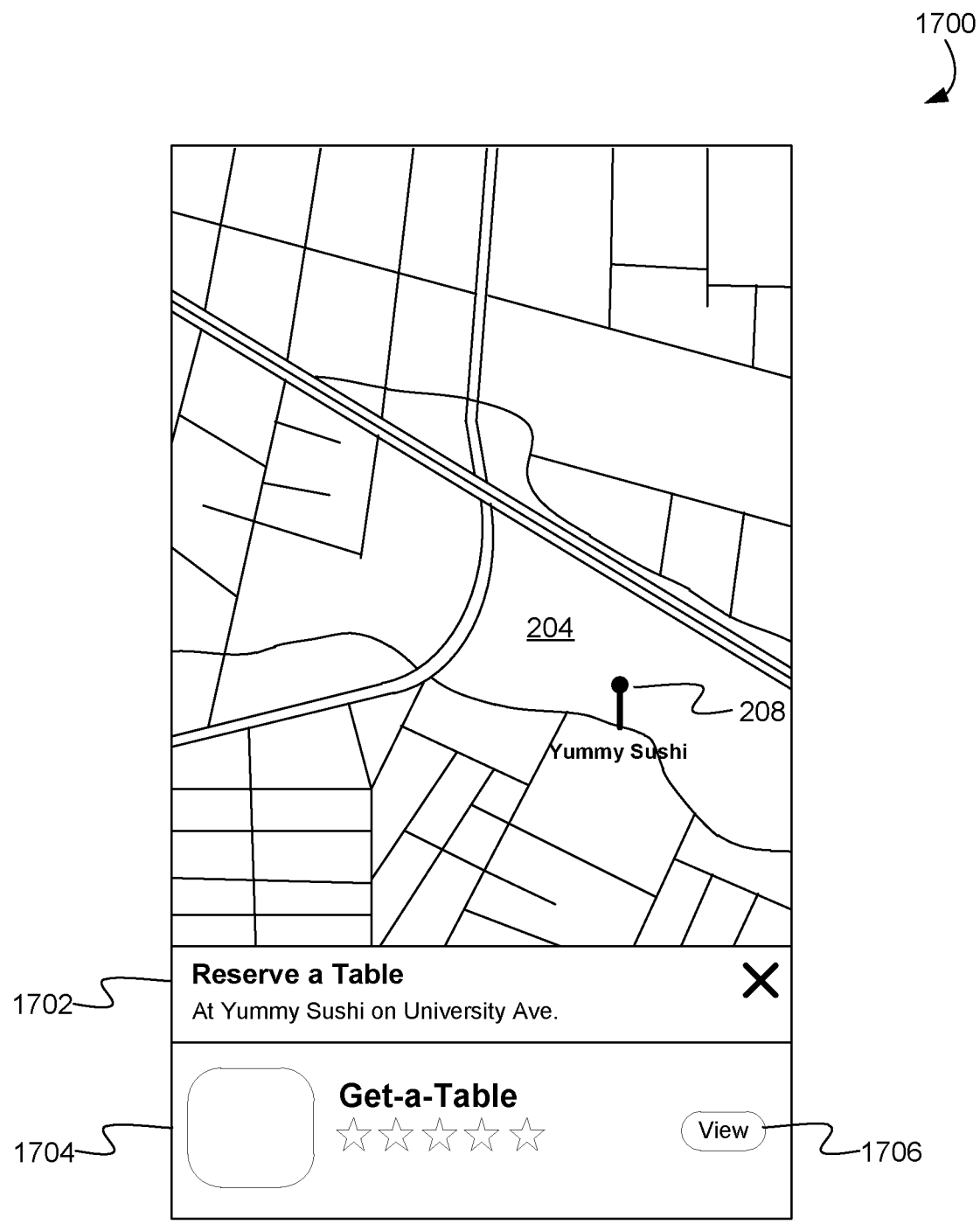
FIG. 17 illustrates an example graphical user interface for prompting a user to install a table reservation application on user device.

FIG. 17 illustrates an example graphical user interface 1700 for prompting a user to install a table reservation application on user device 102. For example, GUI 1700 can be presented by navigation application 104 in response to receiving the user selection of graphical element 1606 of FIG. 16. GUI 1700 can be presented when navigation application 104 determines that an appropriate table reservation application is not currently installed on user device 102.

In some implementations, navigation application 104 can determine a table reservation service associated with the selected restaurant. For example, when the user searches for a restaurant using GUI 200, navigation application 104 can request restaurant metadata from navigation service 132 in order to present graphical element 206. For example, navigation service 132 can maintain a database of points of interest (POIs), including restaurants. The database can include metadata for each restaurant POI, including the restaurant names, locations, images, ratings, and identifiers for table reservation services (e.g., table reservation applications) that service each restaurant POI. After receiving the restaurant metadata, navigation application can generate graphical element 206.

When the user invokes GUI 1700, navigation application 104 can determine which table reservation service (e.g., table reservation service 162) services the selected restaurant based on the restaurant metadata. Navigation application 104 can then determine whether the corresponding table reservation application (e.g., table reservation application 122) is installed on user device 102. If the corresponding table reservation application is not already installed on user device 102, navigation application 104 can prompt the user to install the appropriate table reservation application by presenting GUI 1700.

In some implementations, GUI 1700 can include graphical element 1702 indicating that user has selected to reserve a table at the selected restaurant. For example, graphical element 1702 can include the name and/or location of the selected restaurant.

In some implementations, GUI 1700 can include graphical element 1704 prompting the user to install the appropriate table reservation application, as described above. For example, graphical element 1704 can identify the appropriate table reservation application (e.g., table reservation application 122) and/or table reservation service (e.g., table reservation service 162) for servicing the selected restaurant.

In some implementations, graphical element 1704 can include graphical element 1706 for invoking an application store application on user device 102 so that the user can download and install the identified table reservation application onto user device 102 from application store 142.

Figure 18:
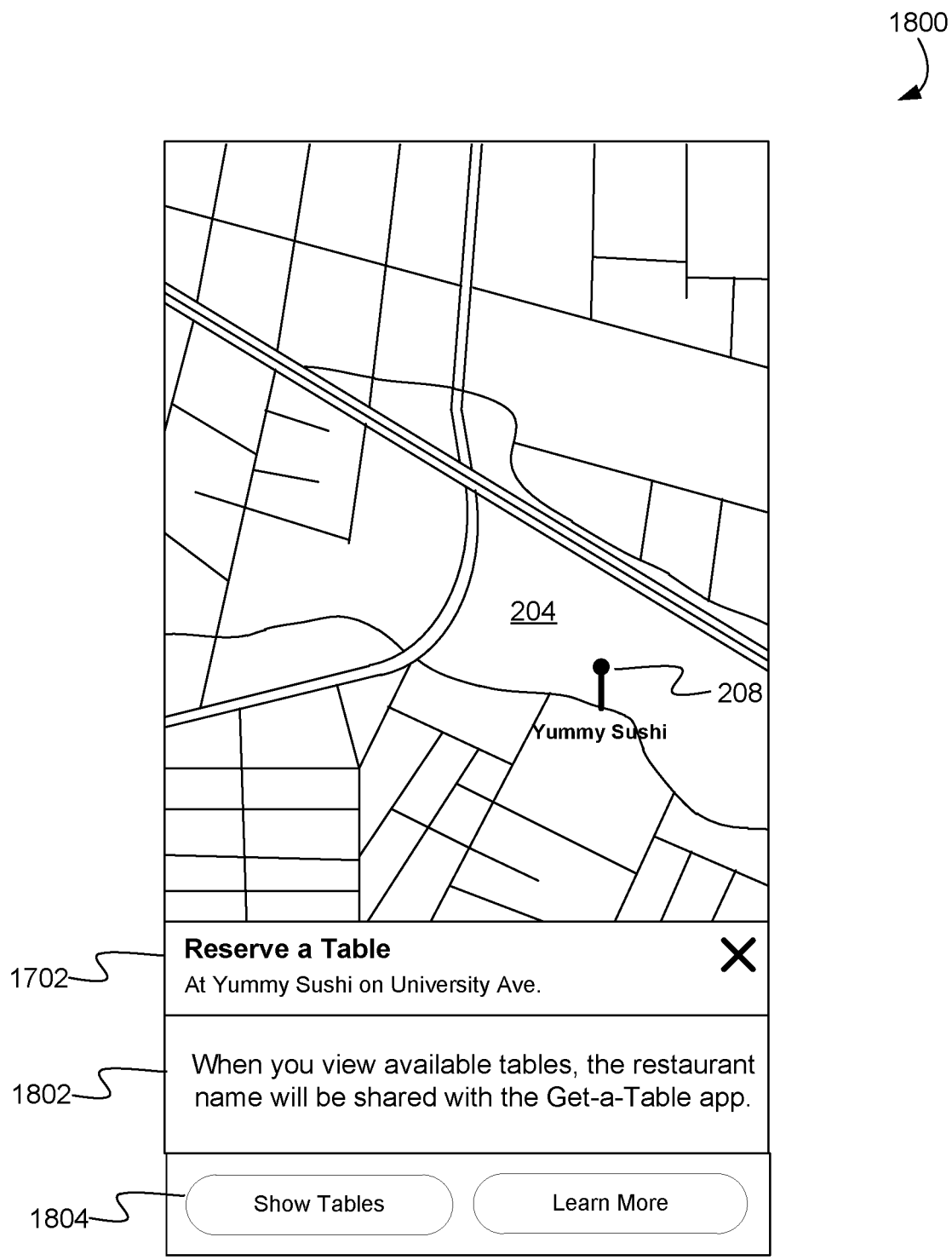
FIG. 18 illustrates an example graphical user interface for presenting a message about sharing restaurant information with a third party application.

FIG. 18 illustrates an example graphical user interface 1800 for presenting a message about sharing restaurant information with a third party application. For example, GUI 1800 can be presented by notification application 104 when a table reservation application is available (e.g. installed) user device 102. GUI 1800 can be presented in response to the user selecting the table reservation option (e.g., graphical element 1606) presented by GUI 1600.

In some implementations, GUI 1800 can include message 1802 informing the user that using the table reservation features of navigation application 104 will cause navigation application 104 to share the information describing the user's selected restaurant with a third party service. If the user accepts sharing the restaurant information, the user can select graphical element 1804 to allow navigation application 104 to share the restaurant information with an installed table reservation application (e.g., table reservation application 122) on user device 102.

In some implementations, GUI 1800 can be presented each time the user selects graphical element 1606 until the user selects graphical element 1804. For example, restaurant sharing message 1802 can be presented each time the user selects the table reservation option 1606 until the user indicates that the user authorizes sharing restaurant information with a table reservation application by selecting graphical element 1804.

Figure 19:
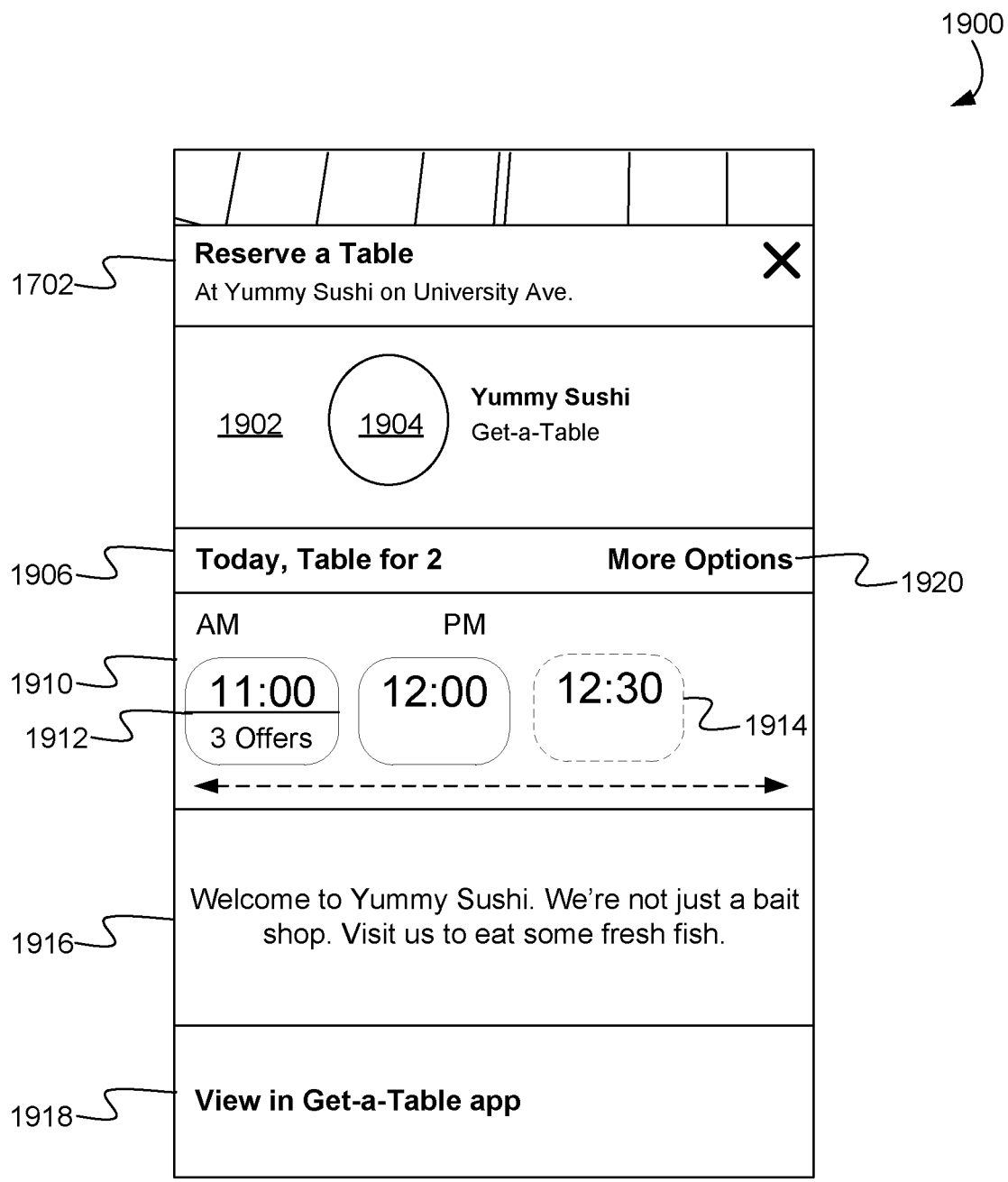
FIG. 19 illustrates an example graphical user interface presenting table reservation options.

FIG. 19 illustrates an example graphical user interface 1900 presenting table reservation options. For example, GUI 1900 can be presented by navigation application 104 in response to receiving a user selection of graphical element 1606 of FIG. 6 or graphical element 1804 of FIG. 18 when a table reservation application (e.g., table reservation application 122) is available (e.g., installed) on user device 102.

In some implementations, navigation application 104 can invoke table reservation application extension 124 when GUI 1900 is invoked. For example, GUI 1900 presents information specific to table reservation service 162. To obtain the service specific information and process table reservation requests, navigation application 104 can invoke and interact with table reservation application extension 124. For example, navigation application 104 can receive table reservation service specific images, messages, and/or available table information from table reservation application extension 124, as described below.

In some implementations, GUI 1900 can include graphical element 1702. For example, graphical element 1702 can be slid upward from its position on GUI 1700 and/or GUI 1800 to reveal or make room for the other graphical elements presented on GUI 1900.

In some implementations, GUI 1900 can include graphical element 1902. For example, graphical element 1902 can be an image or graphic specific to (e.g. representing) the table reservation service corresponding to the application extension invoked by navigation application 104. For example, graphical element 1902 can include branding and/or a table reservation service specific message. Graphical element 1902 can identify (e.g., name) the selected restaurant. Graphical element 1902 can identify (e.g., name) the table reservation service. In some implementations, graphical element 1902 can include graphical element 1904. For example, graphical element 1904 can be an image or graphic specific to (e.g., representing) the selected restaurant. For example, navigation application 104 can receive graphical elements 1902 and/or 1904 from table reservation application extension 124 when the extension is invoked.

In some implementations, GUI 1900 can include graphical element 1906. For example, graphical element 1906 can indicate for which day the user is interested in making a reservation and/or the number of people for which a table is needed. When first invoked, GUI 1900 can present default values for the day (e.g., today) and the number of people (e.g., 2). The default day and number of people can be obtained by navigation application 104 from table reservation application extension 124, for example.

In some implementations, GUI 1900 can include graphical element 1910 representing reservation time and status information for the selected restaurant. For example, graphical element 1910 can include graphical elements 1912 and 1914 that represent times (e.g., time slots) throughout the selected day for which table reservations are typically made. By default, the times represented on graphical element 1910 can be for the immediate future (e.g. the next two hours after the current time). For example, graphical element 1912 can represent an 11:00 AM reservation time (e.g., 11:00 am-11:30 am timeslot). Graphical element 1912 can indicate the status of the reservation time. For example, graphical element 1912 can indicate that three tables are available.

Similarly, graphical element 1914 can represent a 12:30 PM reservation time (e.g., 12:30-1:00 PM timeslot). However, because there are no tables available at 12:30 PM, graphical element 1914 can be greyed out, diminished, or otherwise modified to indicate that no tables are available at the time represented by graphical element 1914. In some implementations, the user can provide input (e.g., a left or right swipe gesture) to scroll graphical elements 1912 and/or 1914 to view graphical elements and status information related to other reservation times. Navigation application 104 can receive the available table information from table reservation application extension 124 when GUI 1900 is invoked, for example.

In some implementations, GUI 1900 can include graphical element 1916 for presenting a restaurant specific message. For example, GUI 1900 can present a greeting or other message for the restaurant, as provided to navigation application 104 by table reservation application extension 124.

In some implementations, GUI 1900 can include graphical element 1918 for invoking table reservation application 122. For example, when the user selects graphical element 1918, navigation application 104 can invoke table reservation application 122 and provide transaction state information indicating where in the current table reservation process or transaction the user currently is. For example, when selected from GUI 1900, navigation application 104 can invoke table reservation application 122 and indicate that the user is viewing or selecting table reservation parameters for the selected restaurant. Table reservation application 122 can then present a GUI on the display of user device 102 that presents table reservation parameters for the selected restaurant so that the user can continue with the table reservation process in table reservation application 122.

Figure 20:
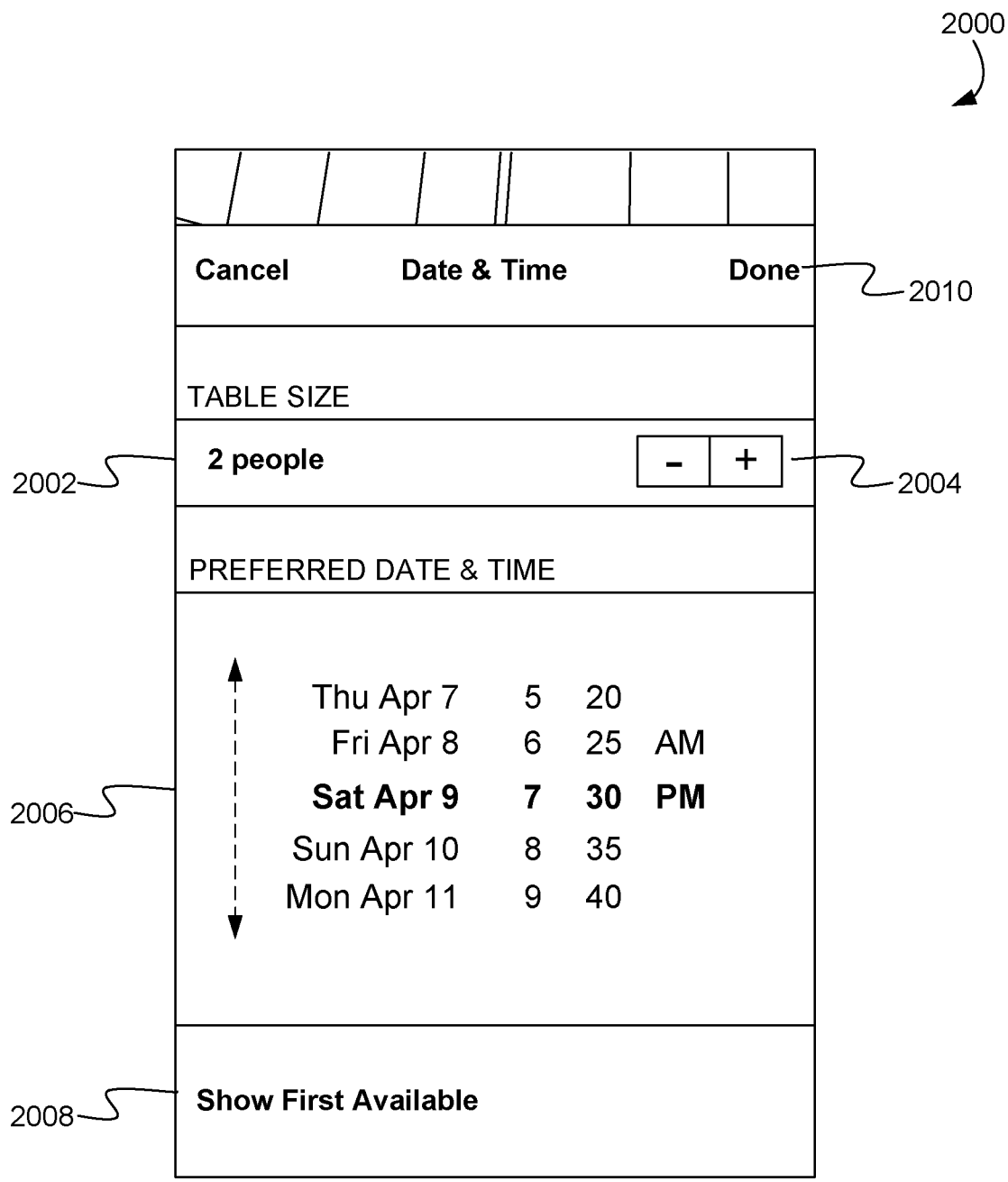
FIG. 20 illustrates an example graphical user interface for specifying table reservation parameters.

In some implementations, if the user wishes to change the default reservation parameters, the user can select graphical element 1920 to invoke GUI 2000 of FIG. 20 and change the table reservation parameters.

FIG. 20 illustrates an example graphical user interface 2000 for specifying table reservation parameters. For example, GUI 2000 can be invoked in response to the user selecting graphical element 1920 of FIG. 19. In some implementations, GUI 2000 can include graphical element 2002 for selecting the table size or number of people for the reservation. The user can select graphical element 2004 to increase or decrease the number of people for the reservation.

In some implementations, GUI 2000 can include graphical element 2006 for specifying a reservation time. For example, the user can provide input (e.g., a swipe gesture) to scroll dates and/or times until the desired date and time is highlighted on graphical element 2006.

In some implementations, GUI 2000 can include graphical element 2008 for selecting the first available time. For example, the user may wish to view the first available time slot for making a table reservation. The user can select graphical element 2008 to instruct navigation application 104 to present the first available reservation.

In some implementations, GUI 2000 can include graphical element 2010 for indicating that the user is finished selecting table reservation parameters. For example, in response to the user selecting graphical element 2010, navigation application 104 can send the newly selected parameters to table reservation application extension 124. For example, navigation application 104 can send the table size, the date, and the time presented or selected on GUI 2000. If the user selects graphical element 208, navigation application 104 can send an indication that the user wishes to view the first available reservation time. Table reservation extension 114 can send the table reservation parameters to table reservation service 162. Table reservation service 162 can determine which table reservation times correspond the specified parameters and return table reservation availability information determined according to the specified parameters to table reservation application extension 114. Table reservation application extension 114 can send the table reservation availability information to navigation application so that navigation application 104 can present the requested table reservation availability information on GUI 2100 of FIG. 21.

Figure 21:
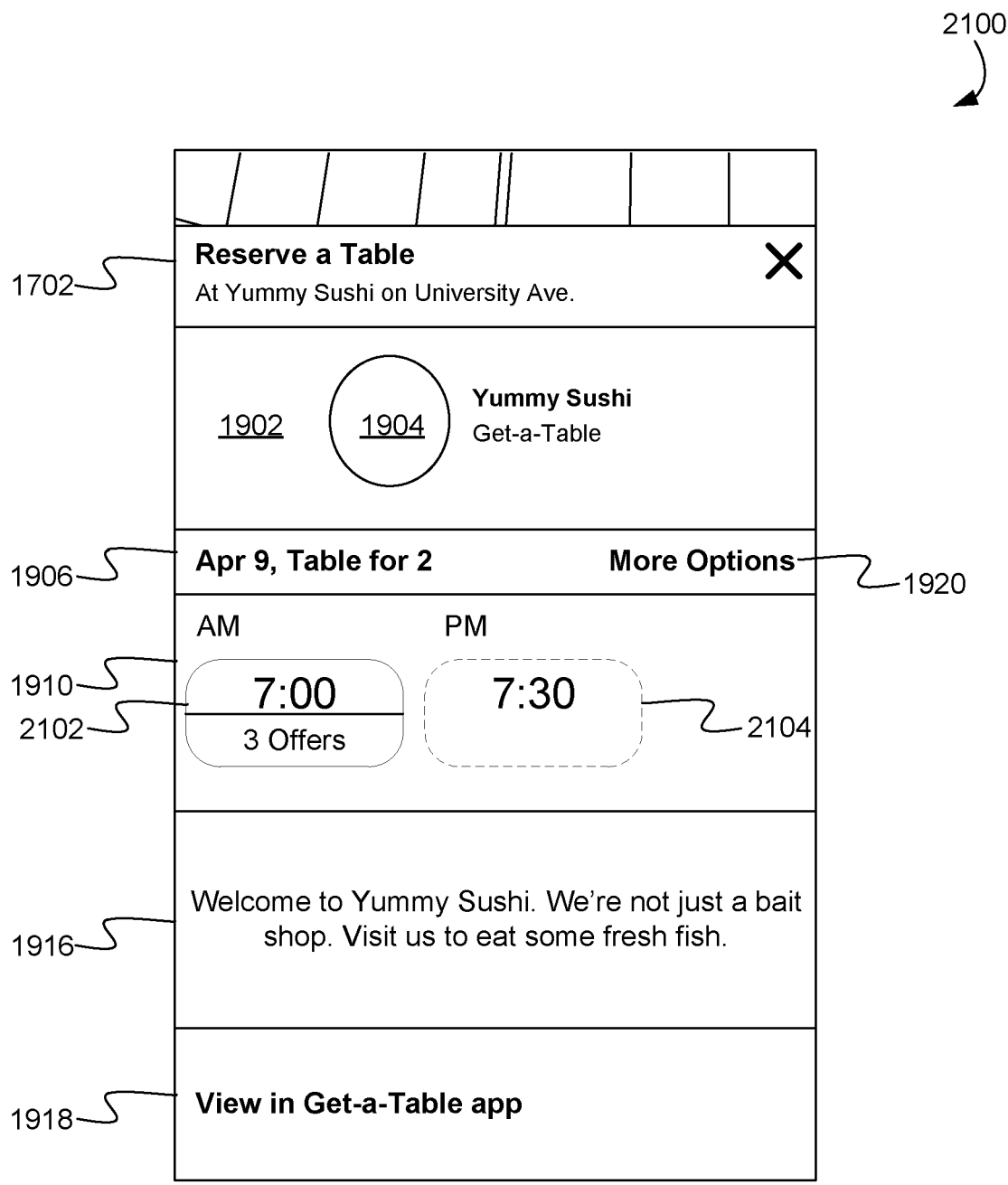
FIG. 21 illustrates an example graphical user interface for presenting available table reservations according to user specified parameters.

FIG. 21 illustrates an example graphical user interface 2100 for presenting available table reservations according to user specified parameters. For example, GUI 2100 can be invoked in response to the user selecting graphical element 2010 or graphical element 2008 of FIG. 20. GUI 2100 can correspond to GUI 1900, for example. However, instead of presenting available reservations for a default date and time in graphical element 1910, graphical element 1910 can present graphical elements 2102 and/or 2104 representing the availability of tables at the user-specified date and time. Similarly, graphical element 1906 can be updated to reflect the user-specified date and table size.

Figure 22:
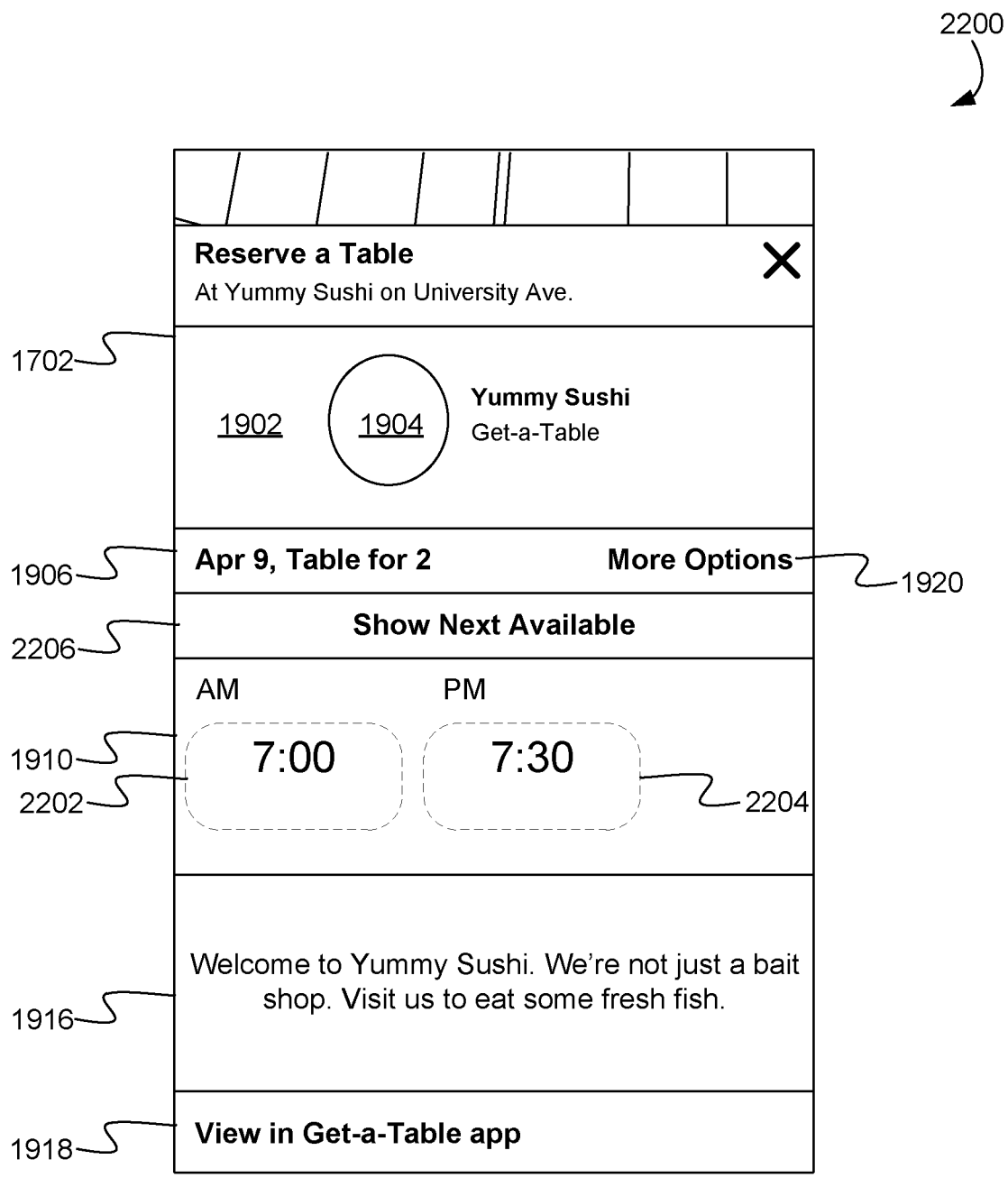
FIG. 22 illustrates an example graphical user interface for presenting an option to view the next available table reservation.

FIG. 22 illustrates an example graphical user interface 2200 for presenting an option to view the next available table reservation. For example, GUI 2200 can correspond to GUI 2100 described above. However, in this case, there are no reservations available for the date, time, and table size specified by the user, as indicated by diminished graphical elements 2202 and 2204. Instead of selecting graphical element 1920 to select new table reservation parameters, the user can select graphical element 1906 to view the next available table reservation. In response to receiving the user selection of graphical element 2206, navigation application 104 can send a request to table reservation application extension 114 for the next available table that can accommodate the specified number of people. Table reservation extension 114 can obtain table availability information from table reservation service 162 and return the table availability information to navigation application 104 so that navigation application 104 can present the next available table to the user using GUI 1900, 2100, or 2200.

Figure 23:
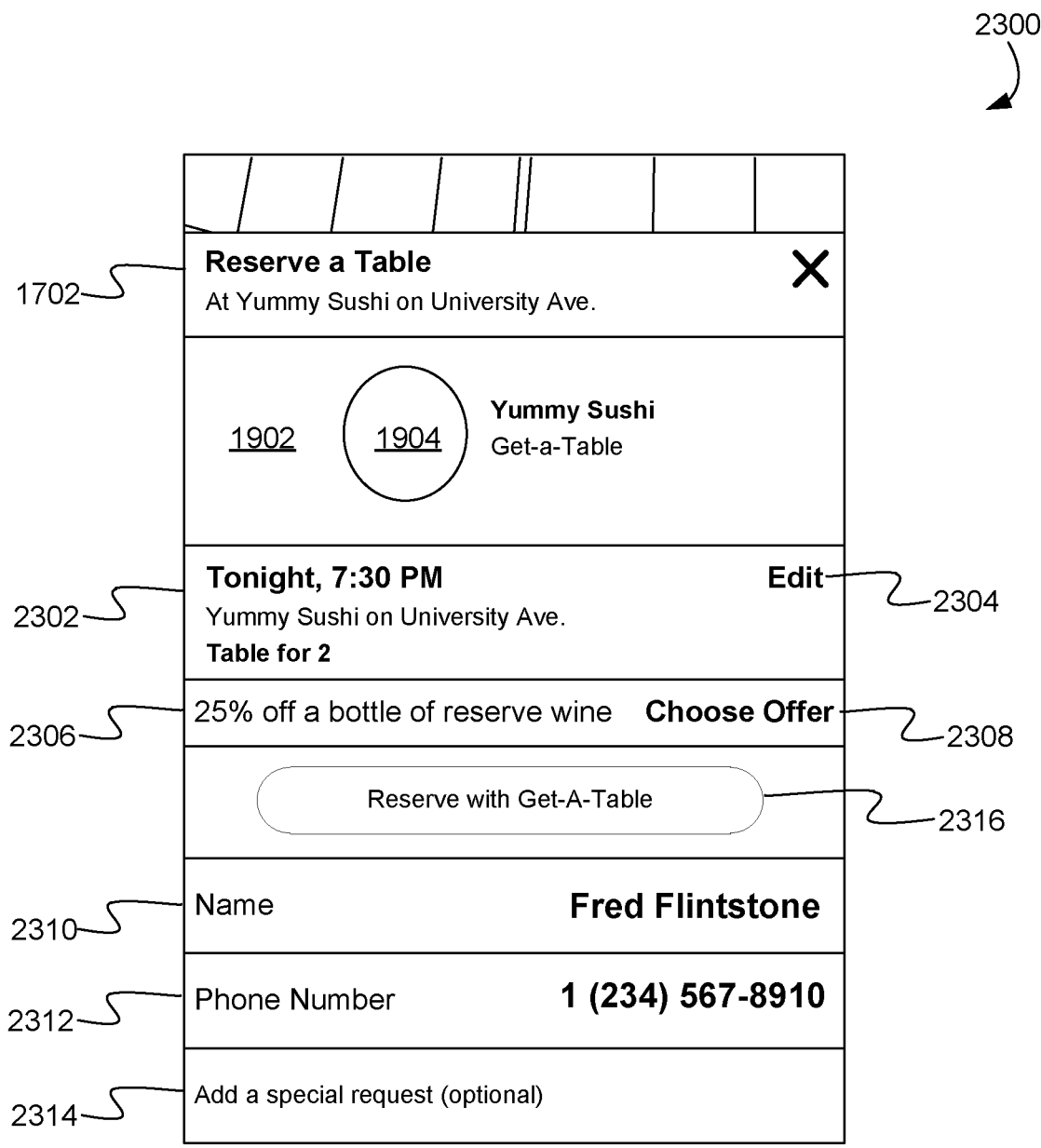
FIG. 23 illustrates an example graphical user interface for presenting details about an available table reservation.

FIG. 23 illustrates an example graphical user interface 2300 for presenting details about an available table reservation. For example, GUI 2300 can be invoked in response to the user selecting an available table (e.g., graphical element 1912, graphical element 2102). GUI 2300 can include graphical element 1702 and graphical element 1902, as described above.

In some implementations, GUI 2300 can include graphical element 2302 describing the selected table reservation. For example, graphical element 2302 can present information describing the date and time of the selected table reservation, identifying the restaurant and location of the restaurant, and identifying the table size for the selected reservation. Graphical element 2302 can include graphical element 2304 for editing the selected table reservation. For example, in response to selecting graphical element 2302, navigation application 104 can present GUI 2000 of FIG. 20.

In some implementations, GUI 2300 can include graphical element 2306. For example, graphical element 2306 can present a special offer offered by the selected restaurant. For example, special offer information can be provided by table reservation application extension 114 when sending available table information to navigation application 104, as described above. Graphical element 2306 can include graphical element 2308 for invoking GUI 2400 so that the user can select an offer from among the various offers offered by the selected restaurant. Graphical element 2306 can describe the currently selected offer, for example.

In some implementations, GUI 2300 can include graphical element 2310 (e.g., a text input control) for entering a person's name under which the reservation should be held. For example, the user of user device 102 can select graphical element 2310 to invoke a virtual keyboard for entering the user's name or some other person's name for the reservation. Similarly, GUI 2300 can include graphical element 2312 for entering a telephone number for contacting the named person and/graphical element 2314 that allows the user to specify special requests. Graphical elements 2310, 2312 and/or 2314 can be filled by navigation application 104 with default values received from table reservation extension 114. The default values can be based on previous interactions with table reservation service 162 and/or user account information configured with table reservation service 162. However, the user may not need an account with table reservation service 162 in order to make table reservations. The user can provide input to graphical elements 2310, 2312 and/or 2314 to change the default values as desired.

In some implementations, GUI 2300 can include graphical element 2316 for requesting a table reservation. For example, after selecting an available table reservation and confirming or providing the information presented by graphical elements 2302, 2310, 2312 and/or 2314, the user can select graphical element 2316 to request the table reservation presented on GUI 2300.

In some implementations, in response to receiving the user selection of GUI 2300, navigation application 104 can send the table reservation information presented on GUI 2300 (e.g., restaurant identifier, date, time, table size, user name, telephone number, special requests, etc.) to table reservation application extension 124. Table reservation application extension can send the table reservation information to table reservation service 162 and table reservation service can attempt to reserve a table at the specified restaurant according to the reservation parameters in the received table reservation information.

After table reservation service 162 reserves the table, table reservation service 162 can send a table reservation confirmation message to table reservation extension 114 and table reservation extension 114 can send a table reservation confirmation message to navigation application 104 confirming that the requested table was successfully reserved. The table reservation confirmation message can include, for example, the restaurant identifier, the reservation date, the reservation time, the reservation table size, the user name, telephone number, and/or special requests, as described above.

Figure 24:
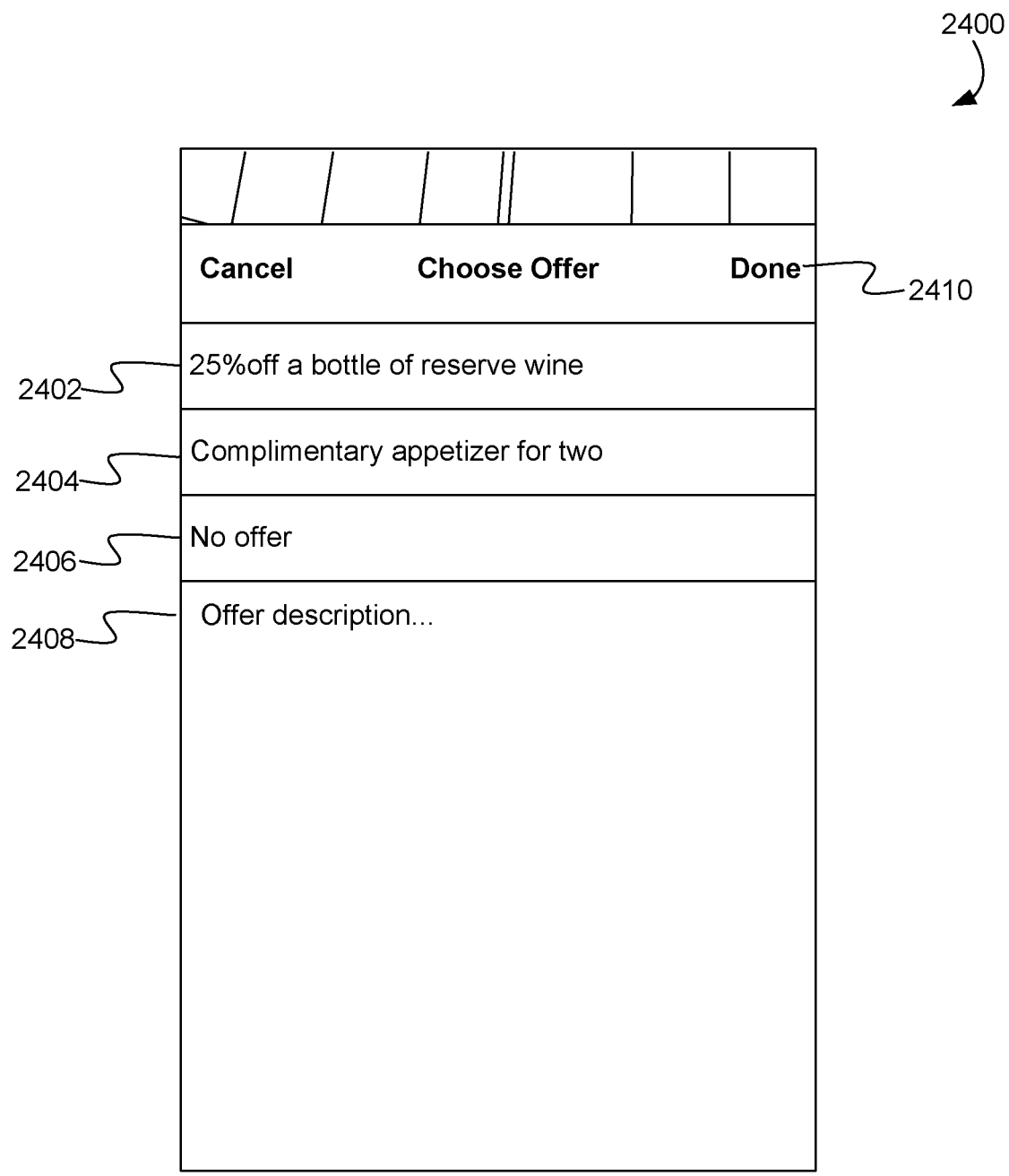
FIG. 24 illustrates an example graphical user interface for presenting offers from the selected restaurant.

FIG. 24 illustrates an example graphical user interface 2400 for presenting offers from the selected restaurant. For example, GUI 2400 can be presented by navigation application 104 in response to the user selecting graphical element 2308 of FIG. 23. GUI 2400 can include graphical elements 2402, 2404, and/or 2406 representing offers from the selected restaurant, for example. The user can select an offer (e.g., graphical element 2402) to cause navigation application 104 to present a description of the selected option on graphical element 2408. After the user has decided which offer to accept and has selected the offer, the user can select graphical element 2410 to close GUI 2400 can apply the selected offer to the reservation, as described above with reference to FIG. 23.

Figure 25:
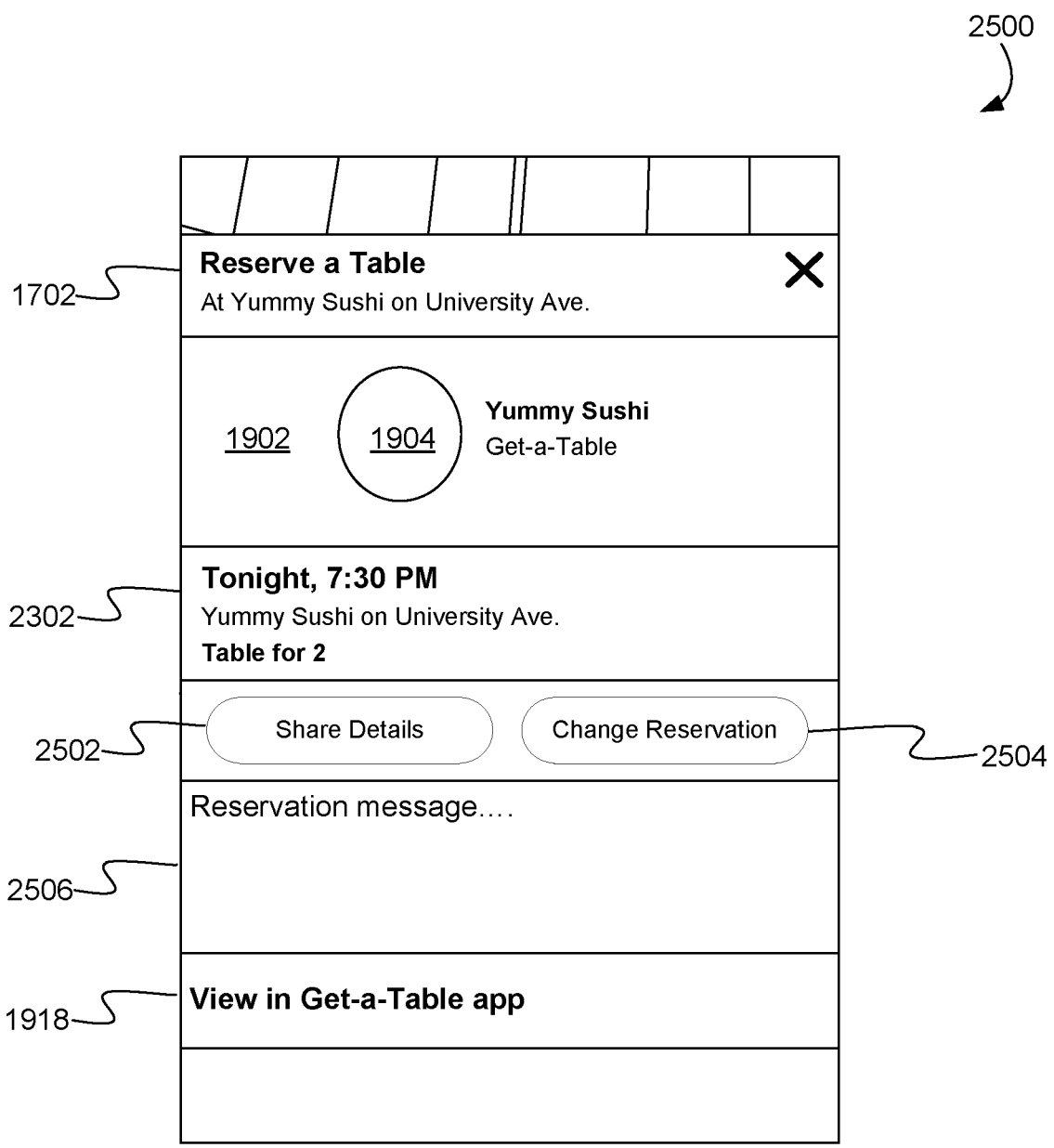
FIG. 25 illustrates an example graphical user interface for presenting information about a confirmed table reservation.

FIG. 25 illustrates an example graphical user interface 2500 for presenting information about a confirmed table reservation. For example, navigation application 104 can present GUI 2500 in response to receiving a table reservation confirmation for the requested table reservation, as described above with reference to FIG. 23. GUI 2500 can include similar features as GUI 2300. For example, GUI 2500 can include graphical element 1702, graphical element 1902, graphical element 2302 and/or graphical element 1918, as described above.

In some implementations, GUI 2500 can include graphical element 2502 for sharing the details of the confirmed table reservation. For example, the user can select graphical element 2502 to invoke graphical interfaces for sharing the table reservation details, such as restaurant name, restaurant location, reservation date, reservation time, table size, etc. The user can provide input to cause navigation application 104 to share the reservation details by sending an email, text message, or social media message according to well-known mechanisms.

In some implementations, GUI 2500 can include graphical element 2504 for changing a table reservation. For example, the user can select graphical element 2504 to cause navigation application 104 to invoke table reservation application 122. When invoked, table reservation application 122 can present a graphical user interface that allows the user to change the confirmed table reservation.

In some implementations, GUI 2500 can include graphical element 2506 for presenting a table confirmation message. For example, graphical element 2506 can present a table confirmation message generated by table reservation service 162 and/or the selected restaurant and received by navigation application 104 in the table reservation confirmation message described above.

Figure 26:
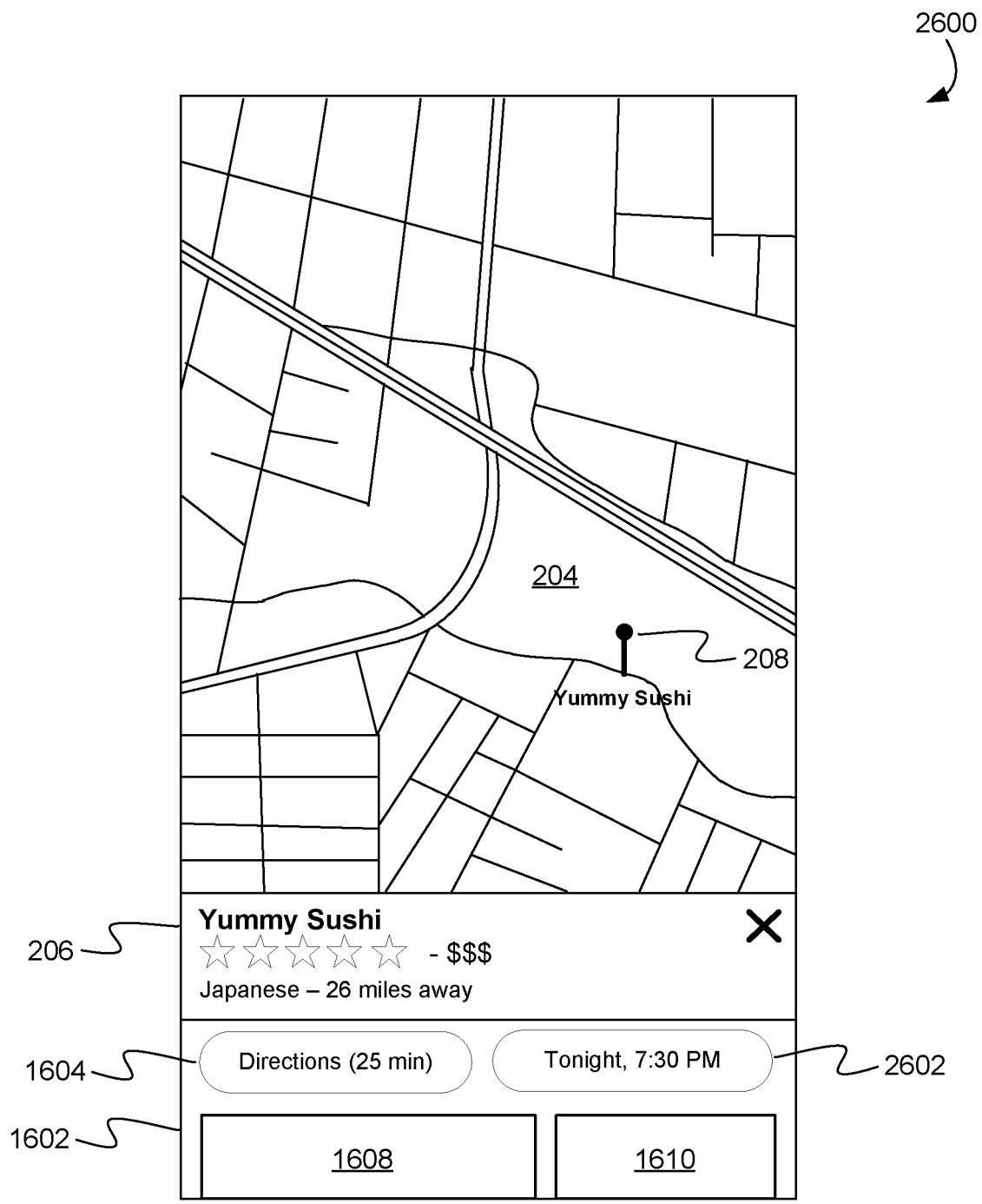
FIG. 26 illustrates an example graphical user interface for indicating an existing reservation at a selected restaurant.

FIG. 26 illustrates an example graphical user interface 2600 for indicating an existing reservation at a selected restaurant. For example, GUI 2600 can correspond to GUI 1600 of FIG. 16. However, instead of presenting graphical element 1606 for reserving a table, GUI 2600 presents graphical element 2602 indicating that a table has already been reserved at the selected restaurant. The user can select graphical element 2602 to cause navigation application 104 to present GUI 2500 of FIG. 25.

Figure 27:
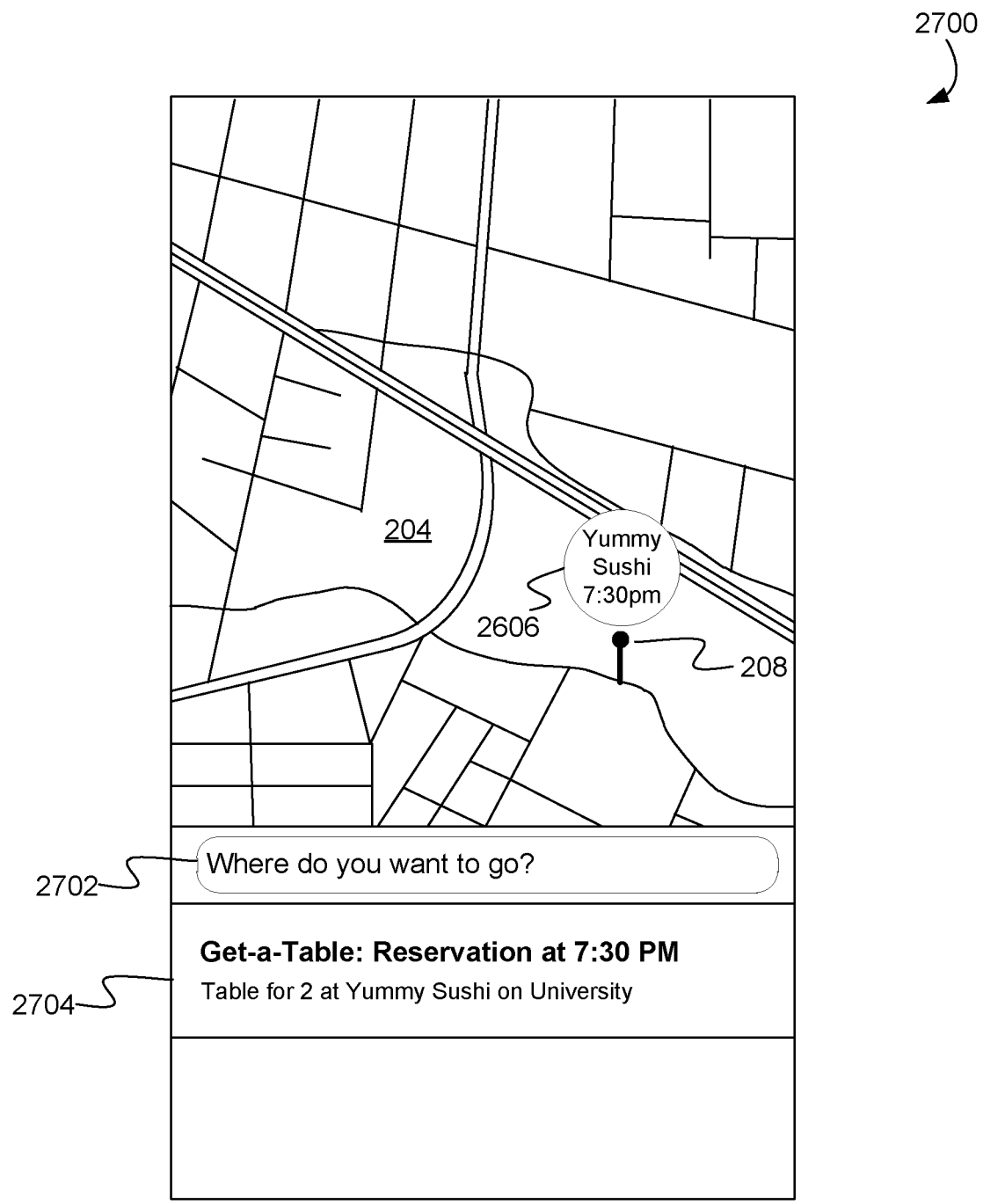
FIG. 27 illustrates an example graphical user interface for presenting reservation status information.

FIG. 27 illustrates an example graphical user interface 2700 for presenting reservation status information. For example, GUI 2700 can be presented by navigation application 104 when the user is performing a search using navigation application 104. For example, the user can select graphical element 2702 to provide search parameters to navigation application 104.

In some implementations, GUI 2700 can include graphical element 2704 representing a confirmed table reservation. For example, graphical element 2704 can identify table reservation service 162 and/or table reservation application 122. Graphical element 2704 can describe the date and/or time for the confirmed reservation. Graphical element 2704 can describe the table size for the confirmed reservation. Graphical element 2704 can present the name and/or location of the restaurant where the table is reserved.

In some implementations, GUI 2700 can include map 204. For example, when the location of a restaurant where a reservation is confirmed is presented on map 204, navigation application 104 can annotate map 204 with information indicating that the user has a reservation at the restaurant. For example, navigation application 104 can annotate map 204 by presenting graphical element 2706 near the location of the restaurant on map 204. Graphical element 2706 can, for example, include the name of the restaurant, the date of the reservation, and/or the time of the reservation. In some implementations, the user can select graphical element 2704 to view GUI 2500 of FIG. 25.

In some implementations, navigation application 104 can present graphical element 2704 within a period of time in advance of the confirmed reservation. For example, if the period of time is two hours, navigation application 104 can present graphical element 2704 when the current time is within two hours of the table reservation time; navigation application 104 will not present graphical element 2704 when the current time is greater than two hours from the reservation time.

Reserving Tables Using an Asynchronous Service

Figure 28:
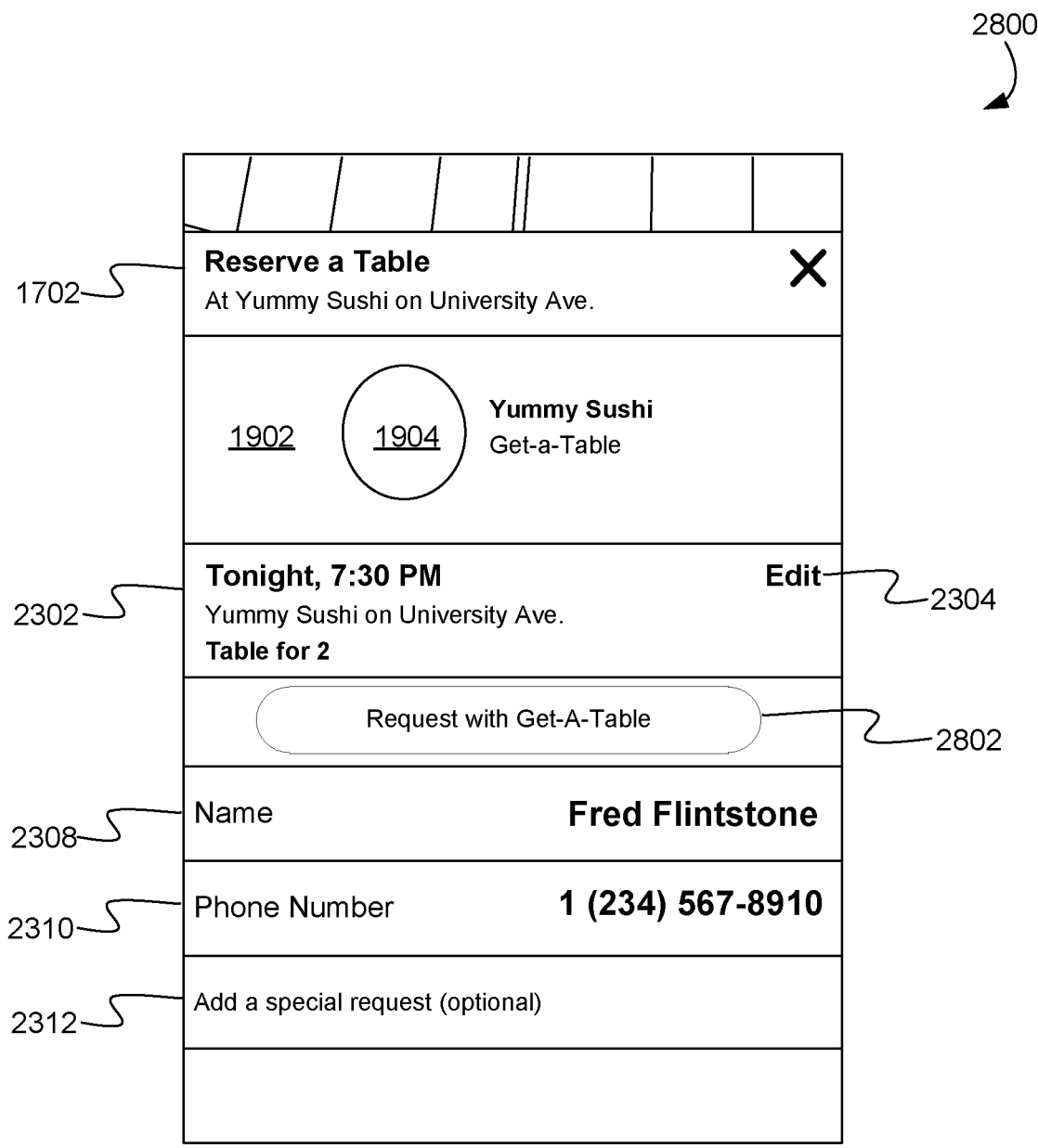
FIG. 28 illustrates an example graphical user interface for requesting a table reservation with an asynchronous table reservation service.

FIG. 28 illustrates an example graphical user interface 2800 for requesting a table reservation with an asynchronous table reservation service. For example, while the table reservation service described above provides synchronous, almost real-time table reservation processing, some table reservation services provide asynchronous table reservation processing. Often these services receive table reservation requests from users by electronic means and then pass the table reservation requests to humans at a restaurant to be processed. The humans can confirm or deny that table reservation request, notify the table reservation service of the reservation confirmation or denial, and the table reservation service can send a message to the user's device indicating that the table reservation is confirmed or denied. Because of the human component in this process, the processing of the reservation request can be delayed for a period of time. The asynchronous table reservation service provides a mechanism to handle this asynchronous reservation process.

In some implementations, GUI 2800 can correspond to GUI 2300 of FIG. 23. For example, navigation application 104 can present and the user can interact with graphical user interfaces 1600-2100 as described above to define the parameters of a table reservation. However, because table reservation service 162 is asynchronous in this case, table reservation service 162 will not have information describing available table reservations and cannot provide information describing the available table reservations to notification application 104. Table reservation service 162 can provide typical reservation times so that navigation application 104 can present reservation times (e.g., graphical element 1912) on GUI 1900, for example, but navigation application will not be able to present table availability information for each of the presented reservation times.

In some implementations, GUI 2300 can include graphical element 2802 for requesting a table reservation from an asynchronous table reservation service. For example, in response to receiving a user selection of graphical element 2802, navigation application 104 can send a table reservation request to table reservation service 162. The table reservation request can include the table reservation parameters, as described above.

Figure 29:
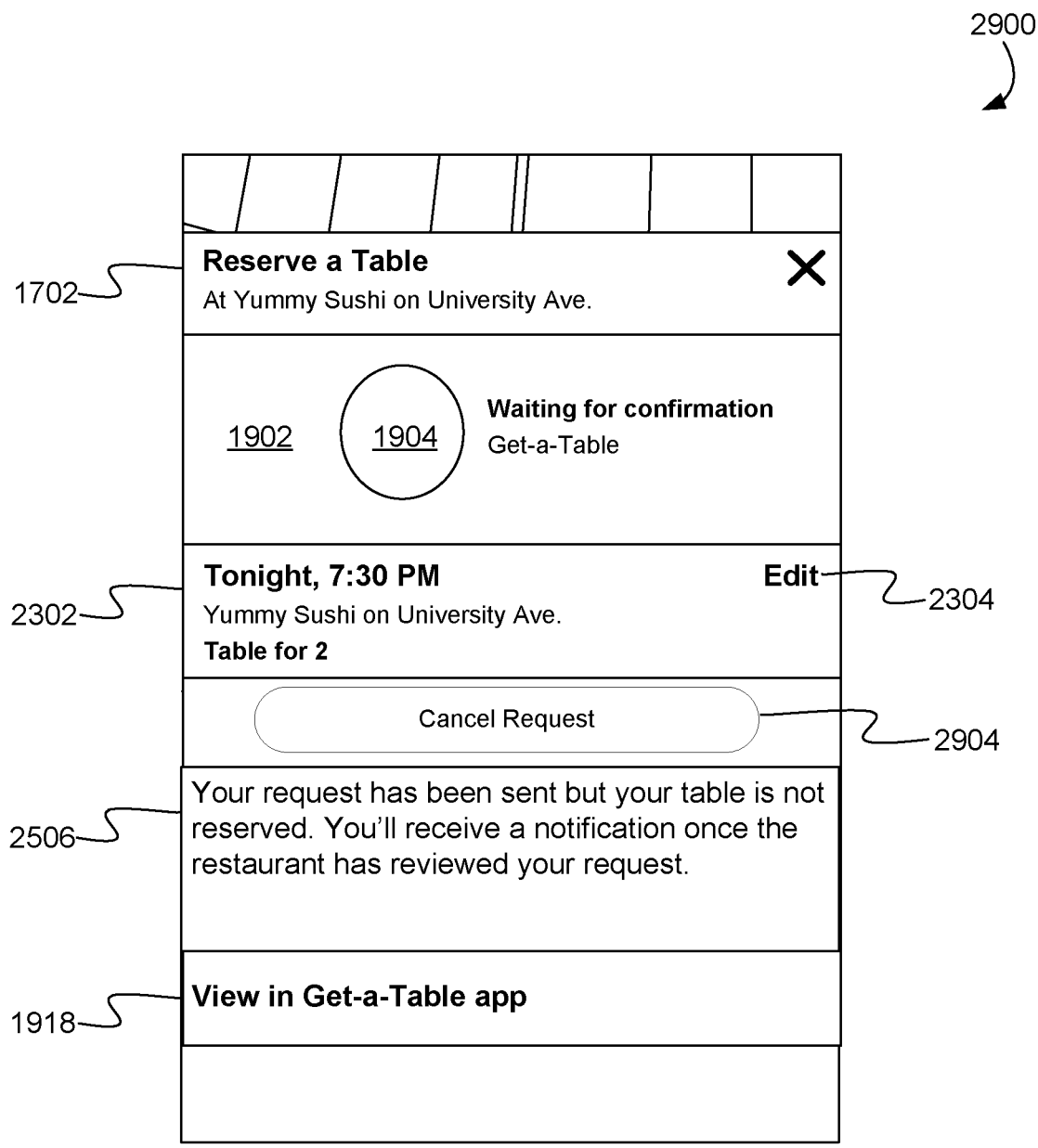
FIG. 29 illustrates an example graphical user interface presenting details of a pending reservation request.

FIG. 29 illustrates an example graphical user interface 2900 presenting details of a pending reservation request. For example, GUI 2900 can correspond to GUI 2500 of FIG. 25. For example, GUI 2900 can be presented by navigation application 104 in response to the user selecting graphical element 2802 of FIG. 28. However, in the asynchronous table reservation service case, the table reservation message presented by graphical element 1902 and/or graphical element 2506 can indicate that the table reservation request has been sent but not confirmed.

In some implementations, GUI 2904 can include graphical element 1904 for canceling a reservation request with the asynchronous table reservation service. For example, in response to a user selection of graphical element 2904, navigation application 104 can invoke table reservation application 122 to allow the user to cancel the table reservation request using features provided by table reservation application 122. When invoking table reservation application 122, navigation application 104 can indicate to table reservation application 122 that the user wishes to cancel a reservation request so that table reservation application 122 can present the appropriate reservation cancellation graphical user interfaces.

Figure 30:
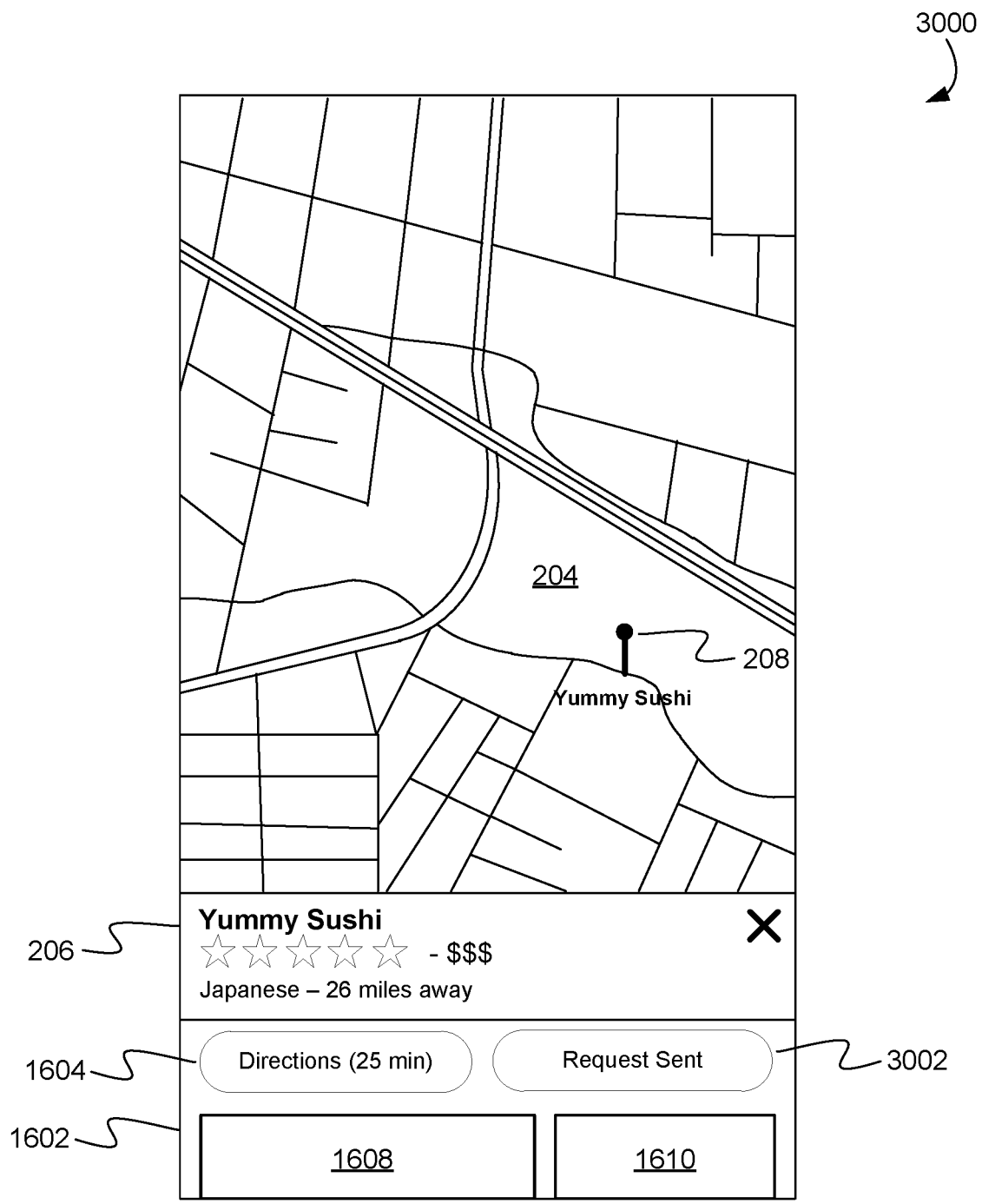
FIG. 30 illustrates an example graphical user interface for presenting information about a selected restaurant.

FIG. 30 illustrates an example graphical user interface 3000 for presenting information about a selected restaurant. For example, GUI 3000 can correspond to GUI 2600 of FIG. 26. However, at this point in the table reservation process, the asynchronous table reservation service has not confirmed or denied the table reservation request. Thus, graphical element 3002 (e.g., corresponding to graphical element 2602) can indicate that the table reservation request has been sent and will not indicate a confirmed reservation time, as described with reference to FIG. 26. The user can select graphical element 3002 to cause navigation application 104 to present GUI 2900 of FIG. 29, for example.

Figure 31:
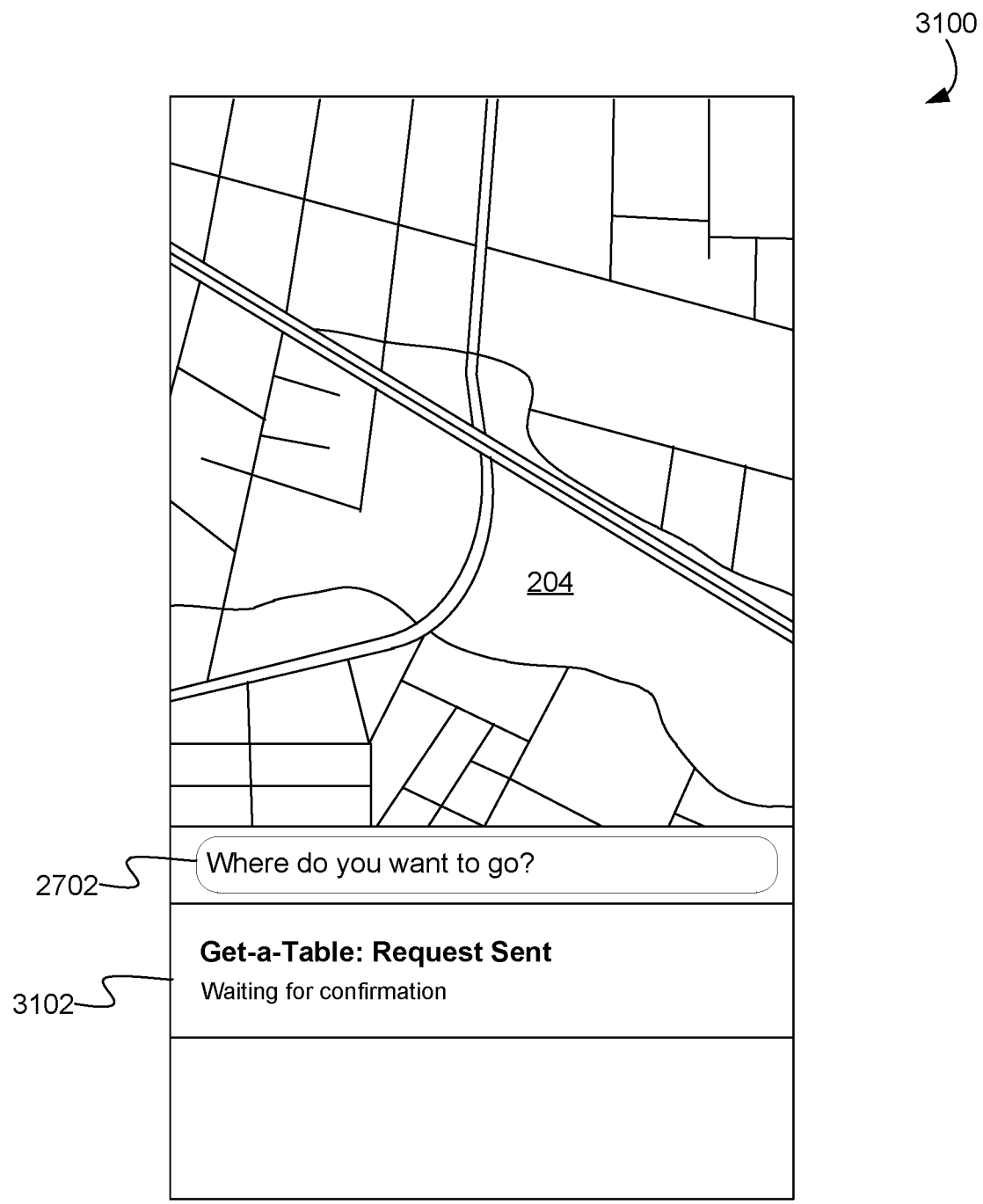
FIG. 31 illustrates an example graphical user interface for presenting status information about a reservation request.

FIG. 31 illustrates an example graphical user interface 3100 for presenting status information about a reservation request. For example, GUI 3100 can correspond to GUI 2700 of FIG. 27. However, at this point in the table reservation process, the asynchronous table reservation service has not confirmed or denied the table reservation request. Thus, graphical element 3102 (e.g., corresponding to graphical element 2704) can indicate that the table reservation request has been sent to the asynchronous table reservation service and that navigation application 104 is waiting for confirmation of the table reservation request from the asynchronous table reservation service.

Figure 32:
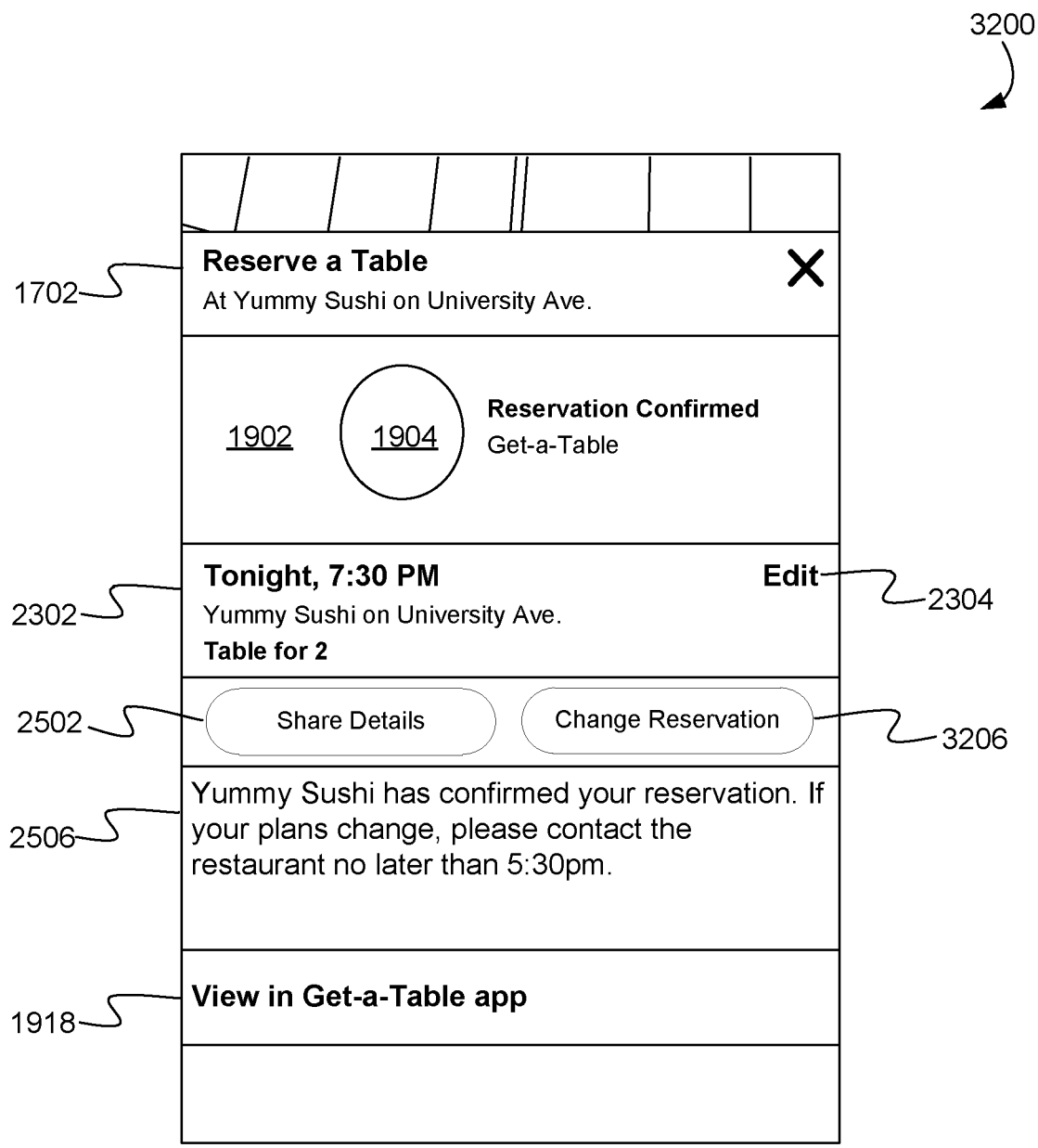
FIG. 32 illustrates an example graphical user interface presenting details of a confirmed reservation.

FIG. 32 illustrates an example graphical user interface 3200 presenting details of a confirmed reservation. For example, GUI 3200 can correspond to GUI 2500 of FIG. 25 and/or GUI 2900 of FIG. 29. At this point in the table reservation process, the asynchronous table reservation service has confirmed the table reservation request. Thus, graphical element 1902 and/or graphical element 2506 can indicate that the requested table reservation has been confirmed. GUI 3200 can be invoked in response to the user selecting graphical element 2704 indicating that the reservation requested through the asynchronous reservation service has been confirmed.

In some implementations, GUI 3200 can include graphical element 3206 for canceling the confirmed reservation. For example, in response to a user selection of graphical element 3206, navigation application 104 can invoke table reservation application 122 to allow the user to cancel the table reservation request using features provided by table reservation application 122. When invoking table reservation application 122, navigation application 104 can indicate to table reservation application 122 that the user wishes to cancel a reservation request so that table reservation application 122 can present the appropriate reservation cancellation graphical user interfaces.

Figure 33:
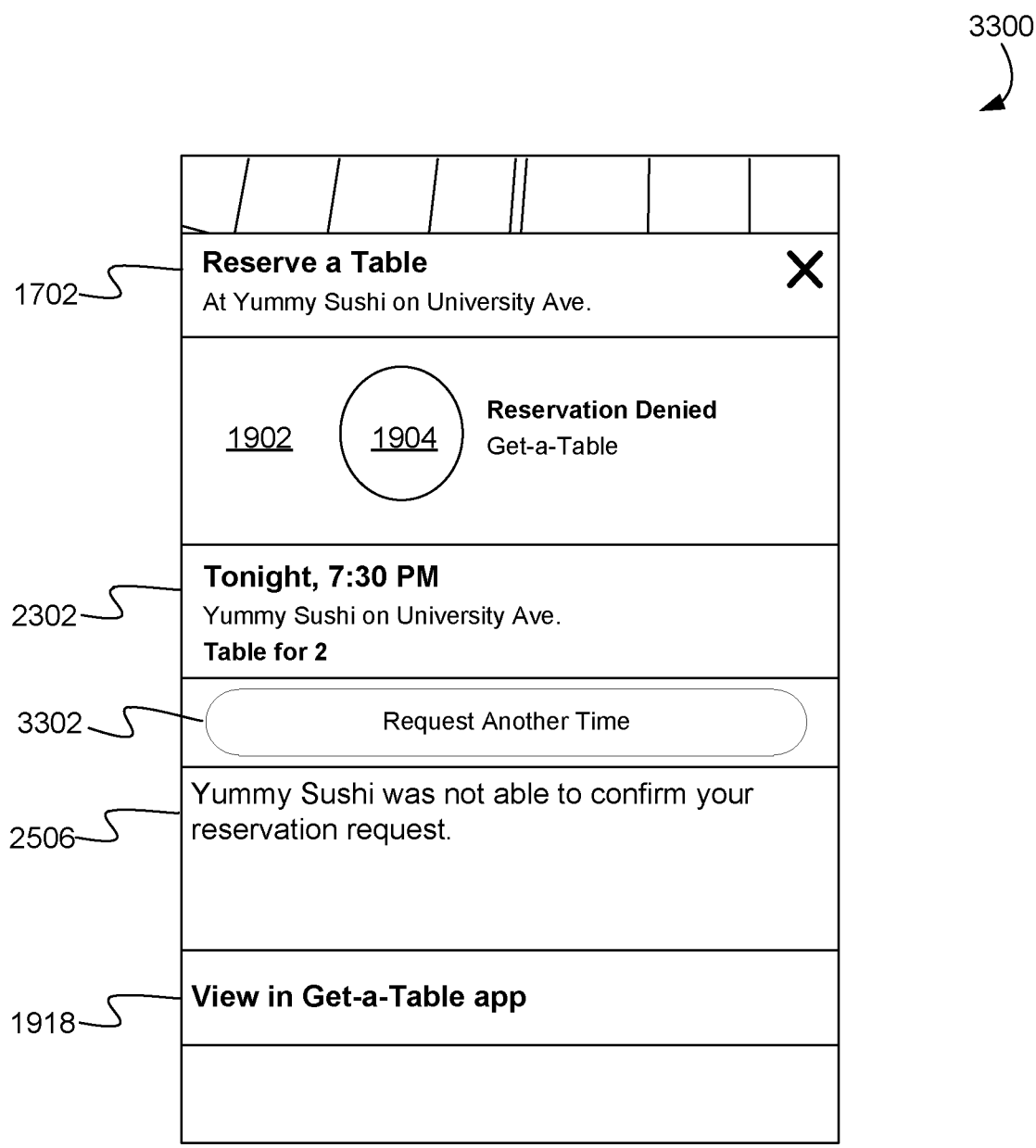
FIG. 33 illustrates an example graphical user interface for requesting another table reservation after receiving a denial of a reservation request.

FIG. 33 illustrates an example graphical user interface 3300 for requesting another table reservation after receiving a denial of a reservation request. For example, GUI 3300 can include similar features as GUI 3200. However, in this case, the asynchronous reservation service has sent navigation application 104 a message indicating that the user's reservation request was denied by the restaurant. For example, GUI 3200 can include graphical element 1902 and graphical element 2506 indicating that the reservation request was denied.

In some implementations, GUI 3300 can include graphical element 3302 for requesting another reservation time. For example, after receiving the reservation request denial, navigation application 104 can present graphical element 3302. The user can select graphical element 3302 to restart the asynchronous table reservation process. For example, in response to receiving the user selection of graphical element 3302, navigation application 104 can present GUI 1900 of FIG. 19. In this case, GUI 1900 can present table reservation parameters or options for the asynchronous table reservation service, as described above.

Figure 34:
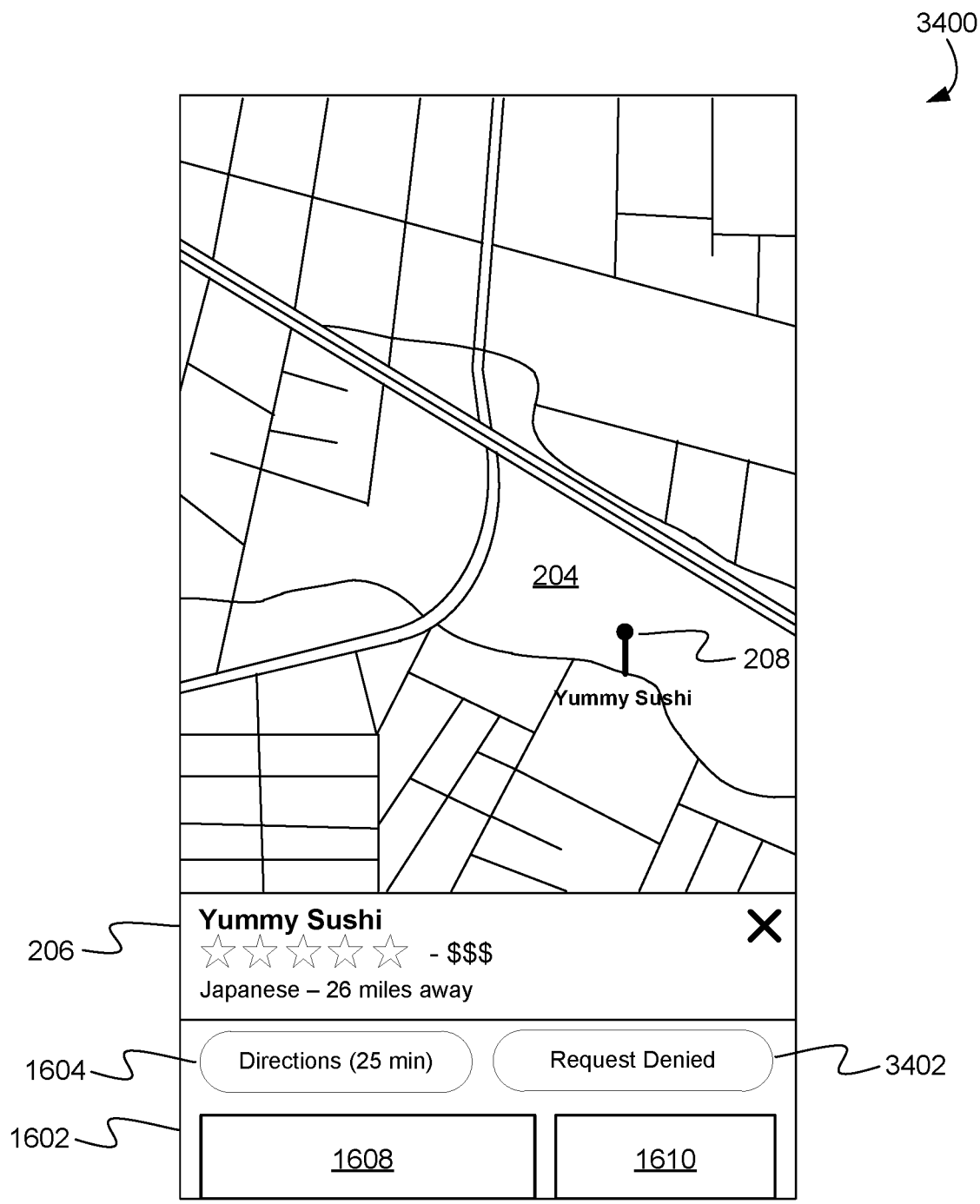
FIG. 34 illustrates an example graphical user interface for presenting information about a selected restaurant.

FIG. 34 illustrates an example graphical user interface 3400 for presenting information about a selected restaurant. For example, GUI 3400 can include features similar to GUI 2600 and/or GUI 3000, as described above. In this case, however, graphical element 3402 can indicate that the reservation request has been denied by the restaurant. The user can select graphical element 3402 to restart the asynchronous table reservation process. For example, in response to receiving the user selection of graphical element 3302, navigation application 104 can present GUI 1900 of FIG. 19. In this case, GUI 1900 can present table reservation parameters or options for the asynchronous table reservation service, as described above.

Figure 35:
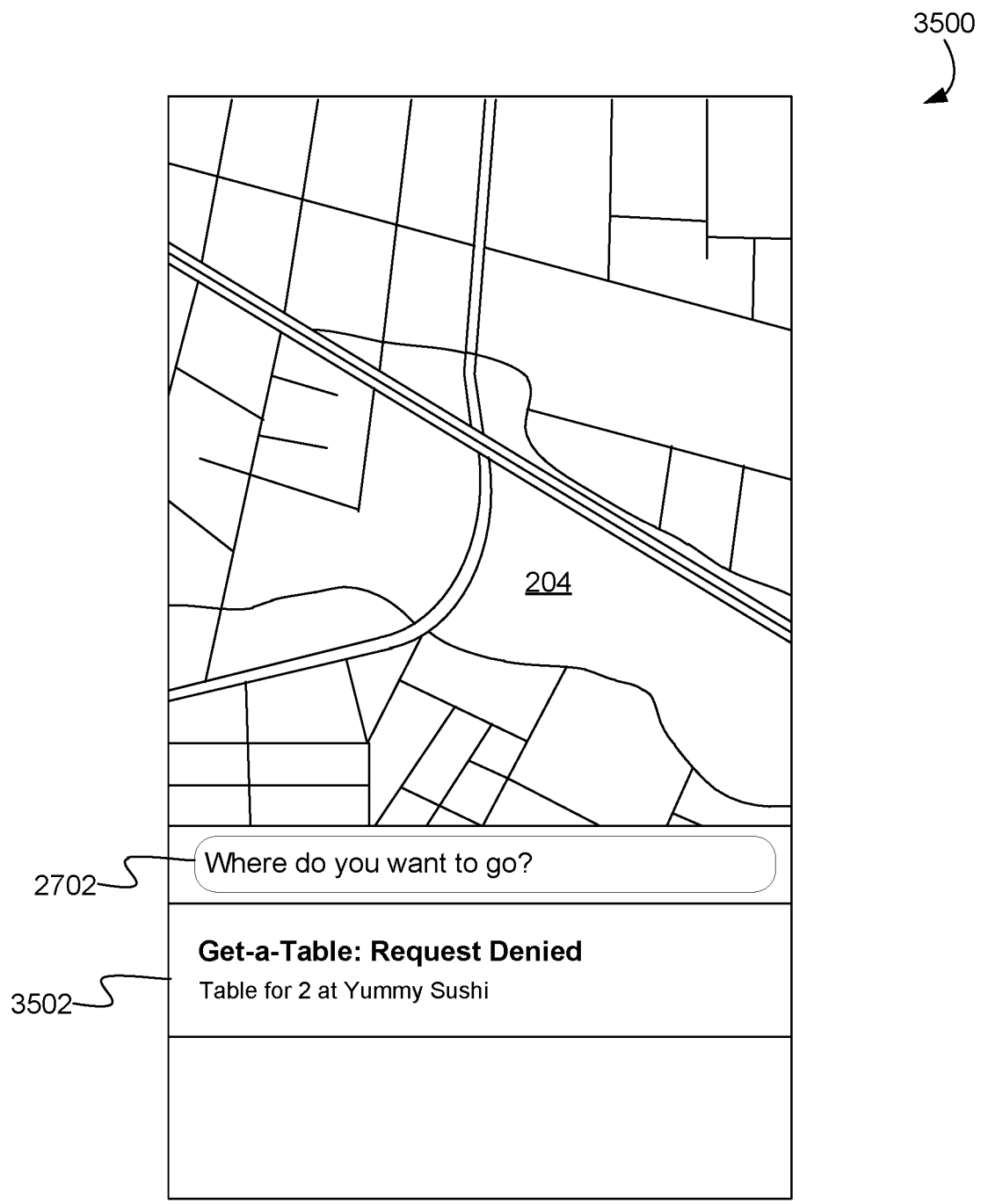
FIG. 35 illustrates an example graphical user interface presenting status information about a denied reservation request.

FIG. 35 illustrates an example graphical user interface 3500 presenting status information about a denied reservation request. For example, GUI 3500 can include features similar to GUI 2700 described above. However, in this case, GUI 3500 includes graphical element 3502 indicating that the reservation request sent to the asynchronous table reservation service was denied. For example, graphical element 3502 can present information identifying the table reservation service, the restaurant, and/or the parameters of the denied reservation request. The user can select graphical element 3502 to restart the asynchronous table reservation process. For example, in response to receiving the user selection of graphical element 3302, navigation application 104 can present GUI 1900 of FIG. 19. In this case, GUI 1900 can present table reservation parameters or options for the asynchronous table reservation service, as described above. Graphical element 3502 can be removed from GUI 3500 after a period of time (e.g., 2 hours, 1 day, etc.) or when the user submits another reservation request to the asynchronous reservation service.

Get in Queue

Figure 36:
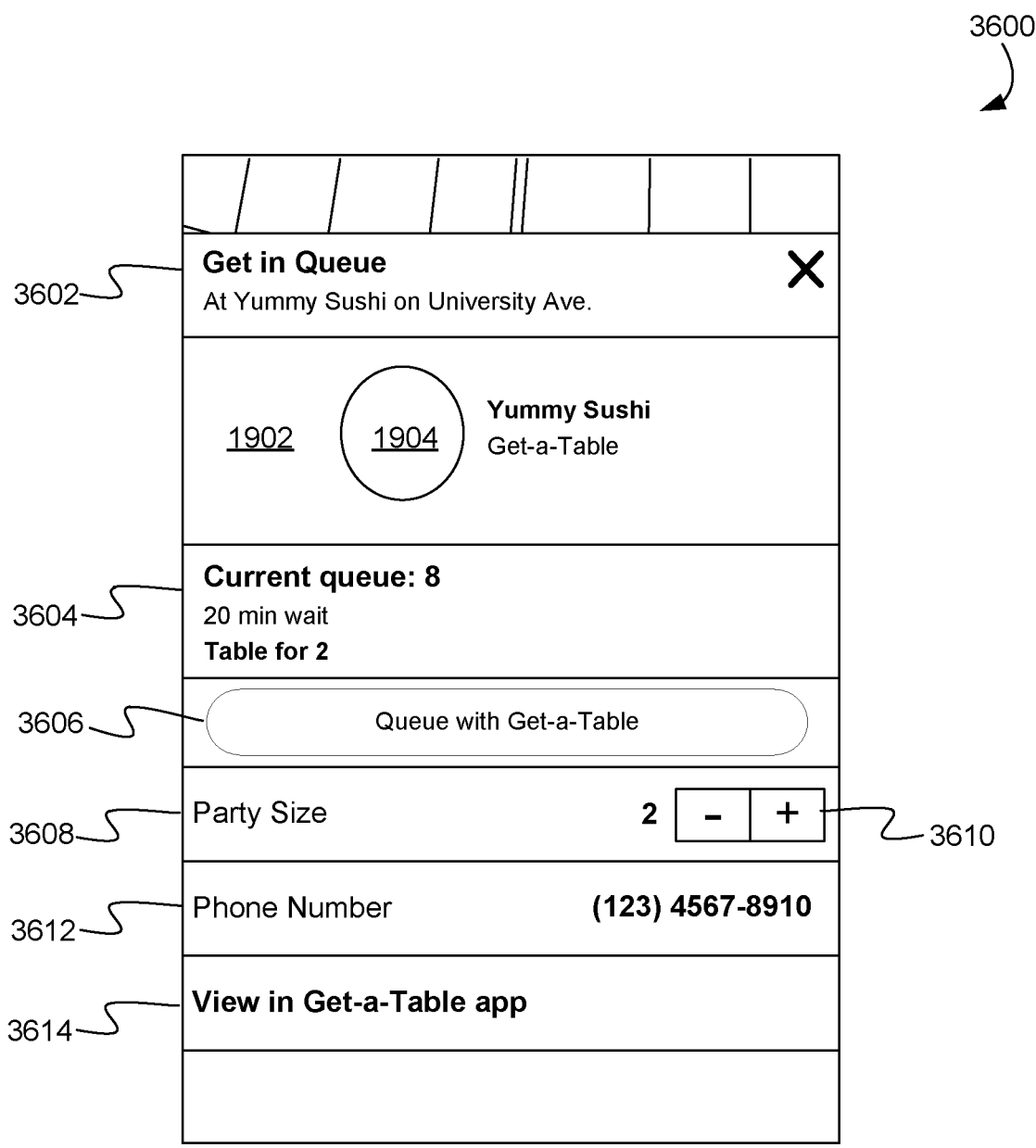
FIG. 36 illustrates an example graphical user interface for reserving a place in line at a restaurant.

FIG. 36 illustrates an example graphical user interface 3600 for reserving a place in line at a restaurant. For example, navigation application 104 can present graphical user interfaces that allow the user to select a restaurant, prompt the user to install a restaurant queuing application (e.g., restaurant reservation application 122), and request that the user authorize the sharing of restaurant information with the queuing application similar to that described above with reference to FIGS. 16-18. After the user has selected a restaurant, installed the restaurant queuing application on user device 102, and authorized the sharing of restaurant information with the restaurant queuing application, navigation application 104 can present GUI 3600 so that the user can specifying the parameters for the restaurant queue reservation request.

In some implementations, navigation application can invoke a restaurant queuing application extension corresponding to the installed restaurant queuing application when GUI 3600 is invoked. For example, in the queuing scenario, restaurant table reservation application bundle 120 can represent the restaurant queuing application bundle, restaurant reservation application 122 can represent the restaurant queuing application, and restaurant reservation application extension 124 can represent the restaurant queuing application extension. When invoked, the restaurant queuing application extension can obtain from restaurant queuing service (e.g., table reservation service 162), information describing the state of the queue at the selected restaurant. For example, the information can indicate the length of the queue and an estimated wait time for a default table size (e.g., 2 people). The restaurant queuing application extension can send the queue information to navigation application 104 for presentation on GUI 3600.

In some implementations, GUI 3600 can include graphical element 3602 indicating that GUI 3600 is part of a restaurant queue reservation process. Graphical element 3602 can present information identifying the name of the restaurant and/or the location of the restaurant selected by the user and where the user wishes to reserve a place in a waiting line (e.g., in queue) for a table at the restaurant. GUI 3600 can include graphical elements 1902, as described above.

In some implementations, GUI 3600 can include graphical element 3604 describing the current state of the queue. For example, graphical element 3604 can describe the current length of the queue, the estimated wait time until being seated at a table, and/or the current table size for the queue reservation. GUI 3600 can include graphical element 3608 indicating the current table size (e.g., party size) and graphical element 3610 for adjusting the current table size. For example, the user can select graphical element 3610 to increase or decrease the size of the table to be requested in the queue reservation request. GUI 3600 can include graphical element 3610 for receiving a user's phone number. For example, the user can select graphical element 3610 and enter the user's phone number using a virtual keyboard according to well-known mechanisms. Alternatively, navigation application 104 can automatically populate graphical element 3610 with the user's phone number based on contact information stored on user device 102.

In some implementations, GUI 3600 can include graphical element 3614 for invoking the corresponding restaurant queuing application. For example, when a user selects graphical element 3614, navigation application 104 can invoke the restaurant queuing application (e.g., table reservation application 122) installed on user device 102 and send the queuing application information indicating the current state of the restaurant queuing reservation process. Thus, the queuing application can present a graphical user interface that allows the user to continue reserving a place in line at the selected restaurant.

In some implementations, GUI 3600 can include graphical element 3606 for requesting a reservation in line at the selected restaurant. For example, in response to the user selecting graphical element 3606, navigation application 104 can send a queuing reservation request including the queuing parameters (e.g., restaurant identifier, table size, phone number, etc.) selected by the user using GUI 3600 to the restaurant queuing application extension (e.g., table reservation application extension 124). The restaurant queuing application extension can, in turn, send the queuing reservation request to the corresponding restaurant queuing reservation service to reserve a place in line (e.g., in queue) at the selected restaurant.

Figure 37:
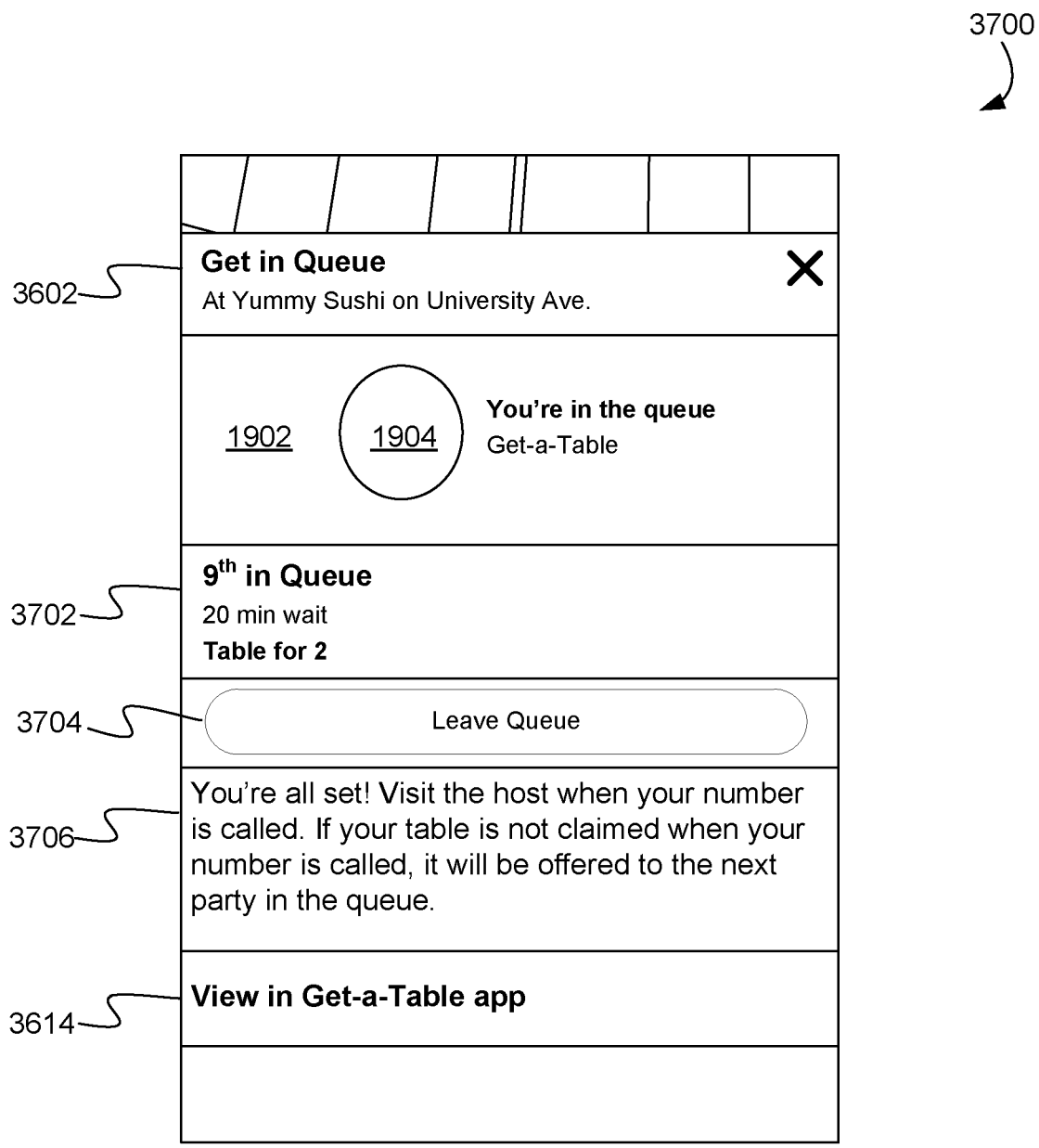
FIG. 37 illustrates an example graphical user interface for presenting the status of a restaurant queue reservation.

FIG. 37 illustrates an example graphical user interface 3700 for presenting the status of a restaurant queue reservation. For example, GUI 3700 can be presented in response to receiving a queue reservation confirmation message from the restaurant queue reservation application extension, described above. For example, after sending the restaurant queue reservation request to the queue reservation service, the queue reservation application extension can receive a queue reservation confirmation message from the queue reservation service indicating the place in line reserved for the user at the restaurant, the wait time, and the requested table size. In response to receiving the queue reservation confirmation message, the queue reservation application extension can send the confirmation message to navigation application 104. In response to receiving the queue reservation confirmation message, navigation application 104 can present information obtained from the confirmation message on GUI 3700.

In some implementations, GUI 3700 can include graphical element 3702 representing the user's reserved place in line at the restaurant. For example, graphical element 3702 can present information describing the place in line (e.g., the user's number in line) reserved for the user, the estimated wait time until the user is seated at a table, and the table size for the reservation.

In some implementations, GUI 3700 can include graphical element 3706 presenting a message from the restaurant and/or the restaurant queuing reservation application indicating that the user has a place reserved in queue at the restaurant. GUI 2700 can include graphical element 1902 indicating that the user's queue reservation has been confirmed. GUI 3700 can include graphical element 3614, as described above.

In some implementations, GUI 3700 can include graphical element 3704 for cancelling the user's queue reservation. For example, when the user selects graphical element 3704, navigation application 104 can invoke the restaurant queue reservation application so that the user can cancel the queue reservation using the queue reservation application.

Figure 38:
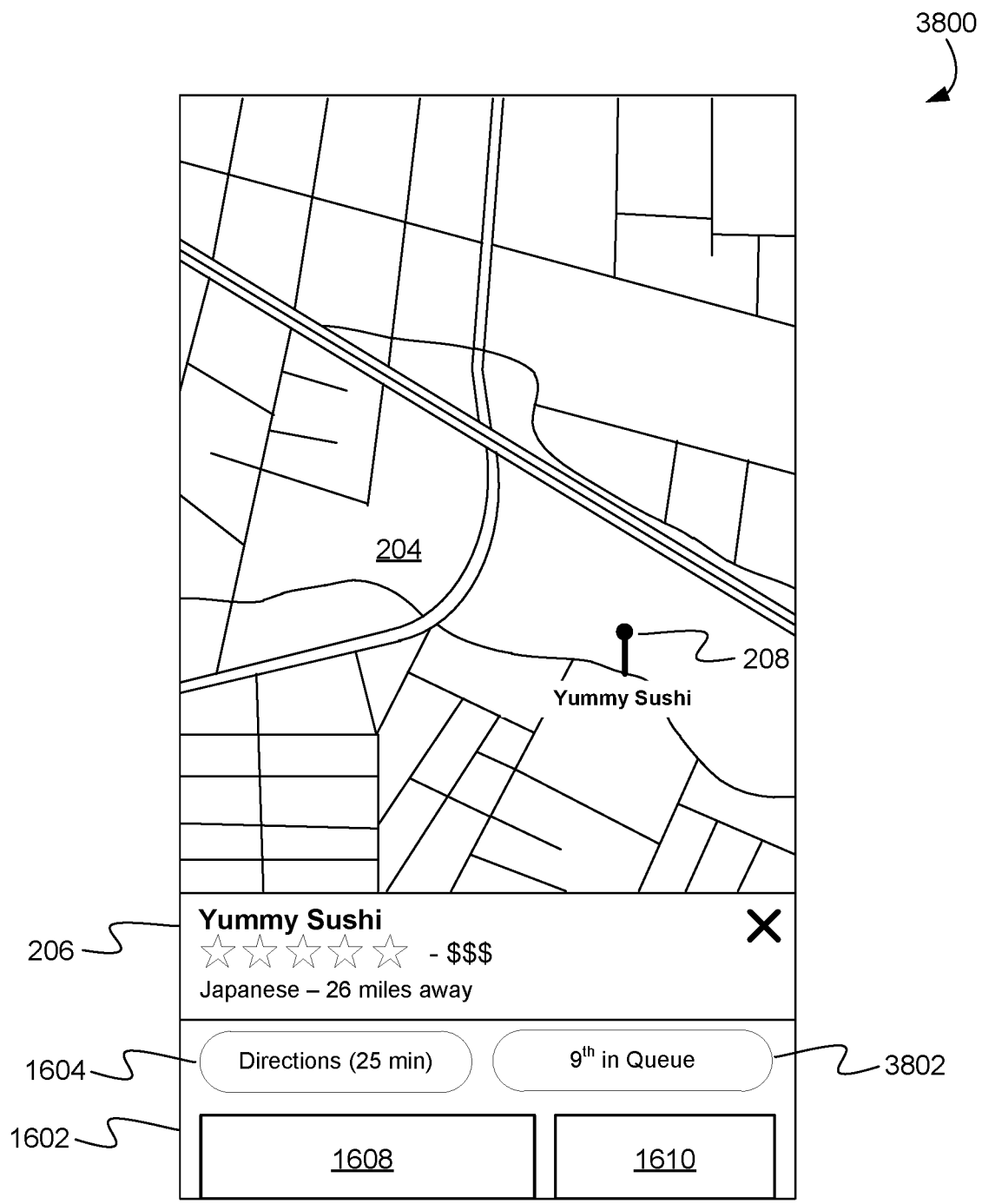
FIG. 38 illustrates an example graphical user interface for presenting restaurant information.

FIG. 38 illustrates an example graphical user interface 3800 for presenting restaurant information. For example, GUI 3800 can include similar features as GUI 1600. However, GUI 3800 can include graphical element 3802 indicating the user's reserved position in queue at the selected restaurant. In some implementations, the user can select graphical element 3802 to present GUI 3700 to view details about the queue reservation.

Figure 39:
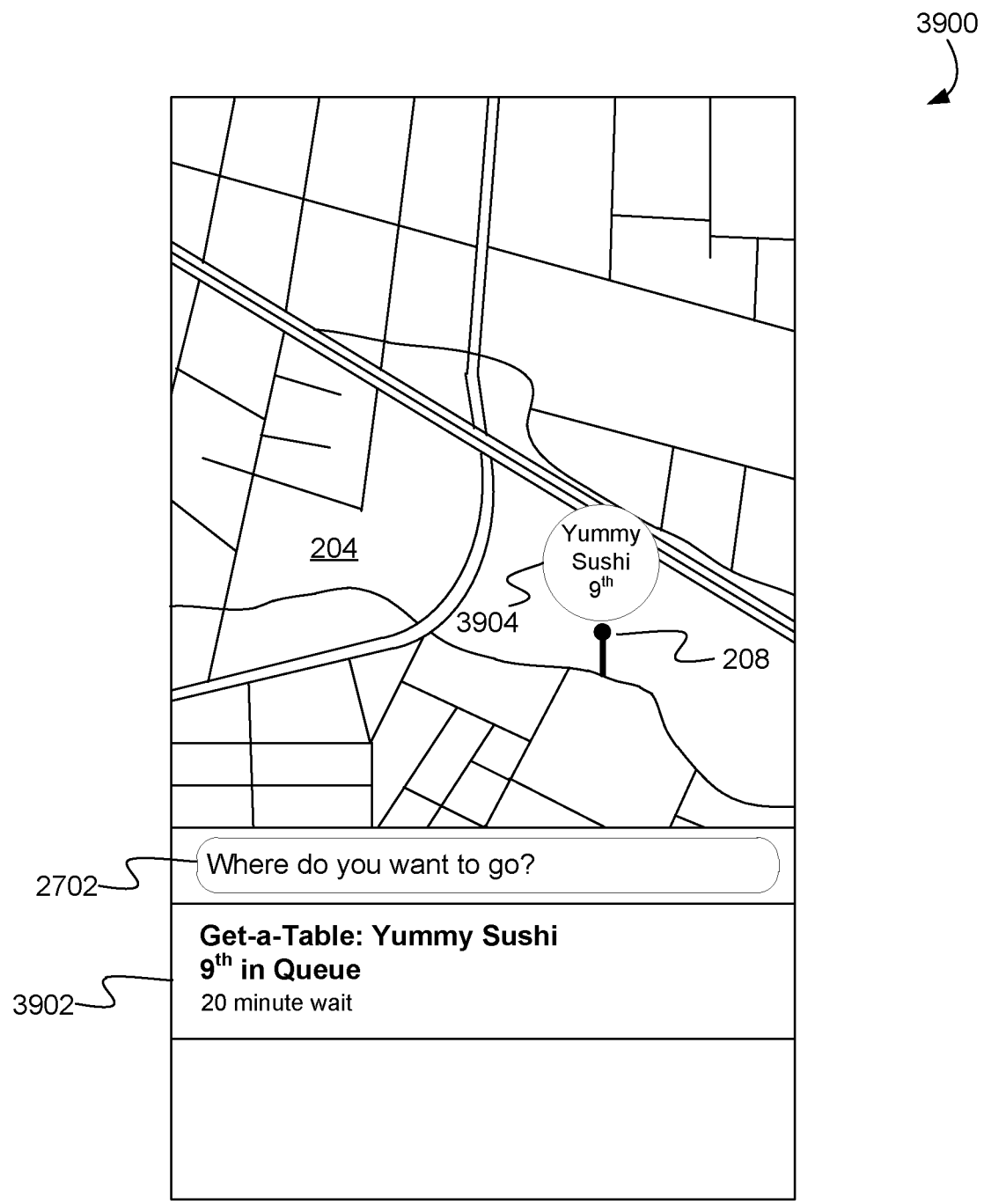
FIG. 39 illustrates an example graphical user interface presenting status information about a queue reservation.

FIG. 39 illustrates an example graphical user interface 3900 presenting status information about a queue reservation. For example, GUI 3900 can be presented when a user invokes a search feature of navigation application 104. For example, the user can invoke the search feature by selecting graphical element 2702, as described above.

In some implementations, GUI 3900 can include graphical element 3902 indicating the status of the user's queue reservation. For example, graphical element 3902 can present information identifying the restaurant queue reservation application, the restaurant queue reservation service, restaurant at which the user has the queue reservation, the user's place in queue (e.g., queue number), and/or the estimated wait time until the user is seated at a table in the restaurant.

In some implementations, GUI 3700 can include map 204. For example, when map 204 presents a geographical area that includes the location of the restaurant represented by graphical element 3902, navigation application 104 can annotate map 204 to indicate that the user has a queue reservation at the restaurant. For example, navigation application 104 can present graphical element 3904 proximate to the location of the restaurant on map 204. Graphical element 3904 can include an identifier for the restaurant (e.g., a name) and/or the users assigned queue number (e.g. place in line). To view more information about the queue reservation, the user can select graphical element 3904 or graphical element 3902 to cause navigation application 104 to present GUI 3700 of FIG. 37.

Example Processes

Figure 40:
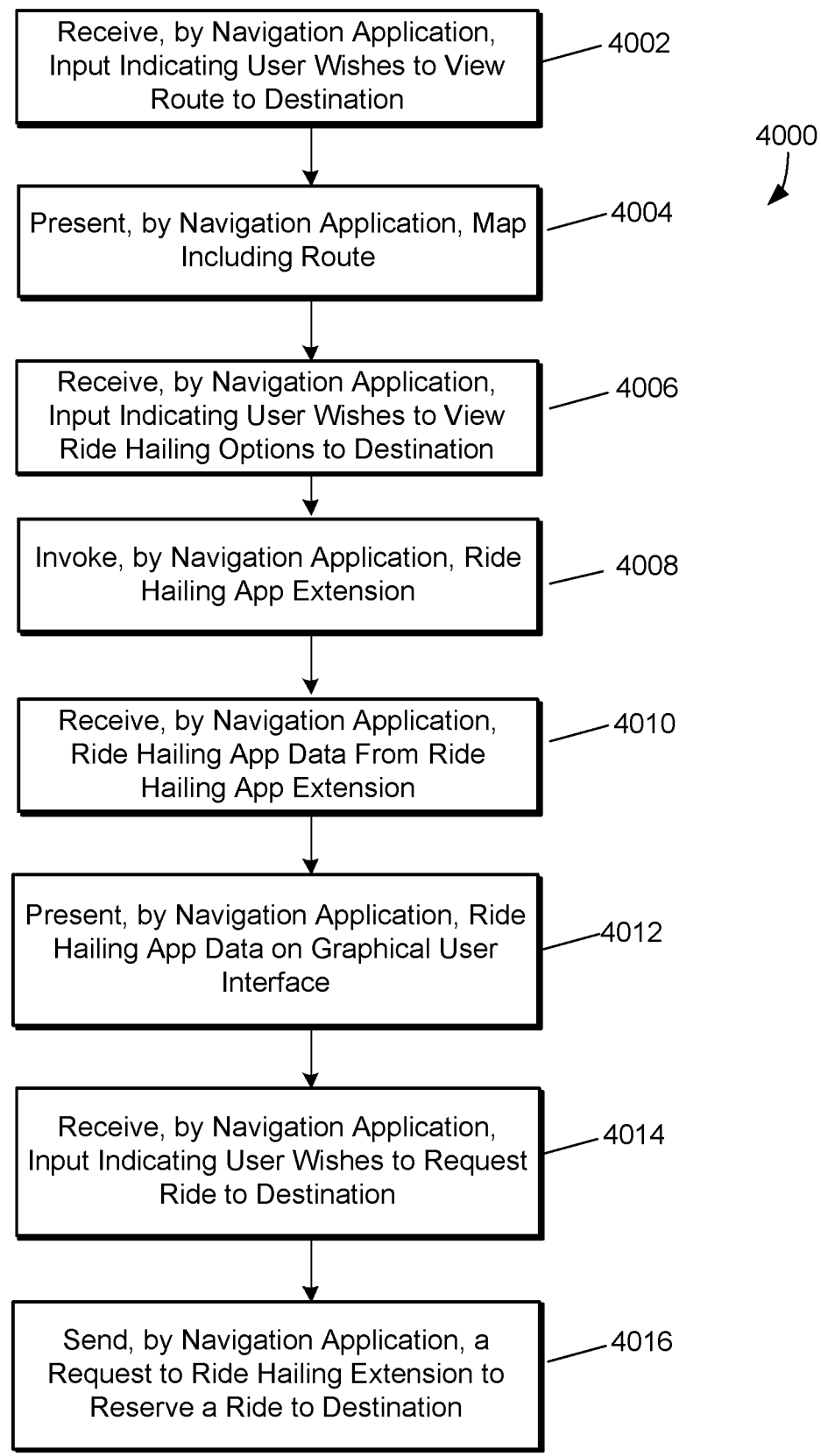
FIG. 40 is flow diagram of an example process for integrating a ride hailing service into a navigation application.

FIG. 40 is flow diagram of an example process 4000 for integrating a ride hailing service into a navigation application. For example, process 4000 can be performed by navigation application 104 on user device 102 to provide the ride hailing features of a third party ride hailing application within navigation application 104. In some implementations, all of the graphical user interfaces needed to reserve a ride with a ride hailing service, as described herein, can be provided by navigation application 104.

At step 4002, navigation application 104 can receive user input indicating that the user wishes to view a route to a destination. For example, the user can search for a destination using navigation application 104 and provide input to navigation application 104 to cause navigation application 104 to present a route from a start location to a destination location selected from the search results, as described with reference to FIG. 2.

At step 4004, navigation application 104 can present a map including a route from the start location to the destination location. For example, navigation application 104 can present GUI 500 of FIG. 5.

At step 4006, navigation application 104 can receive input indicating that the user wishes to view ride hailing options to the destination. For example, the user can select graphical element 308 of FIG. 3.

At step 4008, navigation application 104 can invoke a ride hailing application extension. For example, navigation application 104 can invoke a ride hailing application extension corresponding to a ride hailing application and/or ride hailing service selected by the user, as described with reference to FIG. 6 and FIG. 7.

At step 4010, navigation application 104 can receive ride hailing application data from the invoked ride hailing application extension. For example, navigation application 104 can receive information describing the cost of a ride to the destination from the start location, the wait time before the user is picked up, the pickup location, ride sharing service specific data and/or graphical elements, and or other ride hailing service information as described above.

At step 4012, navigation application 104 can present the received ride hailing application data on a graphical user interface of navigation application 104. For example, navigation application 104 can present ride hailing application data received from the selected ride hailing application extension and/or the selected ride hailing service on the GUIs described with reference to FIGS. 6-10.

At step 4014, navigation application 104 can receive input indicating that the user wishes to receive a ride to the destination. For example, the user can review the ride hailing application data, select a ride hailing service, and provide input to reserve a ride, as described above with reference to FIGS. 8 and 9.

At step 4016, navigation application 104 can send a request to the ride hailing extension to reserve a ride to the destination. For example, after the user commits to a ride by selecting graphical element 804 of FIG. 8 or FIG. 9, navigation application 104 can send a request to the ride hailing application extension that includes ride reservation data and a request to reserve a ride from the start location to the destination location. After reserving the ride, the ride hailing application extension can confirm the ride reservation and navigation application 104 can present a GUI indicating that the ride is reserved, as described above with reference to FIGS. 13-15.

Figure 41:
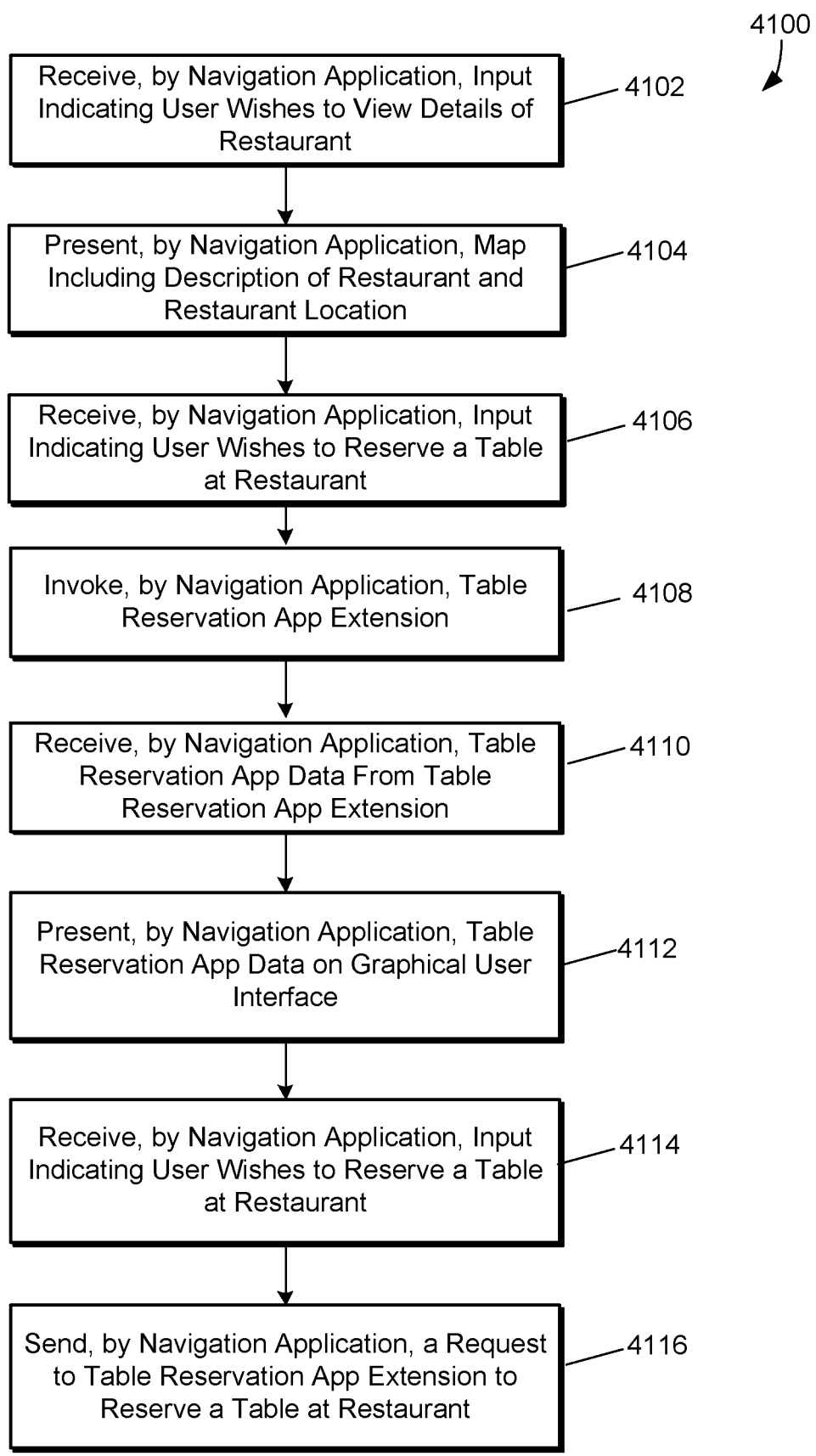
FIG. 41 is a flow diagram of an example process for integrating a table reservation service into a navigation application.

FIG. 41 is a flow diagram of an example process 4100 for integrating a table reservation service into a navigation application. For example, process 4000 can be performed by navigation application 104 on user device 102 to provide the table reservation features of a third party table reservation application within navigation application 104. In some implementations, all of the graphical user interfaces needed to reserve a table (or a place in line) at a restaurant with a table reservation service, as described herein, can be provided by navigation application 104.

At step 4102, navigation application 104 can receive user input indicating that the user wishes to view details of a restaurant. For example, the user can select graphical element 206 of FIG. 2 to indicate that the user wishes to view details of the restaurant represented by graphical element 206.

At step 4104, navigation application 104 can present a map including a description of the restaurant and the restaurant location. For example, navigation application 104 can present GUI 1600 of FIG. 16.

At step 4106, navigation application 104 can receive user input indicating the user wishes to reserve a table at the restaurant. For example, navigation application can receive a user selection of graphical element 1606 of FIG. 16.

At step 4108, navigation application 104 can invoke a table reservation application extension. For example, navigation application 104 can determine a table reservation service that services the selected restaurant. Navigation application 104 can determine whether user device 102 has a table reservation application associated with the table reservation service installed on user device 102. When navigation application 104 determines that user device 102 has the appropriate table reservation application installed, navigation application 104 can invoke the table reservation application extension associated with the table reservation application, as described above.

At step 4110, navigation application 104 can receive table reservation application data from the table reservation application extension. For example, navigation application 104 can receive data identifying reservation times for the selected restaurant and/or the number of tables available at the restaurant at the identified reservation times, as described above.

At step 4112, navigation application 104 can present table reservation application data on a graphical user interface of navigation application 104. For example, navigation application 104 can present table reservation data as described above with reference to FIGS. 19-24.

At step 4114, navigation application 104 can receive user input indicating that the user wishes to reserve a table at the restaurant. For example, navigation application 104 can determine that the user wishes to reserve a table at the restaurant in response to receive a user selection of graphical element 2316 of FIG. 23.

At step 4116, navigation application 104 can send a reservation request to the table reservation application extension to reserve a table at the restaurant. For example, the reservation request can include an identifier for the restaurant, a date for the reservation, a time for the reservation, a party size for the reservation, and/or any special offers selected by the user. In response to receiving the reservation request, the table reservation application extension can send the reservation request information to the corresponding table reservation service. The table reservation service can reserve the requested table and send a reservation confirmation back to the table reservation application extension. The table reservation application extension can, in turn, send the table reservation confirmation to navigation application 104 to present to the user. For example, the table reservation confirmation information can be presented as described with reference to FIGS. 25 and 26.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 42:
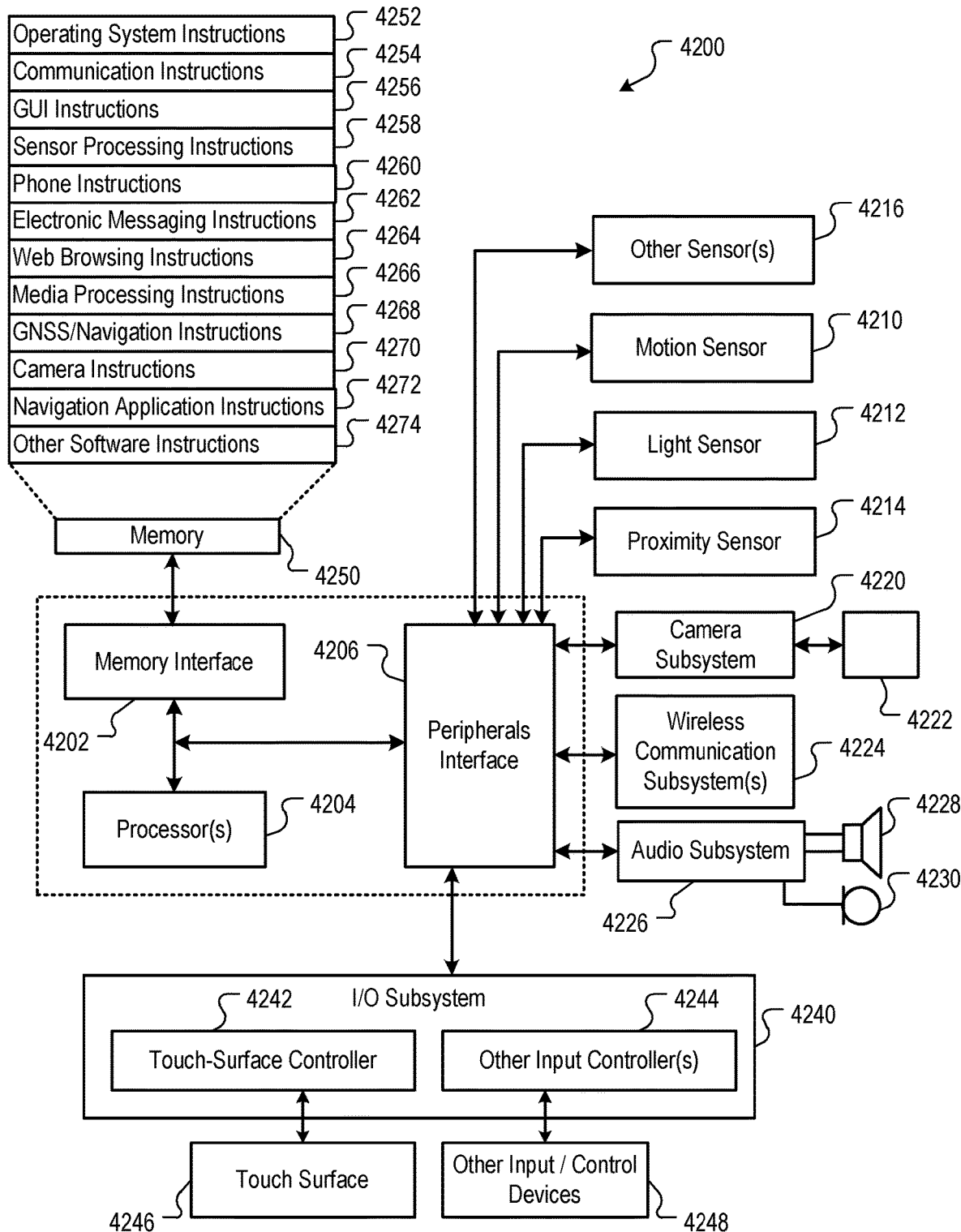
FIG. 42 is a block diagram of an example computing device that can implement the features and processes of FIGS. 1-41.

FIG. 42 is a block diagram of an example computing device 4200 that can implement the features and processes of FIGS. 1-41. The computing device 4200 can include a memory interface 4202, one or more data processors, image processors and/or central processing units 4204, and a peripherals interface 4206. The memory interface 4202, the one or more processors 4204 and/or the peripherals interface 4206 can be separate components or can be integrated in one or more integrated circuits. The various components in the computing device 4200 can be coupled by one or more communication buses or signal lines.

Sensors, devices, and subsystems can be coupled to the peripherals interface 4206 to facilitate multiple functionalities. For example, a motion sensor 4210, a light sensor 4212, and a proximity sensor 4214 can be coupled to the peripherals interface 4206 to facilitate orientation, lighting, and proximity functions. Other sensors 4216 can also be connected to the peripherals interface 4206, such as a global navigation satellite system (GNSS) (e.g., GPS receiver), a temperature sensor, a biometric sensor, magnetometer or other sensing device, to facilitate related functionalities.

A camera subsystem 4220 and an optical sensor 4222, e.g., a charged coupled device (CCD) or a complementary metal-oxide semiconductor (CMOS) optical sensor, can be utilized to facilitate camera functions, such as recording photographs and video clips. The camera subsystem 4220 and the optical sensor 4222 can be used to collect images of a user to be used during authentication of a user, e.g., by performing facial recognition analysis.

Communication functions can be facilitated through one or more wireless communication subsystems 4224, which can include radio frequency receivers and transmitters and/or optical (e.g., infrared) receivers and transmitters. The specific design and implementation of the communication subsystem 4224 can depend on the communication network (s) over which the computing device 4200 is intended to operate. For example, the computing device 4200 can include communication subsystems 4224 designed to operate over a GSM network, a GPRS network, an EDGE network, a Wi-Fi or WiMax network, and a Bluetooth™ network. In particular, the wireless communication subsystems 4224 can include hosting protocols such that the device 100 can be configured as a base station for other wireless devices.

An audio subsystem 4226 can be coupled to a speaker 4228 and a microphone 4230 to facilitate voice-enabled functions, such as speaker recognition, voice replication, digital recording, and telephony functions. The audio subsystem 4226 can be configured to facilitate processing voice commands, voiceprinting and voice authentication, for example.

The I/O subsystem 4240 can include a touch-surface controller 4242 and/or other input controller(s) 4244. The touch-surface controller 4242 can be coupled to a touch surface 4246. The touch surface 4246 and touch-surface controller 4242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 4246.

The other input controller(s) 4244 can be coupled to other input/control devices 4248, such as one or more buttons, rocker switches, thumb-wheel, infrared port, USB port, and/or a pointer device such as a stylus. The one or more buttons (not shown) can include an up/down button for volume control of the speaker 4228 and/or the microphone 4230.

In one implementation, a pressing of the button for a first duration can disengage a lock of the touch surface 4246; and a pressing of the button for a second duration that is longer than the first duration can turn power to the computing device 4200 on or off. Pressing the button for a third duration can activate a voice control, or voice command, module that enables the user to speak commands into the microphone 4230 to cause the device to execute the spoken command. The user can customize a functionality of one or more of the buttons. The touch surface 4246 can, for example, also be used to implement virtual or soft buttons and/or a keyboard.

In some implementations, the computing device 4200 can present recorded audio and/or video files, such as MP3, AAC, and MPEG files. In some implementations, the computing device 4200 can include the functionality of an MP3 player, such as an iPod™. The computing device 4200 can, therefore, include a 36-pin connector that is compatible with the iPod. Other input/output and control devices can also be used.

The memory interface 4202 can be coupled to memory 4250. The memory 4250 can include high-speed random access memory and/or non-volatile memory, such as one or more magnetic disk storage devices, one or more optical storage devices, and/or flash memory (e.g., NAND, NOR). The memory 4250 can store an operating system 4252, such as Darwin, RTXC, LINUX, UNIX, OS X, WINDOWS, or an embedded operating system such as VxWorks.

The operating system 4252 can include instructions for handling basic system services and for performing hardware dependent tasks. In some implementations, the operating system 4252 can be a kernel (e.g., UNIX kernel). In some implementations, the operating system 4252 can include instructions for performing voice authentication. For example, operating system 4252 can implement the navigation application and application extension features as described with reference to FIGS. 1-41.

The memory 4250 can also store communication instructions 4254 to facilitate communicating with one or more additional devices, one or more computers and/or one or more servers. The memory 4250 can include graphical user interface instructions 4256 to facilitate graphic user interface processing; sensor processing instructions 4258 to facilitate sensor-related processing and functions; phone instructions 4260 to facilitate phone-related processes and functions; electronic messaging instructions 4262 to facilitate electronic-messaging related processes and functions; web browsing instructions 4264 to facilitate web browsing-related processes and functions; media processing instructions 4266 to facilitate media processing-related processes and functions; GNSS/Navigation instructions 4268 to facilitate GNSS and navigation-related processes and instructions; and/or camera instructions 4270 to facilitate camera-related processes and functions.

The memory 4250 can store other software instructions 4272 to facilitate other processes and functions, such as the navigation application and application extension processes and functions as described with reference to FIGS. 1-41.

The memory 4250 can also store other software instructions 4274, such as web video instructions to facilitate web video-related processes and functions; and/or web shopping instructions to facilitate web shopping-related processes and functions. In some implementations, the media processing instructions 4266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 4250 can include additional instructions or fewer instructions. Furthermore, various functions of the computing device 4200 can be implemented in hardware and/or in software, including in one or more signal processing and/or application specific integrated circuits.

What is claimed is:

1. A method comprising:
    receiving, by a mapping application running on a computing device, a first user input selecting a point of interest on a first graphical user interface of the mapping application presented on a display of the computing device;
    in response to the first user input, presenting, by the mapping application, a second graphical user interface that presents options associated with the point of interest on the display, the second graphical user interface including a first selectable graphical element that presents a prompt to generate a reservation through a reservation application of a reservation service;
    receiving, by the mapping application, a first selection of the first selectable graphical element;
    in response to receiving the first selection, generating the reservation with the reservation service;
    after generating the reservation, presenting, by the mapping application, the second graphical user interface that presents options associated with the point of interest on the display, the second graphical user interface including the first selectable graphical element, wherein the prompt previously presented within the first selectable graphical element is replaced by an indication that the reservation associated with the selected point of interest has been made with the reservation service, the indication including one or more reservation attributes of the reservation;
    receiving a second selection of the first selectable graphical element after the reservation has been generated; and
    in response to the second selection, presenting a third graphical user interface that presents the one or more reservation attributes and a second graphical element that enables a user to change the reservation.

2. The method of claim 1, wherein the point of interest is a restaurant, further comprising:
    receiving, by the mapping application, table reservation availability information for the restaurant from a table reservation application extension; and
    presenting, by the mapping application, the table reservation availability information for the restaurant.

3. The method of claim 2, further comprising:
    receiving, by the mapping application, a second input selecting an available table reservation, the available table reservation occurring at a particular time; and
    sending, by the mapping application, a table reservation request to the table reservation application extension requesting to reserve a table at the restaurant at the particular time.

4. The method of claim 3, further comprising:
    receiving, by the mapping application, from the table reservation application extension, a confirmation of the table reservation request; and
    presenting, on the computing device, information indicating that table reservation request has been confirmed.

5. The method of claim 4, further comprising:
    annotating, by the mapping application, a map presented by the mapping application with information describing the confirmed table reservation request.

6. The method of claim 1, wherein the indication that the reservation has been made is included within the first selectable graphical element.

7. The method of claim 1, further comprising:
    in response to receiving the first user input selecting the point of interest, determining a first reservation application of a plurality of reservation applications that is configured for making reservations at the point of interest;
    determining that the first reservation application is not installed on the device; and
    in response to the determination that the first reservation application is not installed on the device, presenting, by the mapping application, an installation control prompting a user to install the reservation application.

8. The method of claim 1, wherein the one or more reservation attributes include a time corresponding to the reservation.

9. A system comprising:
    one or more processors; and
    a non-transitory computer-readable medium including one or more sequences of instructions that, when executed by the one or more processors, causes
    receiving, by a mapping application running on a computing device, a first user input selecting a point of interest on a first graphical user interface of the mapping application presented on a display of the computing device;
    in response to the first user input, presenting, by the mapping application, a second graphical user interface that presents options associated with the point of interest on the display, the second graphical user interface including a first selectable graphical element that presents a prompt to generate a reservation through a reservation application of a reservation service;

receiving, by the mapping application, a first selection of the first selectable graphical element;

in response to receiving the first selection, generating the reservation with the reservation service;

after generating the reservation, presenting, by the mapping application, the second graphical user interface that presents options associated with the point of interest on the display, the second graphical user interface including the first selectable graphical element, wherein the prompt previously presented within the first selectable graphical element is replaced by an indication that the reservation associated with the selected point of interest has been made with the reservation service, the indication including one or more reservation attributes of the reservation;

receiving a second selection of the first selectable graphical element after the reservation has been generated; and in response to the second selection, presenting a third graphical user interface that presents the one or more reservation attributes and a second graphical element that enables a user to change the reservation.

10. The system of claim 9, wherein the point of interest is a restaurant, and wherein the instructions cause:

receiving, by the mapping application, table reservation availability information for the restaurant from the table reservation application extension; and presenting, by the mapping application, the table reservation availability information for the restaurant.

11. The system of claim 10, wherein the instructions cause:

receiving, by the mapping application, a second input selecting an available table reservation, the available table reservation occurring at a particular time; and sending, by the mapping application, a table reservation request to the table reservation application extension requesting to reserve a table at the restaurant at the particular time.

12. The system of claim 11, wherein the instructions cause:

receiving, by the mapping application, from the table reservation application extension a confirmation of the table reservation request; and presenting, on the computing device, information indicating that table reservation request has been confirmed.

13. The system of claim 12 wherein the instructions cause:

annotating, by the mapping application, a map presented by the mapping application with information describing the confirmed table reservation request.

14. The system of claim 9, wherein the one or more reservation attributes include a time corresponding to the reservation.

15. A non-transitory computer-readable medium including one or more sequences of instructions that, when executed by the one or more processors, causes receiving, by a mapping application running on a computing device, a first user input selecting a point of interest on a first graphical user interface of the mapping application presented on a display of the computing device;

in response to the first user input, presenting, by the mapping application, a second graphical user interface that presents options associated with the point of interest on the display, the second graphical user interface including a first selectable graphical element that presents a prompt to generate a reservation through a reservation application of a reservation service;

receiving, by the mapping application, a first selection of the first selectable graphical element;

in response to receiving the first selection, generating the reservation with the reservation service;

after generating the reservation, presenting, by the mapping application, the second graphical user interface that presents options associated with the point of interest on the display, the second graphical user interface including the first selectable graphical element, wherein the prompt previously presented within the first selectable graphical element is replaced by an indication that the reservation associated with the selected point of interest has been made with the reservation service, the indication including one or more reservation attributes of the reservation;

receiving a second selection of the first selectable graphical element after the reservation has been generated; and in response to the second selection, presenting a third graphical user interface that presents the one or more reservation attributes and a second graphical element that enables a user to change the reservation.

16. The non-transitory computer-readable medium of claim 15, wherein the point of interest is a restaurant, and wherein the instructions cause:

receiving, by the mapping application, table reservation availability information for the restaurant from the table reservation application extension; and presenting, by the mapping application, the table reservation availability information for the restaurant.

17. The non-transitory computer-readable medium of claim 16, wherein the instructions cause:

receiving, by the mapping application, a second input selecting an available table reservation, the available table reservation occurring at a particular time; and sending, by the mapping application, a table reservation request to the table reservation application extension requesting to reserve a table at the restaurant at the particular time.

18. The non-transitory computer-readable medium of claim 17, wherein the instructions cause:

receiving, by the mapping application, from the table reservation application extension a confirmation of the table reservation request; and presenting, on the computing device, information indicating that table reservation request has been confirmed.

19. The non-transitory computer-readable medium of claim 18 wherein the instructions cause:

annotating, by the mapping application, a map presented by the mapping application with information describing the confirmed table reservation request.

20. The non-transitory computer-readable medium of claim 15, wherein the one or more reservation attributes include a time corresponding to the reservation.

* * * * *